(12) United States Patent
Matsuoka et al.

(10) Patent No.: US 10,775,814 B2
(45) Date of Patent: Sep. 15, 2020

(54) SELECTIVE CARRYING OUT OF SCHEDULED CONTROL OPERATIONS BY AN INTELLIGENT CONTROLLER

(71) Applicant: Google LLC, Mountain View, CA (US)

(72) Inventors: Yoky Matsuoka, Palo Alto, CA (US);
Evan J. Fisher, Palo Alto, CA (US);
Mark Malhotra, San Mateo, CA (US);
Mark D. Stefanski, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 977 days.

(21) Appl. No.: 13/864,929

(22) Filed: Apr. 17, 2013

(65) Prior Publication Data

US 2014/0317029 A1 Oct. 23, 2014

(51) Int. Cl.
| | | |
|---|---|---|
| *G06F 15/18* | (2006.01) | |
| *G05D 23/19* | (2006.01) | |
| *G05B 15/02* | (2006.01) | |
| *G06N 7/00* | (2006.01) | |
| *G06K 9/62* | (2006.01) | |

(Continued)

(52) U.S. Cl.
CPC ......... *G05D 23/1919* (2013.01); *G05B 15/02* (2013.01); *G05B 2219/2642* (2013.01); *G06K 9/6256* (2013.01); *G06N 5/025* (2013.01); *G06N 7/005* (2013.01); *G06N 20/00* (2019.01)

(58) Field of Classification Search
CPC ............... G05D 23/1919; G05B 15/02; G05B 2219/2642; G06N 20/00; G06N 5/025; G06N 7/005; G06N 99/005; G06K 9/6256; G06K 9/6269; F24F 11/65; F24F 11/66

USPC ......................................................... 706/12
See application file for complete search history.

(56) References Cited

U.S. PATENT DOCUMENTS

| | | |
|---|---|---|
| 3,991,357 A | 11/1976 | Kaminski |
| 4,183,290 A | 1/1980 | Kucharczyk |
| 4,223,831 A | 9/1980 | Szarka |

(Continued)

FOREIGN PATENT DOCUMENTS

| | | |
|---|---|---|
| CA | 2202008 | 8/2000 |
| EP | 0 196 069 A2 | 10/1986 |

(Continued)

OTHER PUBLICATIONS

Probabilistic Coverage in Wireless Sensor Networks Nadeem Ahmed, Salil S. Kanhere, Sanjay Jha 0-7695-2421-4/05 $20.00 © 2005 IEEE.*

(Continued)

*Primary Examiner* — Kakali Chaki
*Assistant Examiner* — Ababacar Seck
(74) *Attorney, Agent, or Firm* — Kilpatrick Townsend & Stockton LLP

(57) ABSTRACT

The current application is directed to intelligent controllers that use sensor output and electronically stored information to determine whether or not one or more types of entities are present within an area, volume, or environment monitored by the intelligent controllers. The intelligent controllers select operational modes and/or modify control schedules with respect to the presence and absence of the one or more entities. The intelligent controllers selectively carry out scheduled control operations during periods of time when one or more types of entities are determined not to be in a controlled environment.

20 Claims, 40 Drawing Sheets

(51) Int. Cl.
*G06N 5/02* (2006.01)
*G06N 20/00* (2019.01)

(56) References Cited

U.S. PATENT DOCUMENTS

| | | | |
|---|---|---|---|
| 4,335,847 A | 6/1982 | Levine | |
| 4,408,711 A | 10/1983 | Levine | |
| 4,615,380 A | 10/1986 | Beckey | |
| 4,674,027 A | 6/1987 | Beckey | |
| 4,685,614 A | 8/1987 | Levine | |
| 4,751,961 A | 6/1988 | Levine et al. | |
| 4,897,798 A | 1/1990 | Cler | |
| 4,971,136 A | 11/1990 | Mathur et al. | |
| 5,088,645 A | 2/1992 | Bell | |
| 5,211,332 A | 5/1993 | Adams | |
| 5,240,178 A | 8/1993 | Dewolf et al. | |
| 5,244,146 A | 9/1993 | Jefferson et al. | |
| 5,395,042 A | 3/1995 | Riley et al. | |
| 5,476,221 A | 12/1995 | Seymour | |
| 5,499,196 A | 3/1996 | Pacheco | |
| 5,555,927 A | 9/1996 | Shah | |
| 5,611,484 A | 3/1997 | Uhrich | |
| 5,673,850 A * | 10/1997 | Uptegraph | F24F 11/006 165/268 |
| 5,808,294 A | 9/1998 | Neumann | |
| 5,902,183 A | 5/1999 | D'Souza | |
| 5,909,378 A | 6/1999 | De Milleville | |
| 5,918,474 A | 7/1999 | Khanpara et al. | |
| 5,977,964 A | 11/1999 | Williams et al. | |
| 5,986,357 A * | 11/1999 | Myron | G06K 9/00335 307/116 |
| 6,062,482 A | 5/2000 | Gaugthier et al. | |
| 6,066,843 A | 5/2000 | Scheremeta | |
| 6,072,784 A | 6/2000 | Agrawal et al. | |
| 6,088,688 A | 7/2000 | Crooks et al. | |
| 6,095,427 A | 8/2000 | Hoium et al. | |
| 6,098,893 A | 8/2000 | Berglund et al. | |
| 6,216,956 B1 | 4/2001 | Ehlers et al. | |
| 6,349,883 B1 | 2/2002 | Simmons et al. | |
| 6,356,204 B1 | 3/2002 | Guindi et al. | |
| 6,370,894 B1 | 4/2002 | Thompson et al. | |
| 6,415,205 B1 | 7/2002 | Myron et al. | |
| 6,478,233 B1 | 11/2002 | Shah | |
| 6,480,803 B1 | 11/2002 | Pierret et al. | |
| 6,631,185 B1 | 10/2003 | Fleming, III | |
| 6,645,066 B2 | 11/2003 | Gutta et al. | |
| 6,769,482 B2 | 8/2004 | Wagner et al. | |
| 6,904,385 B1 | 6/2005 | Budike, Jr. | |
| 6,990,821 B2 | 1/2006 | Singh et al. | |
| 7,024,336 B2 | 4/2006 | Salsbury et al. | |
| 7,149,727 B1 | 12/2006 | Nicholls et al. | |
| 7,149,729 B2 | 12/2006 | Kaasten et al. | |
| 7,188,482 B2 | 3/2007 | Sadegh et al. | |
| 7,379,791 B2 | 5/2008 | Tamarkin et al. | |
| RE40,437 E | 7/2008 | Rosen | |
| 7,469,550 B2 | 12/2008 | Chapman, Jr. et al. | |
| 7,644,869 B2 | 1/2010 | Hoglund et al. | |
| 7,702,424 B2 | 4/2010 | Cannon et al. | |
| 7,784,704 B2 | 8/2010 | Harter | |
| 7,802,618 B2 | 9/2010 | Simon et al. | |
| 7,848,900 B2 | 12/2010 | Steinberg et al. | |
| 7,849,698 B2 | 12/2010 | Harrod et al. | |
| 7,854,389 B2 | 12/2010 | Ahmed | |
| 8,010,237 B2 | 8/2011 | Cheung et al. | |
| 8,019,567 B2 | 9/2011 | Steinberg et al. | |
| 8,037,022 B2 | 10/2011 | Rahman et al. | |
| 8,090,477 B1 | 1/2012 | Steinberg | |
| 8,091,375 B2 | 1/2012 | Crawford | |
| 8,131,497 B2 | 3/2012 | Steinberg et al. | |
| 8,174,381 B2 | 5/2012 | Imes et al. | |
| 8,180,492 B2 | 5/2012 | Steinberg | |
| 8,219,249 B2 | 7/2012 | Harrod et al. | |
| 8,255,090 B2 | 8/2012 | Frader-Thompson et al. | |
| 8,415,829 B2 | 4/2013 | Di Cristofaro | |
| 8,442,752 B2 | 5/2013 | Wijaya et al. | |
| 8,510,255 B2 * | 8/2013 | Fadell | H05B 37/0227 706/52 |
| 8,630,741 B1 * | 1/2014 | Matsuoka et al. | 700/276 |
| 2002/0198629 A1 | 12/2002 | Ellis | |
| 2004/0117311 A1 | 6/2004 | Agarwal et al. | |
| 2004/0133314 A1 * | 7/2004 | Ehlers | F24F 11/0012 700/276 |
| 2004/0249479 A1 | 12/2004 | Shorrock | |
| 2004/0256472 A1 | 12/2004 | DeLuca | |
| 2005/0090915 A1 | 4/2005 | Geiwitz | |
| 2005/0128067 A1 | 6/2005 | Zakrewski | |
| 2005/0150968 A1 | 7/2005 | Shearer | |
| 2005/0189429 A1 | 9/2005 | Breeden | |
| 2005/0192915 A1 | 9/2005 | Ahmed et al. | |
| 2005/0280421 A1 | 12/2005 | Yomoda et al. | |
| 2006/0186214 A1 | 8/2006 | Simon et al. | |
| 2006/0192021 A1 * | 8/2006 | Schultz | F24F 11/0009 236/1 C |
| 2006/0196953 A1 | 9/2006 | Simon et al. | |
| 2006/0239557 A1 * | 10/2006 | Cahill | G06F 17/3079 382/181 |
| 2007/0045431 A1 | 3/2007 | Chapman et al. | |
| 2007/0115902 A1 | 5/2007 | Shamoon et al. | |
| 2007/0205297 A1 | 9/2007 | Finkam et al. | |
| 2007/0266575 A1 | 11/2007 | Nash | |
| 2008/0015742 A1 | 1/2008 | kulyk et al. | |
| 2008/0183335 A1 | 7/2008 | Poth et al. | |
| 2008/0191045 A1 | 8/2008 | Harter | |
| 2008/0273754 A1 | 11/2008 | Hick et al. | |
| 2008/0317292 A1 | 12/2008 | Baker et al. | |
| 2009/0070412 A1 | 3/2009 | D'Angelo et al. | |
| 2009/0171862 A1 | 7/2009 | Harrod et al. | |
| 2009/0192894 A1 | 7/2009 | Dikeman | |
| 2009/0254225 A1 | 10/2009 | Boucher et al. | |
| 2009/0259713 A1 | 10/2009 | Blumrich et al. | |
| 2009/0297901 A1 | 12/2009 | Kilian et al. | |
| 2009/0327354 A1 | 12/2009 | Resnick et al. | |
| 2010/0019051 A1 | 1/2010 | Rosen | |
| 2010/0025483 A1 * | 2/2010 | Hoeynck | F24F 11/001 236/1 C |
| 2010/0050004 A1 | 2/2010 | Hamilton, II et al. | |
| 2010/0070084 A1 | 3/2010 | Steinberg et al. | |
| 2010/0070086 A1 | 3/2010 | Harrod et al. | |
| 2010/0070234 A1 | 3/2010 | Steinberg et al. | |
| 2010/0084482 A1 | 4/2010 | Kennedy et al. | |
| 2010/0167783 A1 | 7/2010 | Alameh et al. | |
| 2010/0179704 A1 | 7/2010 | Ozog | |
| 2010/0211224 A1 | 8/2010 | Keeling et al. | |
| 2010/0262298 A1 | 10/2010 | Johnson et al. | |
| 2010/0262299 A1 | 10/2010 | Cheung et al. | |
| 2010/0280667 A1 | 11/2010 | Steinberg | |
| 2010/0289643 A1 | 11/2010 | Trundle et al. | |
| 2010/0308119 A1 | 12/2010 | Steinberg et al. | |
| 2010/0318227 A1 | 12/2010 | Steinberg et al. | |
| 2011/0046792 A1 | 2/2011 | Imes et al. | |
| 2011/0046805 A1 | 2/2011 | Bedros et al. | |
| 2011/0046806 A1 | 2/2011 | Nagel et al. | |
| 2011/0054710 A1 * | 3/2011 | Imes | F24F 11/0086 700/286 |
| 2011/0077758 A1 | 3/2011 | Tran et al. | |
| 2011/0077896 A1 | 3/2011 | Steinberg et al. | |
| 2011/0151837 A1 | 6/2011 | Winbush, III | |
| 2011/0160913 A1 | 6/2011 | Parker et al. | |
| 2011/0185895 A1 | 8/2011 | Freen | |
| 2011/0251726 A1 * | 10/2011 | McNulty | G05B 13/0265 700/278 |
| 2011/0307103 A1 | 12/2011 | Cheung et al. | |
| 2011/0307112 A1 | 12/2011 | Barrilleaux | |
| 2012/0017611 A1 | 1/2012 | Coffel et al. | |
| 2012/0065935 A1 | 3/2012 | Steinberg et al. | |
| 2012/0066463 A1 * | 3/2012 | Rice | G06F 11/3006 711/161 |
| 2012/0085831 A1 | 4/2012 | Kopp | |
| 2012/0101637 A1 | 4/2012 | Imes et al. | |
| 2012/0158350 A1 | 6/2012 | Steinberg et al. | |
| 2012/0186774 A1 * | 7/2012 | Matsuoka | G05B 15/02 165/11.1 |
| 2012/0221151 A1 | 8/2012 | Steinberg | |

(56) References Cited

U.S. PATENT DOCUMENTS

| | | | |
|---|---|---|---|
| 2012/0252430 A1 | 10/2012 | Imes et al. | |
| 2012/0310376 A1* | 12/2012 | Krumm | G05B 15/02 700/31 |
| 2013/0024799 A1 | 1/2013 | Fadell et al. | |

FOREIGN PATENT DOCUMENTS

| | | |
|---|---|---|
| JP | S59-106311 | 6/1984 |
| JP | H1-252850 | 10/1989 |
| WO | 2014/172393 | 10/2014 |

OTHER PUBLICATIONS

The Neurothermostat: Predictive Optimal Control of Residential Heating Systems—1997 Michael C. Mozer, Lucky Vidmar, Robert H. Dodier.*

PreHeat: Controlling Home Heating Using Occupancy Prediction James Scott1, A.J. Bernheim Brush2 , John Krumm2 , Brian Meyers2 Mike Hazas3 , Steve Hodges1 , Nicolas Villar1.*

The Smart Thermostat: Using Occupancy Sensors to Save Energy in Homes Jiakang Lu†, Tamim Sookoor†, Vijay Srinivasan†, Ge Gao†, Brian Holben†, John Stankovic†, Eric Field‡, Kamin Whitehouse† †Department of Computer Science, University of Virginia ‡School of Architecture, University of Virginia.*

The Self-Programming Thermostat: Optimizing Setback Schedules based on Home Occupancy Patterns—2009 Ge Gao and Kamin Whitehouse.*

International Search Report and Written Opinion dated Jan. 21, 2015 for International Patent Application No. PCT/US2014/034246 filed on Apr. 15, 2014, all pages.

Braeburn 5300 Installer Guide, Braeburn Systems, LLC, Dec. 9, 2009, 10 pages.

Braeburn Model 5200, Braeburn Systems, Llc, Jul. 20, 2011, 11 pages.

Ecobee Smart Si Thermostat Installation Manual, Ecobee, Apr. 3, 2012, 40 pages.

Honeywell Prestige THX9321-9421 Operating Manual, Honeywell International Inc., Jul. 6, 2011, 120 pages.

Hunter Internet Thermostat Installation Guide, Hunter Fan Co., Aug. 14, 2012, 8 pages.

NetX RP32-WIFI Network Thermostat Consumer Brochure, Network Thermostat, May, 2011, 2 pages.

TP-PAC, TP-PHP, TP-NAC, TP-NHP Performance Series AC/HP Thermostat Installation Instructions, Carrier Corp., Sep. 2007, 56 pages.

Trane Install XL600 Installation Manual, Trane, Mar. 2006, 16 pages.

Trane XL950 Installation Guide, Trane, Mar. 2011, 20 pages.

VisionPRO TH8000 Series Operating Manual, Honeywell International, Inc., Mar., 2011, 96 pages.

VisionPRO Wi-Fi Programmable Thermostat User Guide, Honeywell International Inc., Aug. 2012, 48 pages.

White Rodgers (Emerson) Model 1F81-261 Installation and Operating Instructions, White Rodgers, Apr. 15, 2010, 8 pages.

Akhlaghinia et al., Occupancy Monitoring in Intelligent Environment through Integrated Wireless Localizing Agents, IEEE, 2009, 7 pages.

Akhlaghinia et al., Occupant Behaviour Prediction in Ambient Intelligence Computing Environment, Journal of Uncertain Systems, vol. 2, No. 2, 2008, pp. 85-100.

Allen et al., Real-Time Earthquake Detection and Hazard Assessment by ElarmS Across California, Geophysical Research Letters, vol. 36, L00B08, 2009, pp. 1-6.

Chatzigiannakis et al., Priority Based Adaptive Coordination of Wireless Sensors and Actors, Q2SWinet '06, Oct. 2006, pp. 37-44.

Mozer, The Neural Network House: An Environmental that Adapts to its Inhabitants, Proceedings of the American Association for Artificial Intelligence SS-98-02, 1998, pp. 110-114.

Ros et al., Multi-Sensor Human Tracking with the Bayesian Occupancy Filter, IEEE, 2009, 8 pages.

Wong et al., Maximum Likelihood Estimation of ARMA Model with Error Processes for Replicated Observations, National University of Singapore, Department of Economics, Working Paper No. 0217, Feb. 2002, pp. 1-19.

International Search Report and Written Opinion of PCT/US2014/034248, dated Sep. 15, 2014, 20 pages.

Honeywell, T8611G Chronotherm IV Deluxe Programmable Heat Pump Thermostat, pp. 1-24, 1997.

Davis, Gray, "Buildings End-Use energy Efficiency; Alternatives to Compressor Cooling", California Energy Commission, Jan. 2000.

Aprilaire Electronic Thermostats, User's Manual Installation and Programming, Dec. 2000.

Honeywell, "Perfect Climate Comfort Center Control Systems", pp. 1-44, 2001.

Robertshaw, "9620 Digital Programmable Thermost User's Manual", pp. 1-14, 2001.

Trane, "TCONT600AF11MA Programmable Comfort Control", pp. 1-14, 2006.

Robertshaw, "9801i2, 9825i2 Deluxe Programmable Thermostats", pp. 1-36, Jul. 17, 2006.

Venstar, "Commercail Thermostat T2900, Owner's Manual", pp. 1-26.2, Apr. 2008.

Lennox, "Owner's Guide, ComforSense 5000 Series Models L5711U and L5732U Programmable Touch Screen Thermostats", 1-32, Feb. 2008.

Gao, Ge et al., "The Self-Programming Thermostat: Optimizing Setback Schedules based on Home Occupancy Patterns", BuildSys '09, Nov. 3, 2009.

Lennox, "Homeowner's Manual ComfortSense 7000 Series", pp. 1-15, May 2009.

Braeburn, "Premier Series Universal Auto Changeover 5300", pp. 1-15, 2009.

Ecobee, "Smart Thermostat User's Manual", pp. 1-34, 2010.

Lennox, "Homeowner's Manual comfort Touch Thermostat", pp. 1-20, Dec. 2010.

Washington State University Extension Energy Program, "Electic Heat Lock Out on Heat Pumps", pp. 1-3, Apr. 2010.

Lu, Jiakang et al., "The Smart Thermostat: Using Occupancy Sensors to Save Energy in Homes", pp. 211-224, SenSys '10, Nov. 3-5, 2010.

Trane, "Trane communicating Thermostats for Fan Coil Control", pp. 1-32, May 2011.

Trane, "Trane Communicating Thermostats for Heat Pump Control", pp. 1-32, May 2011.

Trane, "ComfortLink II Installation Guide", pp. 1-20, Mar. 2011.

Honeywell, "Manual de funcionamiento Prestige THX9321/9421", pp. 1-38, 2011.

Honeywell, "Manuel d'utilisation Focus PRO Serie TH6000", pp. 1-24, 2011.

Honeywell, Operating Maual FocusPRO TH6000 Series, pp. 1-24, 2011.

Honeywell, "Manual de funcionamiento", Serie FocusPRO TH6000, pp. 1-24, 2011.

Honewell, "Manual de Uso", Serie VisionPRO TH8000, pp. 1-30, 2011.

Honeywell, "Automation and Control Solutions", pp. 1-30, 2011.

Ecobee, "SMART Thermostat", pp. 1-31, 2011.

Deleeuw, Scott, "ecobee WiFi enabled Smart Thermostat Part 2: The Features review", pp. 1-7, Dec. 2, 2011.

Braeburn, "Premier Series Programmable Thermostats", pp. 1-20, 2011.

Ecobee, "Smart Si Thermostat User Manual", pp. 1-39, 2012.

Carrier, TB-PAC TB-PHP Base Series Programmable Thermostats Installation Instructions, pp. 1-4, 2012.

Carrier, "SYSTXCCUIZ01-V Infinity Control", pp. 1-20, 2012.

Honeywell, "THX9321 Prestige 2.0 and THX9421 Prestige IAQ 2.0 with EIM", pp. 1-126, 2012.

Honeywell, "Automation and Control Solutions Installation Guide", pp. 1-38, 2012.

Honeywell, "Automation and Control Systems", pp. 1-29, 2012.

(56) References Cited

OTHER PUBLICATIONS

Honeywell, "Installation Guide VisionPRO TH8000 Series", pp. 1-11, 2012.
Honeywell, "Guia de instalacion Serie Focus PRO TH6000", pp. 1-8, 2012.
Honeywell, "Installation Guide FocusPRO TH 6000 Series", pp. 1-8, 2012.
Network Thermostat, "Nex/X WiFi Thermostat", 2012.
Venstar, "Residential Thermostat T5800 Owner's Manual and Installation Instructions", pp. 1-23.
White Rodgers, Emerson Blue Wireless Comfort Interface 1F98EZ-1621, pp. 1-26.
Ecobee, "Introducing the new Smart Si Thermostat".
LuxPro, Instruction Manual LuxPro PSPU732T.
"Internet Thermostat Installation Guide", pp. 1-44.
International Preliminary Report on Patentability dated Oct. 29, 2015 for International Patent Application No. PCT/US2014/034246 filed on Apr. 15, 2014, all pages.
International Preliminary Report on Patentability dated Oct. 29, 2015 for International Patent Application No. PCT/US2014/034248 filed on Apr. 15, 2014, all pages.

* cited by examiner

| | |
|---|---|
| a | user inputs command to schedule interface to begin schedule interaction |
| b | schedule interaction terminated by input or time out |
| c | same as (a) |
| d | user inputs control command to immediate-control interface |
| e | controller receives and carries out the command |
| f | same as (d) |
| g | scheduled control change executed |
| h | current time = = scheduled-control-change time |
| i | same as (h) |
| j | same as (g) |
| k | timer or sensor interrupt |
| l | sensor data recorded |
| m | same as (k) |
| n | same as (l) |
| o | timer |
| p | presence probabilities recomputed – no change in presence/no-presence status |
| q | same as (o) |
| r | same as (p) |
| s | high probability of presence indicated by sensor event |
| t | presence probability now greater than or equal to threshold – schedule adjusted |
| u | presence probability now less than threshold – schedule adjusted |
| v | schedule change results in current time = = schedule-control-change time |

FIG. 18B

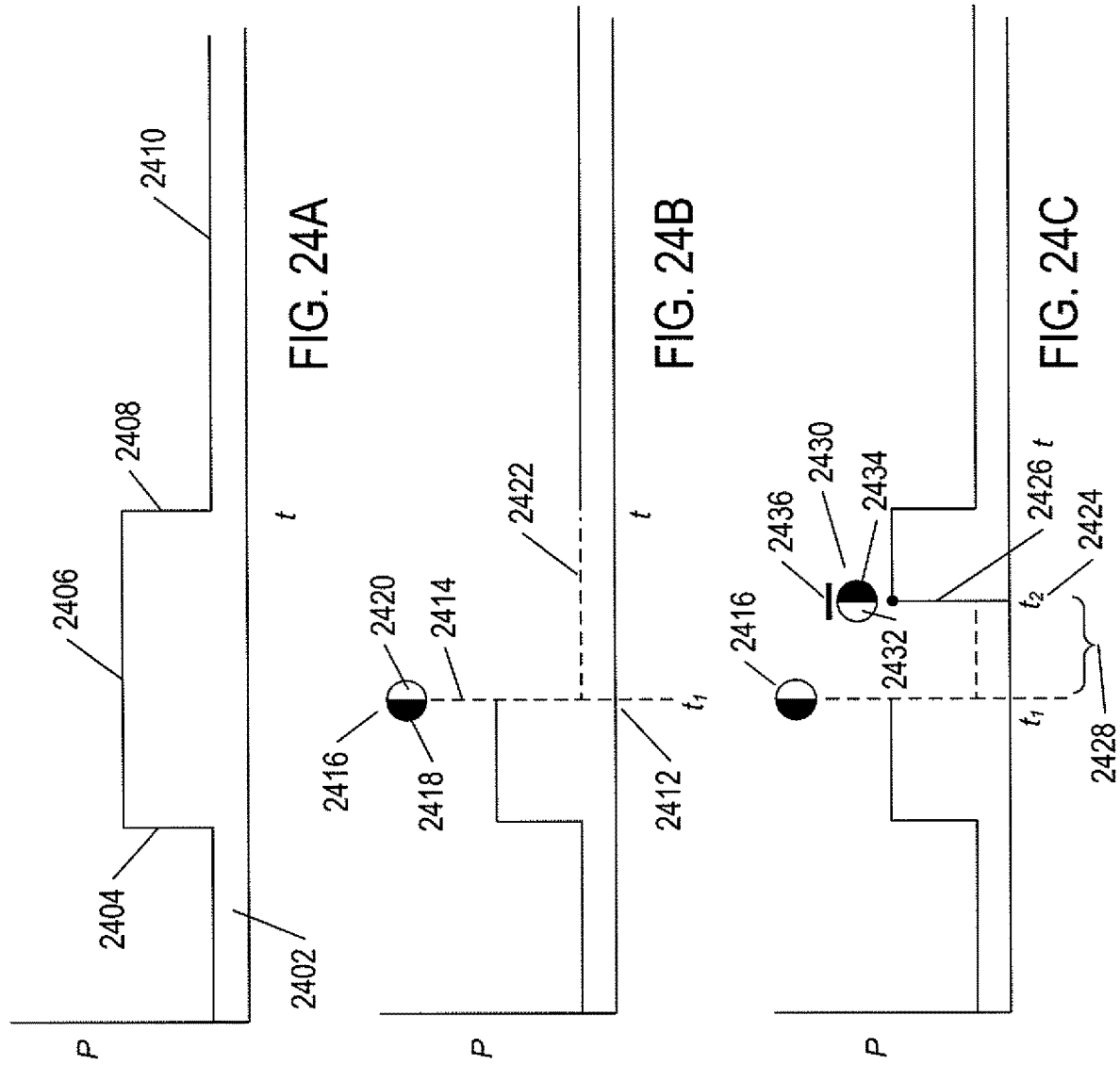

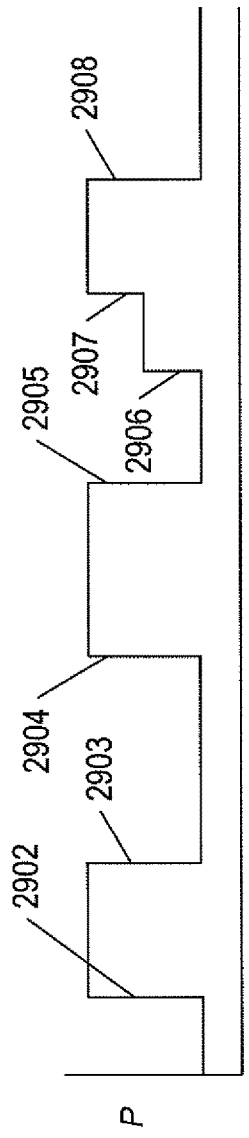
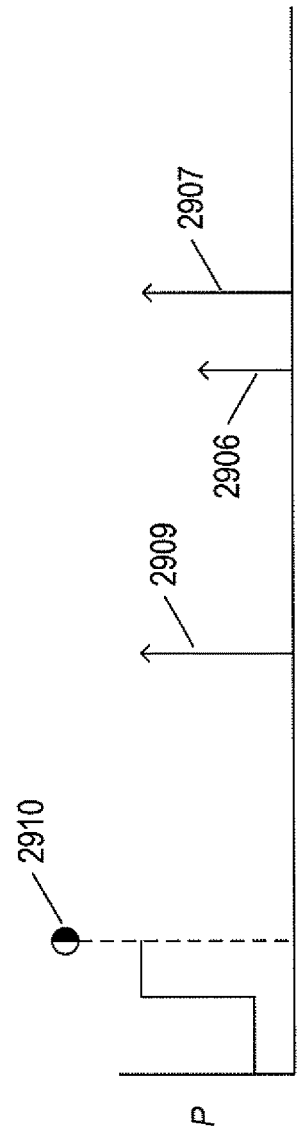
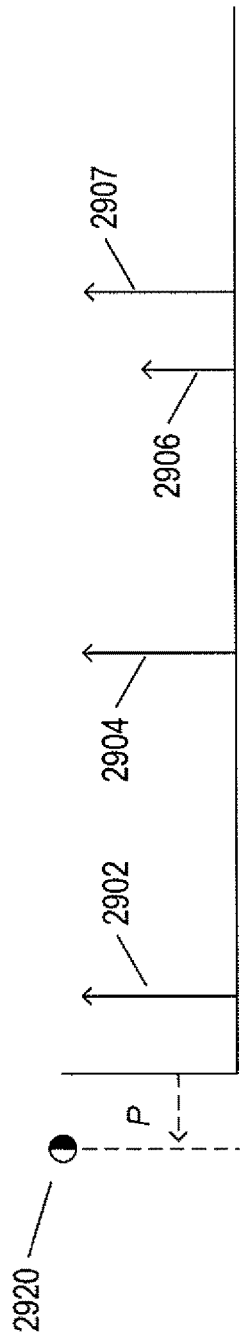
FIG. 29A
FIG. 29B
FIG. 29C

SELECTIVE CARRYING OUT OF SCHEDULED CONTROL OPERATIONS BY AN INTELLIGENT CONTROLLER

TECHNICAL FIELD

The current patent application is directed to machine learning and intelligent controllers and, in particular, to intelligent controllers, and machine-learning methods incorporated within intelligent controllers, that determine the presence of one or more types of entities within an area, volume, or environment controlled by the intelligent controller and that modify control operation with respect to presence or absence of the one or more entities.

BACKGROUND

Control systems and control theory are well-developed fields of research and development that have had a profound impact on the design and development of a large number of systems and technologies, from airplanes, spacecraft, and other vehicle and transportation systems to computer systems, industrial manufacturing and operations facilities, machine tools, process machinery, and consumer devices. Control theory encompasses a large body of practical, system-control-design principles, but is also an important branch of theoretical and applied mathematics. Various different types of controllers are commonly employed in many different application domains, from simple closed-loop feedback controllers to complex, adaptive, state-space and differential-equations-based processor-controlled control systems.

Many controllers are designed to output control signals to various dynamical components of a system based on a control model and sensor feedback from the system. Many systems are designed to exhibit a predetermined behavior or mode of operation, and the control components of such systems are therefore designed, by traditional design and optimization techniques, to ensure that the predetermined system behavior transpires under normal operational conditions. In certain cases, there may be various different modes of operation for a system, and the control components of the system therefore need to select a current mode of operation for the system and control the system to conform to the selected mode of operation. Theoreticians, researchers, and developers of many different types of controllers and automated systems continue to seek approaches to controller design to produce controllers with the flexibility and intelligence to control systems to select a current operational mode from among different possible operational modes and then provide control outputs to drive the controlled system to produce the selected mode of operation.

SUMMARY

The current application is directed to intelligent controllers that use sensor output and electronically stored information to determine whether or not one or more types of entities are present within an area, volume, or environment monitored by the intelligent controllers. The intelligent controllers select operational modes and/or modify control schedules with respect to the presence and absence of the one or more entities. The intelligent controllers selectively carry out scheduled control operations during periods of time when one or more types of entities are determined not to be in a controlled environment.

BRIEF DESCRIPTION OF THE DRAWINGS

FIGS. 18A-B provide a state-transition diagram for an intelligent controller that operates according to the two-state transition diagram illustrated in FIG. 17A.

FIGS. 24A-D illustrate no-presence events and their effects on control schedules.

FIGS. 29A-C illustrate selective carrying out of scheduled setpoints by an intelligent controller in the no-presence state.

DETAILED DESCRIPTION

The current application is directed to a general class of intelligent controllers that determine the presence and absence of one or more types of entities within one or more areas, volumes, or environments affected by one or more systems controlled by the intelligent controllers and that includes many different specific types of intelligent controllers that can be applied to, and incorporated within, many different types of devices, machines, systems, and organizations. Intelligent controllers control the operation of devices, machines, systems, and organizations that, in turn, operate to affect any of various parameters within one or more areas, volumes, or environments. The general class of intelligent controllers to which the current application is directed include components that allow the intelligent controllers to directly sense the presence and/or absence of one or more entities using one or more outputs from one or more sensors, to infer the presence and/or absence of the one or more entities within areas, regions, volumes or at points within areas, regions, and volumes from the sensor-based determinations as well as various types of electronically stored data, rules, and parameters, and to adjust control schedules, based on the inferences related to the presence or absence of the one or more entities within the areas, regions, and volumes. The subject matter of this patent specification relates to the subject matter of the following commonly assigned applications, which are incorporated by reference herein: U.S. Ser. No. 13/632,070, filed Sep. 30, 2012; and U.S. Ser. No. 13/632,041 filed Sep. 30, 2012.

The detailed description includes three subsections: (1) an overview of the smart-home environment; (2) presence-and/or-absence detection and control adjustment by intelligent controllers; and (3) selective carrying out of scheduled control operations by an intelligent controller. The first subsection provides a description of one area of technology that offers many opportunities for application and incorporation of methods for detecting the presence and/or absence of one or more entities and for accordingly adjusting the control of one or more systems. The second subsection provides a detailed description of the general class of intelligent controllers which determine the presence and/or absence of one or more entities and that correspondingly adjust control of one or more systems based on the determined presence and/or absence of the one or more entities, including a first, general implementation. The third subsection provides a disclosure of an intelligent controller that selectively carries out scheduled control operation during periods of time when no entities, such as human beings, are determined to be presence in a controlled environment.

Overview of the Smart-Home Environment

Figure 1:
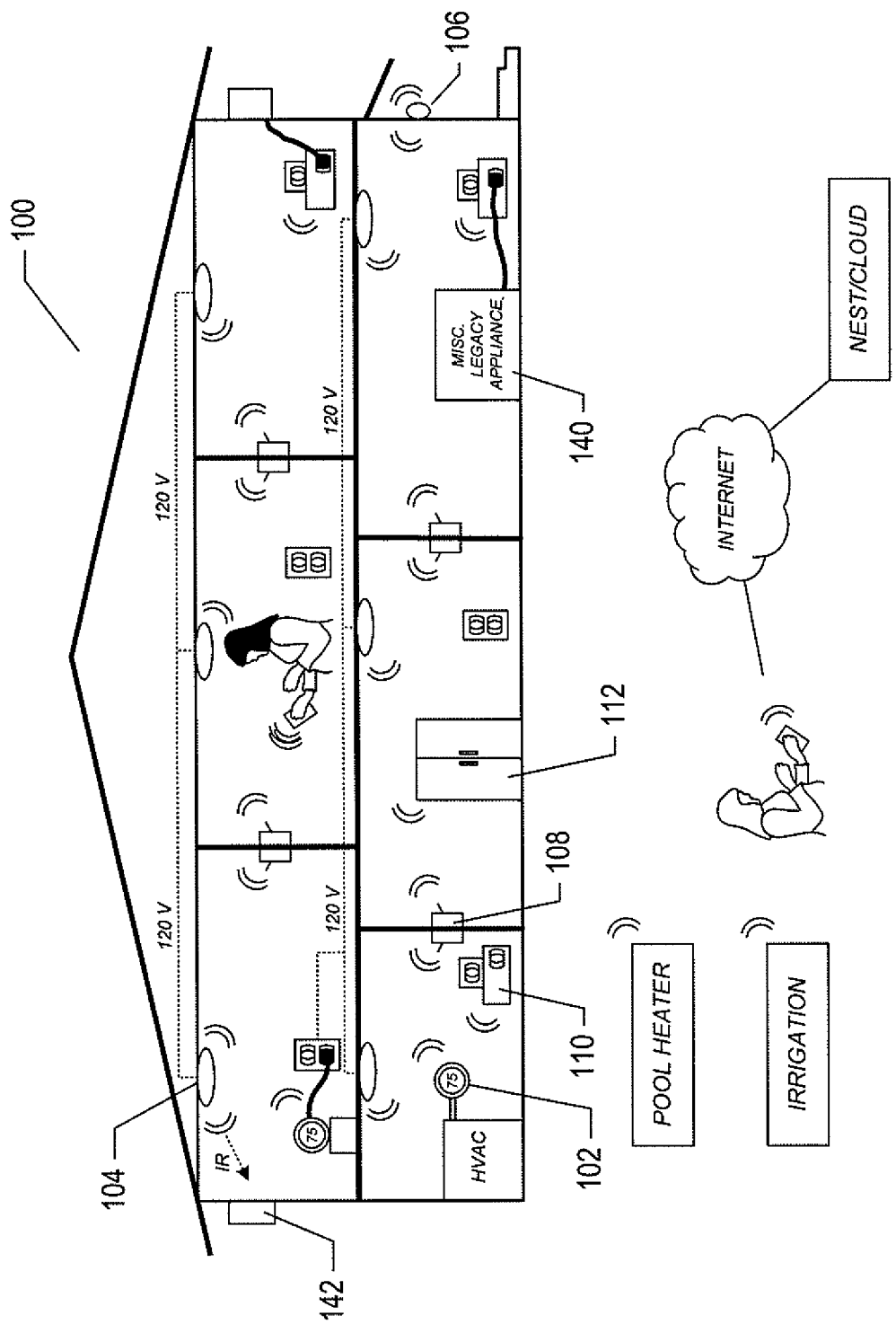
FIG. 1 illustrates a smart-home environment.

FIG. 1 illustrates a smart-home environment. The smart-home environment 100 includes a number of intelligent, multi-sensing, network-connected devices. These smart-home devices intercommunicate and are integrated together within the smart-home environment. The smart-home devices may also communicate with cloud-based smart-home control and/or data-processing systems in order to distribute control functionality, to access higher-capacity and more reliable computational facilities, and to integrate a particular smart home into a larger, multi-home or geographical smart-home-device-based aggregation.

The smart-home devices may include one more intelligent thermostats 102, one or more intelligent hazard-detection units 104, one or more intelligent entryway-interface devices 106, smart switches, including smart wall-like switches 108, smart utilities interfaces and other services interfaces, such as smart wall-plug interfaces 110, and a wide variety of intelligent, multi-sensing, network-connected appliances 112, including refrigerators, televisions, washers, dryers, lights, audio systems, intercom systems, mechanical actuators, wall air conditioners, pool-heating units, irrigation systems, and many other types of intelligent appliances and systems.

In general, smart-home devices include one or more different types of sensors, one or more controllers and/or actuators, and one or more communications interfaces that connect the smart-home devices to other smart-home devices, routers, bridges, and hubs within a local smart-home environment, various different types of local computer systems, and to the Internet, through which a smart-home device may communicate with cloud-computing servers and other remote computing systems. Data communications are generally carried out using any of a large variety of different types of communications media and protocols, including wireless protocols, such as Wi-Fi, ZigBee, 6LoWPAN, various types of wired protocols, including CAT6 Ethernet, HomePlug, and other such wired protocols, and various other types of communications protocols and technologies. Smart-home devices may themselves operate as intermediate communications devices, such as repeaters, for other smart-home devices. The smart-home environment may additionally include a variety of different types of legacy appliances and devices 140 and 142 which lack communications interfaces and processor-based controllers.

Figure 2:
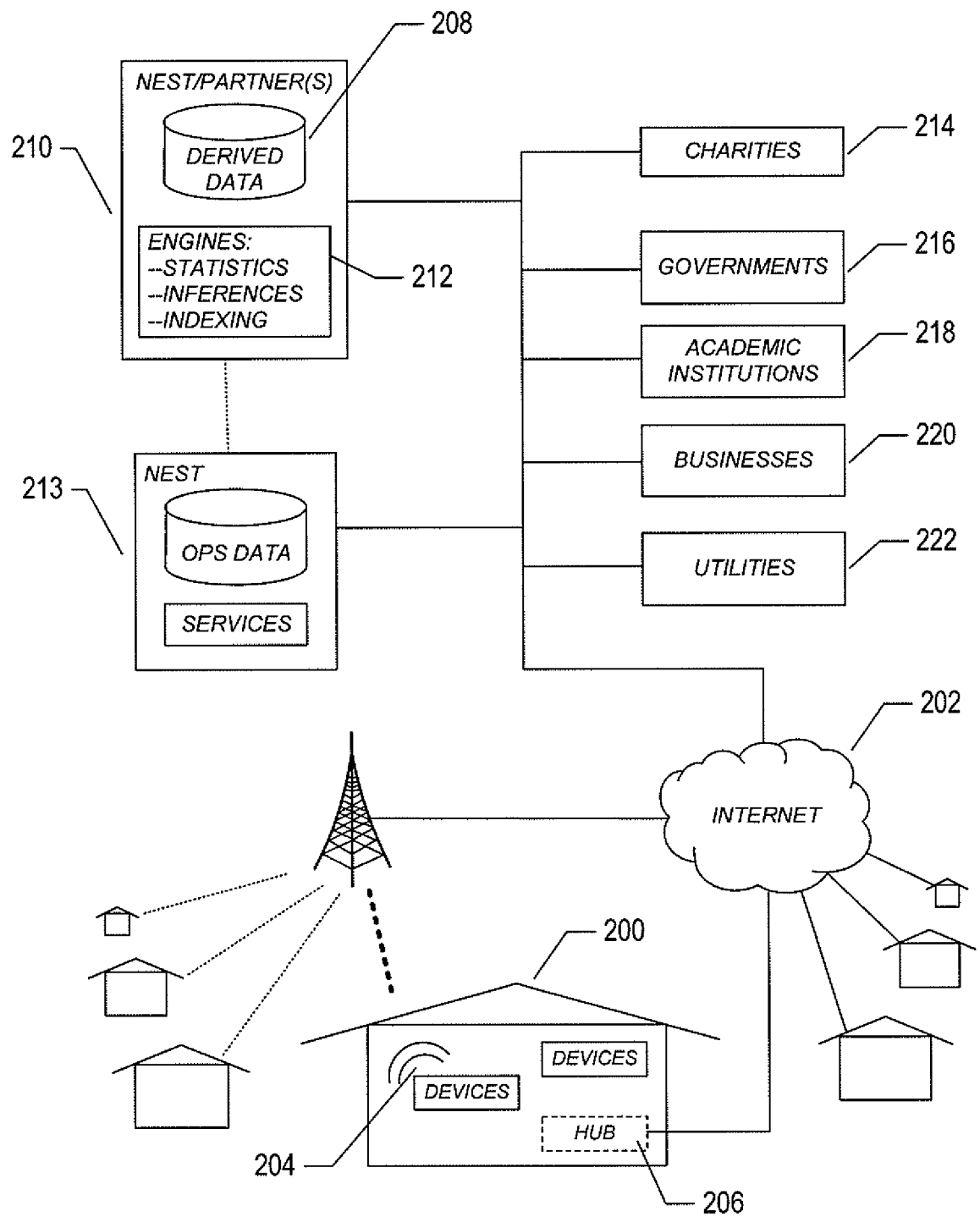
FIG. 2 illustrates integration of smart-home devices with remote devices and systems.

FIG. 2 illustrates integration of smart-home devices with remote devices and systems. Smart-home devices within a smart-home environment 200 can communicate through the Internet 202 via 3G/4G wireless communications 204, through a hubbed network 206, or by other communications interfaces and protocols. Many different types of smart-home-related data, and data derived from smart-home data 208, can be stored in, and retrieved from, a remote system 210, including a cloud-based remote system. The remote system may include various types of statistics, inference, and indexing engines 212 for data processing and derivation of additional information and rules related to the smart-home environment. The stored data can be exposed, via one or more communications media and protocols, in part or in whole, to various remote systems and organizations, including charities 214, governments 216, academic institutions 218, businesses 220, and utilities 222. In general, the remote data-processing system 210 is managed or operated by an organization or vendor related to smart-home devices or contracted for remote data-processing and other services by a homeowner, landlord, dweller, or other smart-home-associated user. The data may also be further processed by additional commercial-entity data-processing systems 213 on behalf of the smart-homeowner or manager and/or the commercial entity or vendor which operates the remote data-processing system 210. Thus, external entities may collect, process, and expose information collected by smart-home devices within a smart-home environment, may process the information to produce various types of derived results which may be communicated to, and shared with, other remote entities, and may participate in monitoring and control of smart-home devices within the smart-home environment as well as monitoring and control of the smart-home environment. Of course, in many cases, export of information from within the smart-home environment to remote entities may be strictly controlled and constrained, using encryption, access rights, authentication, and other well-known techniques, to ensure that information deemed confidential by the smart-home manager and/or by the remote data-processing system is not intentionally or unintentionally made available to additional external computing facilities, entities, organizations, and individuals.

Figure 3:
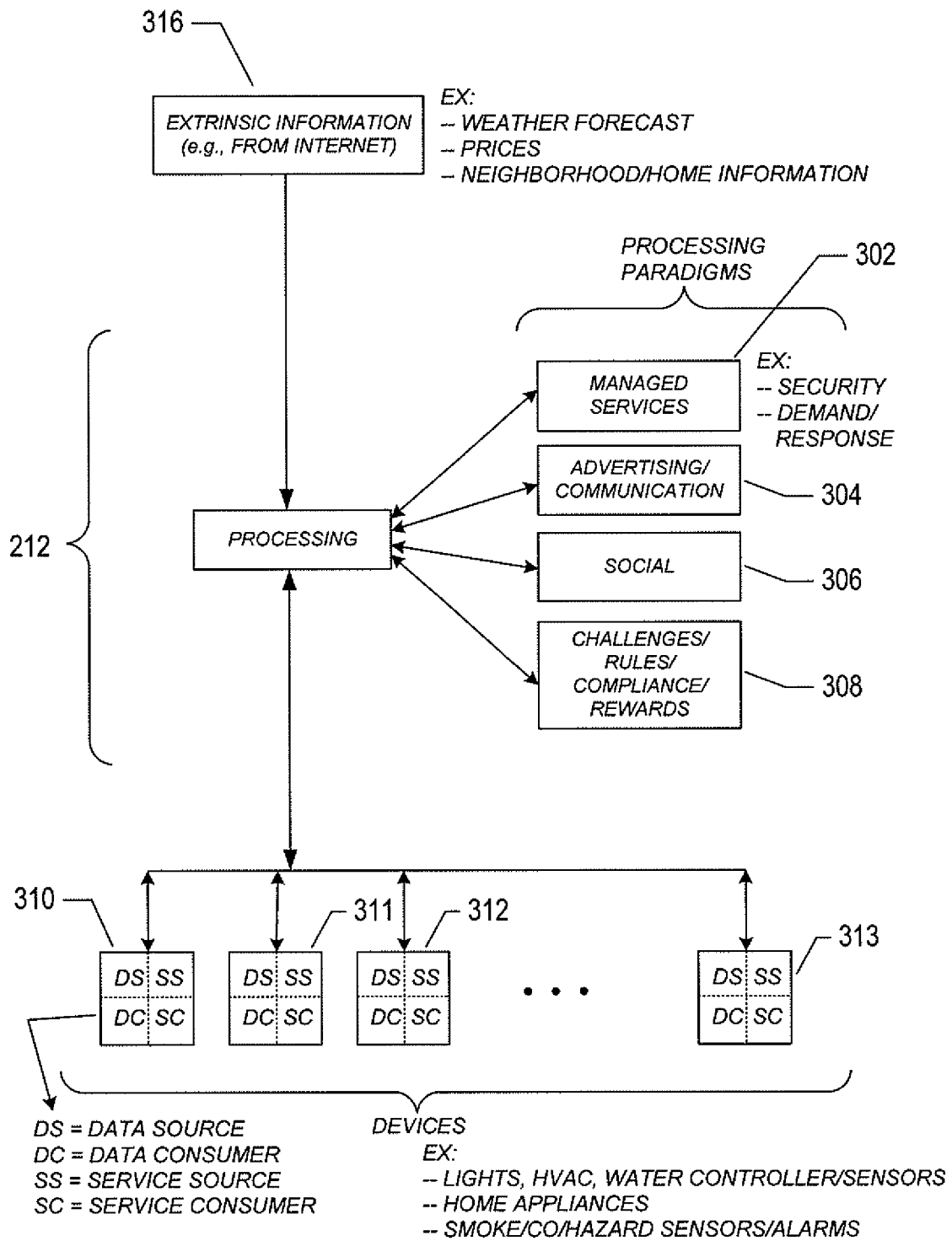
FIG. 3 illustrates information processing within the environment of intercommunicating entities illustrated in FIG. 2.

FIG. 3 illustrates information processing within the environment of intercommunicating entities illustrated in FIG. 2. The various processing engines 212 within the external data-processing system 210 can process data with respect to a variety of different goals, including provision of managed services 302, various types of advertizing and communications 304, social-networking exchanges and other electronic social communications 306, and for various types of monitoring and rule-generation activities 308. The various processing engines 212 communicate directly or indirectly with smart-home devices 310-313, each of which may have data-consumer ("DC"), data-source ("DS"), services-consumer ("SC"), and services-source ("SS") characteristics. In addition, the processing engines may access various other types of external information 316, including information obtained through the Internet, various remote information sources, and even remote sensor, audio, and video feeds and sources.

Figure 4:
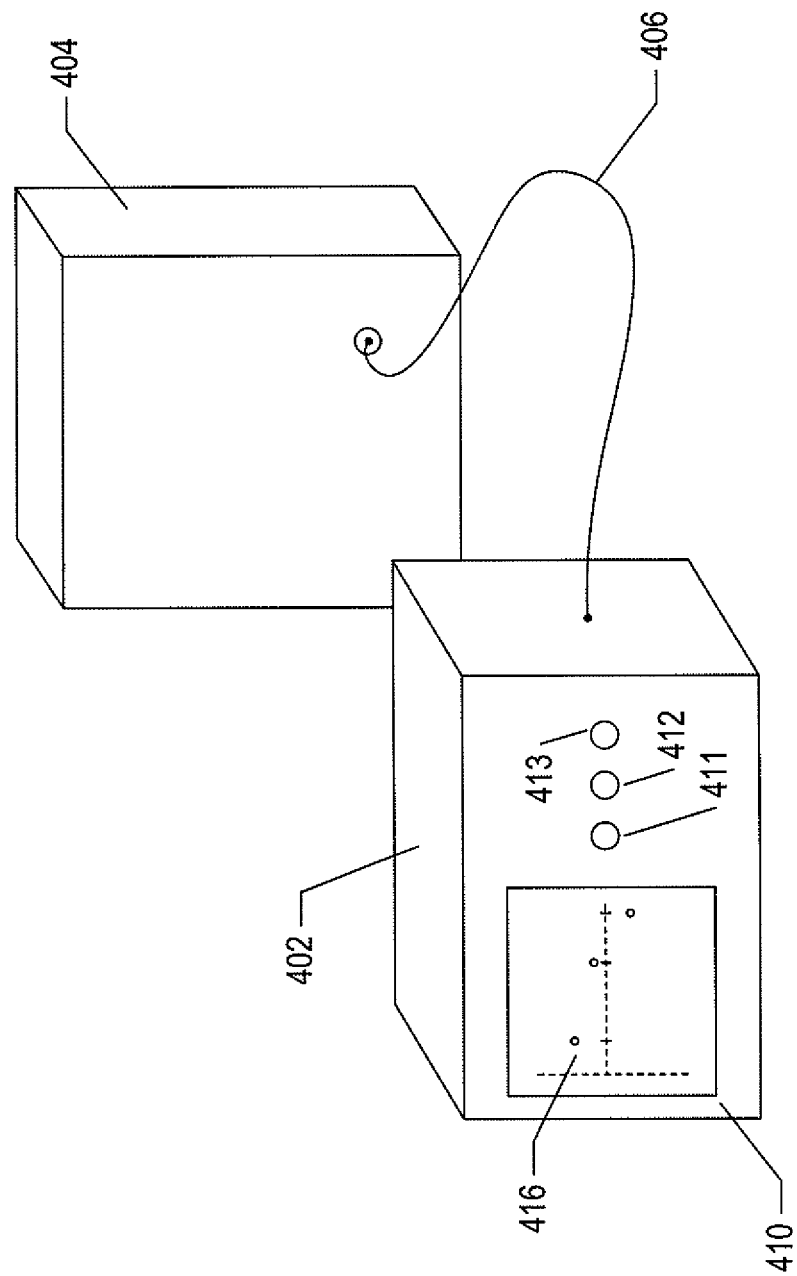
FIG. 4 illustrates a general class of intelligent controllers to which the current application is directed.

Presence-and/or-Absence Detection and Control Adjustment by Intelligent Controllers FIG. 4 illustrates a general class of intelligent controllers to which the current application is directed. The intelligent controller 402 controls a device, machine, system, or organization 404 via any of various different types of output control signals and receives information about the controlled entity and an environment from sensor output received by the intelligent controller from sensors embedded within the controlled entity 404, the intelligent controller 402, or in the environment. In FIG. 4, the intelligent controller is shown connected to the controlled entity 404 via a wire or fiber-based communications medium 406. However, the intelligent controller may be interconnected with the controlled entity by alternative types of communications media and communications protocols, including wireless communications. In many cases, the intelligent controller and controlled entity may be implemented and packaged together as a single system that includes both the intelligent controller and a machine, device, system, or organization controlled by the intelligent controller. The controlled entity may include multiple devices, machines, system, or organizations and the intelligent controller may itself be distributed among multiple components and discrete devices and systems. In addition to outputting control signals to controlled entities and receiving sensor input, the intelligent controller also provides a user interface 410-413 through which a human user can input immediate-control inputs to the intelligent controller as well as create and modify the various types of control schedules, and may also provide the immediate-control and schedule interfaces to remote entities, including a user-operated processing device or a remote automated control system. In FIG. 4, the intelligent controller provides a graphical-display component 410 that displays a control schedule 416 and includes a number of input components 411-413 that provide a user interface for input of immediate-control directives to the intelligent controller for controlling the controlled entity or entities and input of scheduling-interface commands that control display of one or more control schedules, creation of control schedules, and modification of control schedules.

To summarize, the general class of intelligent controllers to which the current is directed receive sensor input, output control signals to one or more controlled entities, and provide a user interface that allows users to input immediate-control command inputs to the intelligent controller for translation by the intelligent controller into output control signals as well as to create and modify one or more control schedules that specify desired controlled-entity operational behavior over one or more time periods. The user interface may be included within the intelligent controller as input and display devices, may be provided through remote devices, including mobile phones, or may be provided both through controller-resident components as well as through remote devices. These basic functionalities and features of the general class of intelligent controllers provide a basis upon which automated control-schedule learning, to which the current application is directed, can be implemented.

Figure 5:
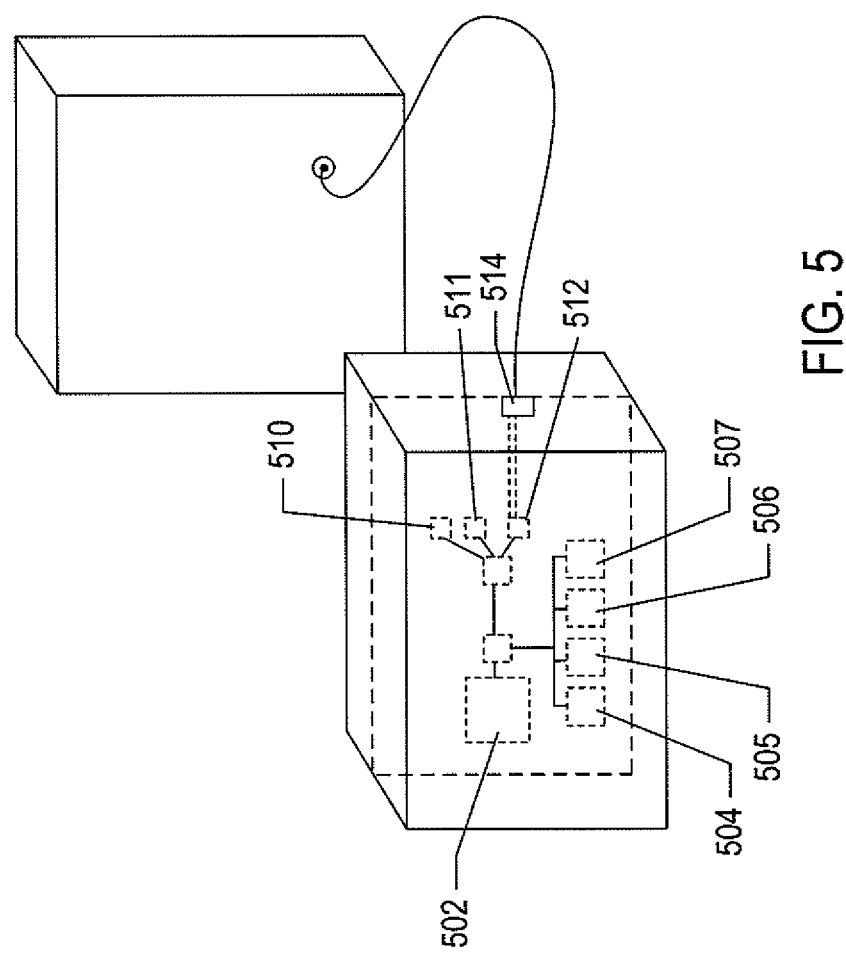
FIG. 5 illustrates additional internal features of an intelligent controller.

FIG. 5 illustrates additional internal features of an intelligent controller. An intelligent controller is generally implemented using one or more processors 502, electronic memory 504-507, and various types of microcontrollers 510-512, including a microcontroller 512 and transceiver 514 that together implement a communications port that allows the intelligent controller to exchange data and commands with one or more entities controlled by the intelligent controller, with other intelligent controllers, and with various remote computing facilities, including cloud-computing facilities through cloud-computing servers. Often, an intelligent controller includes multiple different communications ports and interfaces for communicating by various different protocols through different types of communications media. It is common for intelligent controllers, for example, to use wireless communications to communicate with other wireless-enabled intelligent controllers within an environment and with mobile-communications carriers as well as any of various wired communications protocols and media. In certain cases, an intelligent controller may use only a single type of communications protocol, particularly when packaged together with the controlled entities as a single system. Electronic memories within an intelligent controller may include both volatile and non-volatile memories, with low-latency, high-speed volatile memories facilitating execution of control routines by the one or more processors and slower, non-volatile memories storing control routines and data that need to survive power-on/power-off cycles. Certain types of intelligent controllers may additionally include mass-storage devices.

Figure 6:
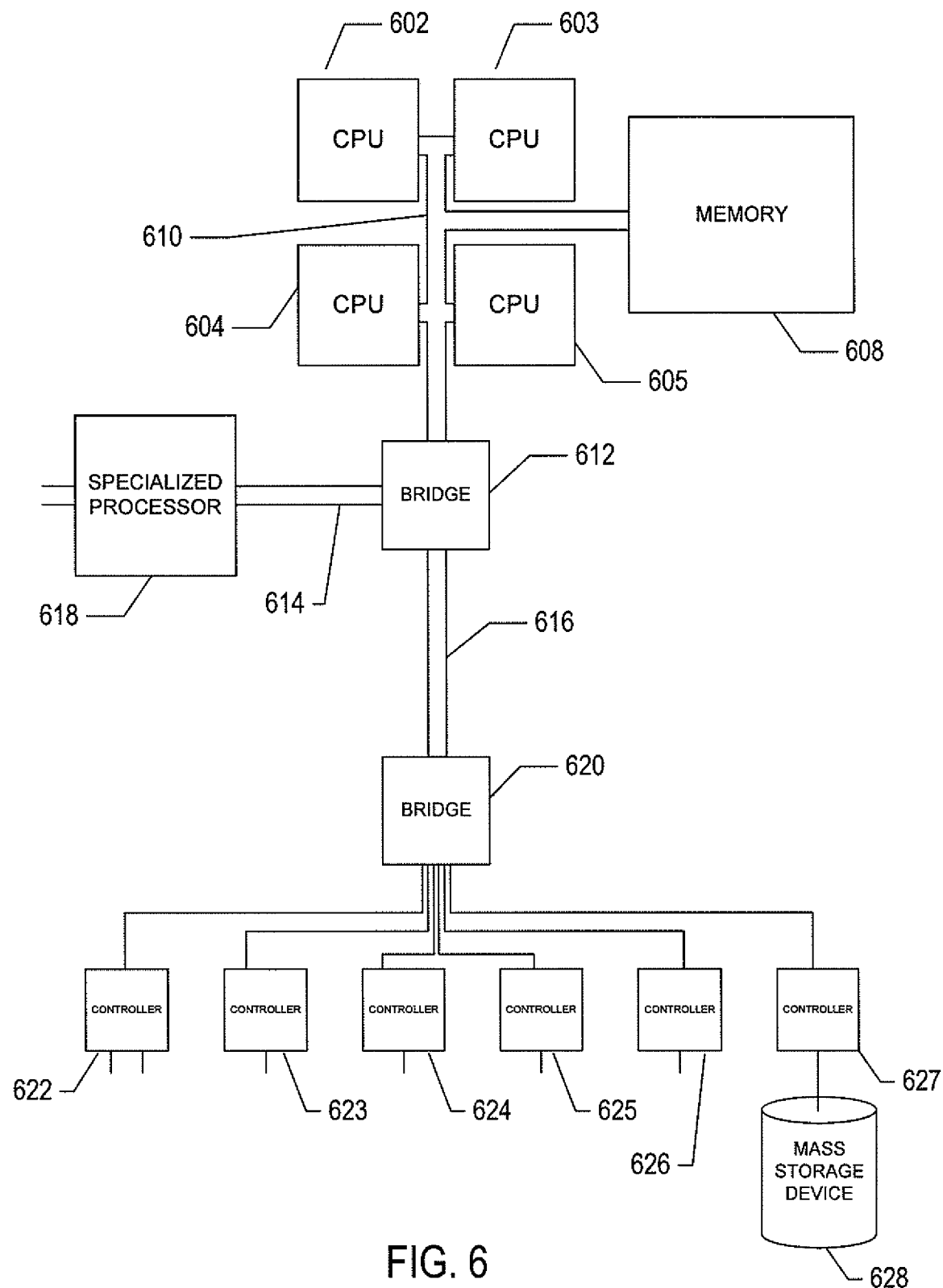
FIG. 6 illustrates a generalized computer architecture that represents an example of the type of computing machinery that may be included in an intelligent controller, server computer, and other processor-based intelligent devices and systems.

FIG. 6 illustrates a generalized computer architecture that represents an example of the type of computing machinery that may be included in an intelligent controller, server computer, and other processor-based intelligent devices and systems. The computing machinery includes one or multiple central processing units ("CPUs") 602-605, one or more electronic memories 608 interconnected with the CPUs by a CPU/memory-subsystem bus 610 or multiple busses, a first bridge 612 that interconnects the CPU/memory-subsystem bus 610 with additional busses 614 and 616 and/or other types of high-speed interconnection media, including multiple, high-speed serial interconnects. These busses and/or serial interconnections, in turn, connect the CPUs and memory with specialized processors, such as a graphics processor 618, and with one or more additional bridges 620, which are interconnected with high-speed serial links or with multiple controllers 622-627, such as controller 627, that provide access to various different types of mass-storage devices 628, electronic displays, input devices, and other such components, subcomponents, and computational resources.

Figure 7:
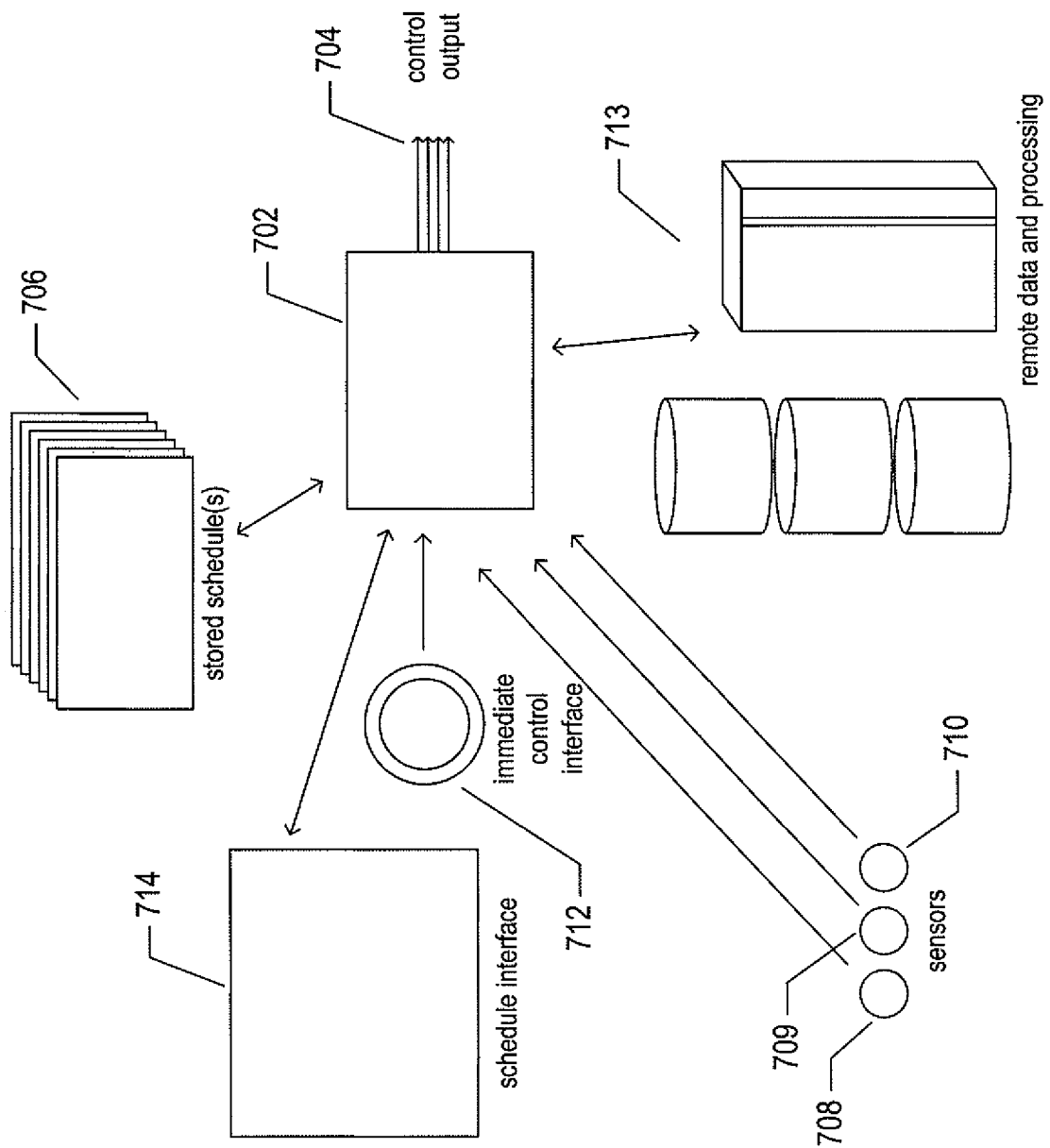
FIG. 7 illustrates features and characteristics of an intelligent controller of the general class of intelligent controllers to which the current application is directed.

FIG. 7 illustrates features and characteristics of an intelligent controller of the general class of intelligent controllers to which the current application is directed. An intelligent controller includes controller logic 702 generally implemented as electronic circuitry and processor-based computational components controlled by computer instructions stored in physical data-storage components, including various types of electronic memory and/or mass-storage devices. It should be noted, at the onset, that computer instructions stored in physical data-storage devices and executed within processors comprise the control components of a wide variety of modern devices, machines, and systems, and are as tangible, physical, and real as any other component of a device, machine, or system. Occasionally, statements are encountered that suggest that computer-instruction-implemented control logic is "merely software" or something abstract and less tangible than physical machine components. Those familiar with modern science and technology understand that this is not the case. Computer instructions executed by processors must be physical entities stored in physical devices. Otherwise, the processors would not be able to access and execute the instructions. The term "software" can be applied to a symbolic representation of a program or routine, such as a printout or displayed list of programming-language statements, but such symbolic representations of computer programs are not executed by processors. Instead, processors fetch and execute computer instructions stored in physical states within physical data-storage devices. Similarly, computer-readable media are physical data-storage media, such as disks, memories, and mass-storage devices that store data in a tangible, physical form that can be subsequently retrieved from the physical data-storage media.

The controller logic accesses and uses a variety of different types of stored information and inputs in order to generate output control signals 704 that control the operational behavior of one or more controlled entities. The information used by the controller logic may include one or more stored control schedules 706, received output from one or more sensors 708-710, immediate control inputs received through an immediate-control interface 712, and data, commands, and other information received from remote data-processing systems, including cloud-based data-processing systems 713. In addition to generating control output 704, the controller logic provides an interface 714 that allows users to create and modify control schedules and may also output data and information to remote entities, other intelligent controllers, and to users through an information-output interface.

Figure 8:
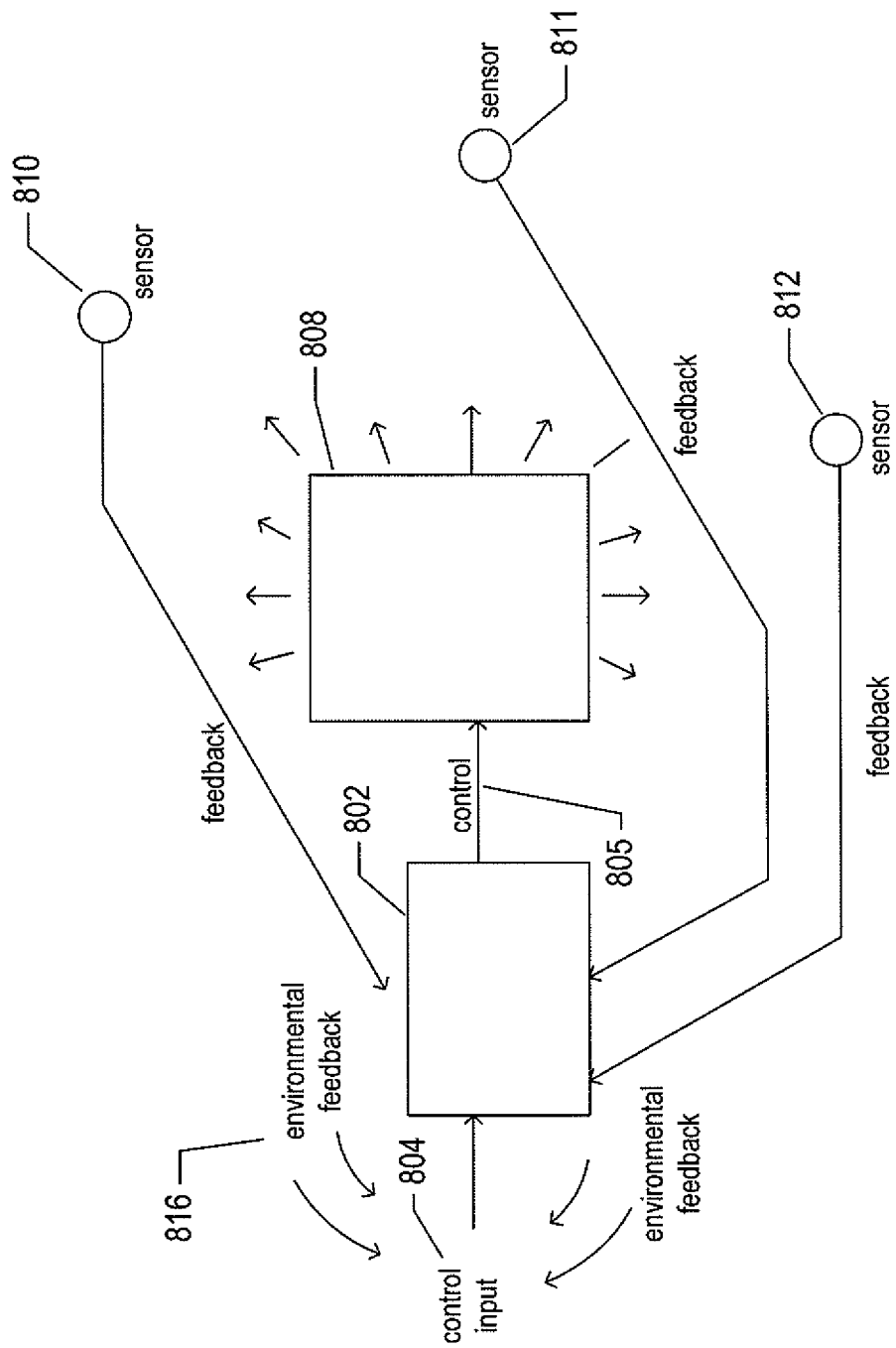
FIG. 8 illustrates a typical control environment within which an intelligent controller operates.

FIG. 8 illustrates a typical control environment within which an intelligent controller operates. As discussed above, an intelligent controller 802 receives control inputs from users or other entities 804 and uses the control inputs, along with stored control schedules and other information, to generate output control signals 805 that control operation of one or more controlled entities 808. Operation of the controlled entities may alter an environment within which sensors 810-812 are embedded. The sensors return sensor output, or feedback, to the intelligent controller 802. Based on this feedback, the intelligent controller modifies the output control signals in order to achieve a specified goal or goals for controlled-system operation. In essence, an intelligent controller modifies the output control signals according to two different feedback loops. The first, most direct feedback loop includes output from sensors that the controller can use to determine subsequent output control signals or control-output modification in order to achieve the desired goal for controlled-system operation. In many cases, a second feedback loop involves environmental or other feedback 816 to users which, in turn, elicits subsequent user control and scheduling inputs to the intelligent controller 802. In other words, users can either be viewed as another type of sensor that outputs immediate-control directives and control-schedule changes, rather than raw sensor output, or can be viewed as a component of a higher-level feedback loop.

Figure 9:
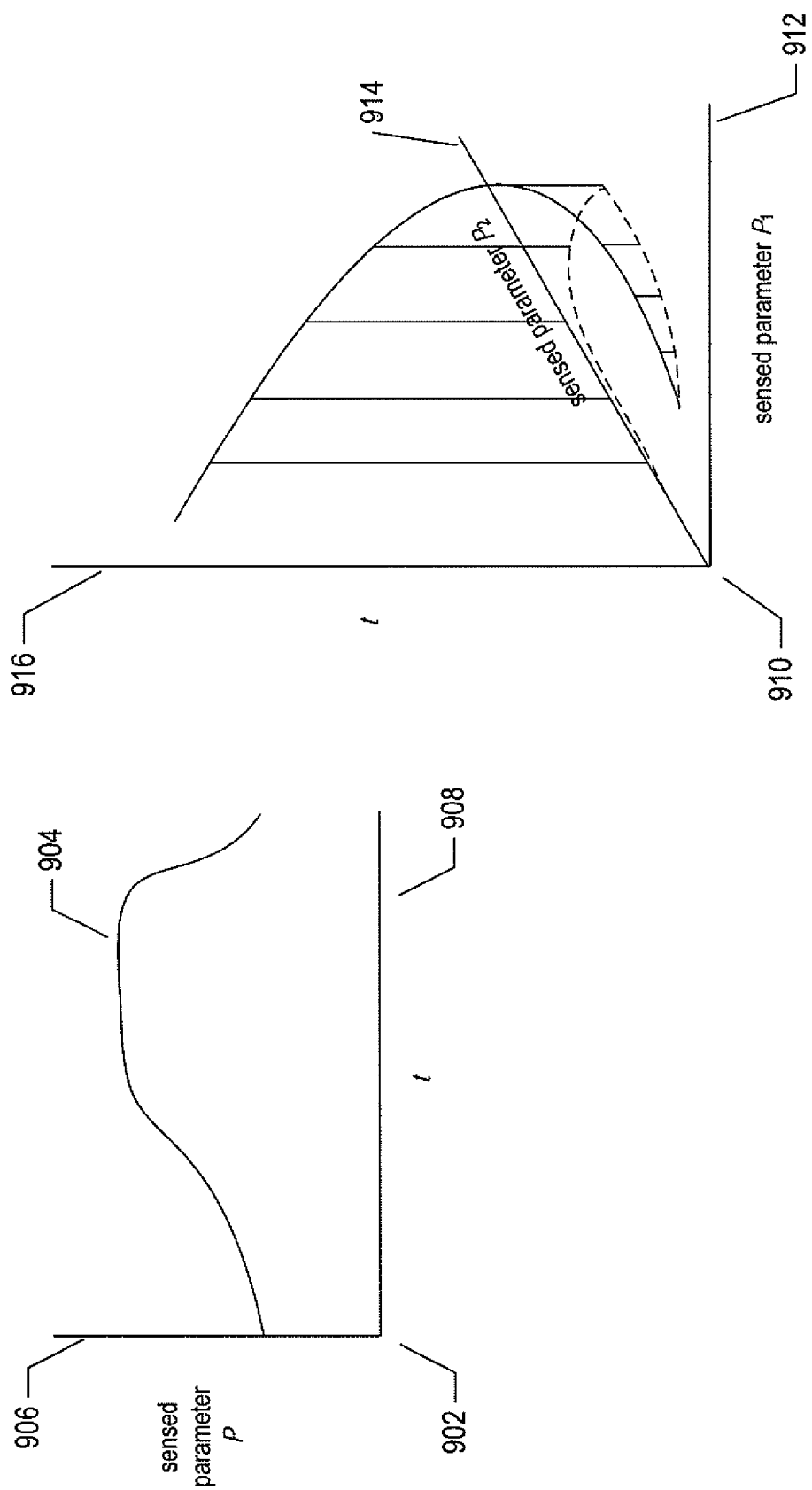
FIG. 9 illustrates the general characteristics of sensor output.

There are many different types of sensors and sensor output. In general, sensor output is directly or indirectly related to some type of parameter, machine state, organization state, computational state, or physical environmental parameter. FIG. 9 illustrates the general characteristics of sensor output. As shown in a first plot 902 in FIG. 9, a sensor may output a signal, represented by curve 904, over time, with the signal directly or indirectly related to a parameter P, plotted with respect to the vertical axis 906. The sensor may output a signal continuously or at intervals, with the time of output plotted with respect to the horizontal axis 908. In certain cases, sensor output may be related to two or more parameters. For example, in plot 910, a sensor outputs values directly or indirectly related to two different parameters P1 and P2, plotted with respect to axes 912 and 914, respectively, over time, plotted with respect to vertical axis 916. In the following discussion, for simplicity of illustration and discussion, it is assumed that sensors produce output directly or indirectly related to a single parameter, as in plot 902 in FIG. 9. In the following discussion, the sensor output is assumed to be a set of parameter values for a parameter P. The parameter may be related to environmental conditions, such as temperature, ambient light level, sound level, and other such characteristics. However, the parameter may also be the position or positions of machine components, the data states of memory-storage address in data-storage devices, the current drawn from a power supply, the flow rate of a gas or fluid, the pressure of a gas or fluid, and many other types of parameters that comprise useful information for control purposes.

Figure 10A:
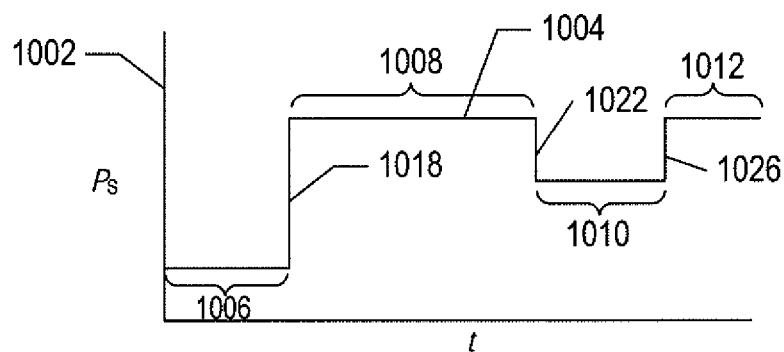
FIGS. 10A-D illustrate information processed and generated by an intelligent controller during control operations.

FIGS. 10A-D illustrate information processed and generated by an intelligent controller during control operations. All the figures show plots, similar to plot 902 in FIG. 9, in which values of a parameter or another set of control-related values are plotted with respect to a vertical axis and time is plotted with respect to a horizontal axis. FIG. 10A shows an idealized specification for the results of controlled-entity operation. The vertical axis 1002 in FIG. 10A represents a specified parameter value, Ps. For example, in the case of an intelligent thermostat, the specified parameter value may be temperature. For an irrigation system, by contrast, the specified parameter value may be flow rate. FIG. 10A is the plot of a continuous curve 1004 that represents desired parameter values, over time, that an intelligent controller is directed to achieve through control of one or more devices, machines, or systems. The specification indicates that the parameter value is desired to be initially low 1006, then rise to a relatively high value 1008, then subside to an intermediate value 1010, and then again rise to a higher value 1012. A control specification can be visually displayed to a user, as one example, as a control schedule.

A setpoint change may be stored as a record with multiple fields, including fields that indicate whether the setpoint change is a system-generated setpoint or a user-generated setpoint, whether the setpoint change is an immediate-control-input setpoint change or a scheduled setpoint change, the time and date of creation of the setpoint change, the time and date of the last edit of the setpoint change, and other such fields. In addition, a setpoint may be associated with two or more parameter values. As one example, a range setpoint may indicate a range of parameter values within which the intelligent controller should maintain a controlled environment. Setpoint changes are often referred to as "setpoints."

Figure 10B:
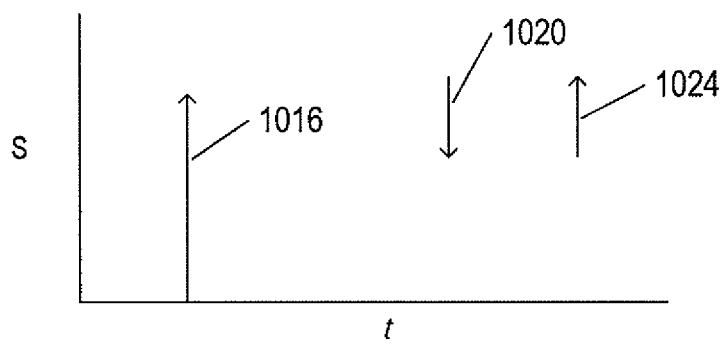

FIG. 10B shows an alternate view, or an encoded-data view, of a control schedule corresponding to the control specification illustrated in FIG. 10A. The control schedule includes indications of a parameter-value increase 1016 corresponding to edge 1018 in FIG. 10A, a parameter-value decrease 1020 corresponding to edge 1022 in FIG. 10A, and a parameter-value increase 1024 corresponding to edge 1016 in FIG. 10A. The directional arrows plotted in FIG. 10B can be considered to be setpoints, or indications of desired parameter changes at particular points in time within some period of time.

Figure 10C:
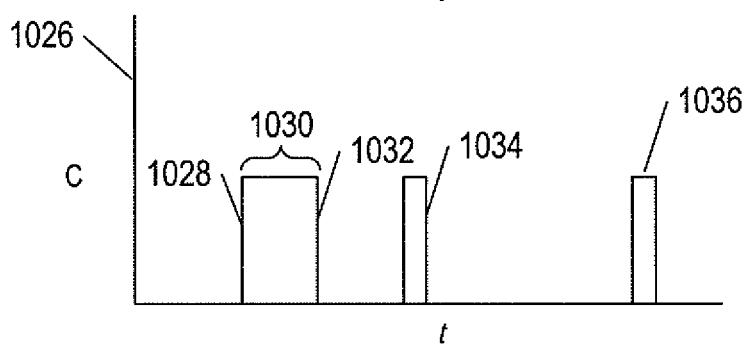

FIG. 10C illustrates the control output by an intelligent controller that might result from the control schedule illustrated in FIG. 10B. In this figure, the magnitude of an output control signal is plotted with respect to the vertical axis 1026. For example, the control output may be a voltage signal output by an intelligent thermostat to a heating unit, with a high-voltage signal indicating that the heating unit should be currently operating and a low-voltage output indicating that the heating system should not be operating. Edge 1028 in FIG. 10C corresponds to setpoint 1016 in FIG. 10B. The width of the positive control output 1030 may be related to the length, or magnitude, of the desired parameter-value change, indicated by the length of setpoint arrow 1016. When the desired parameter value is obtained, the intelligent controller discontinues output of a high-voltage signal, as represented by edge 1032. Similar positive output control signals 1034 and 1036 are elicited by setpoints 1020 and 1024 in FIG. 10B.

Figure 10D:
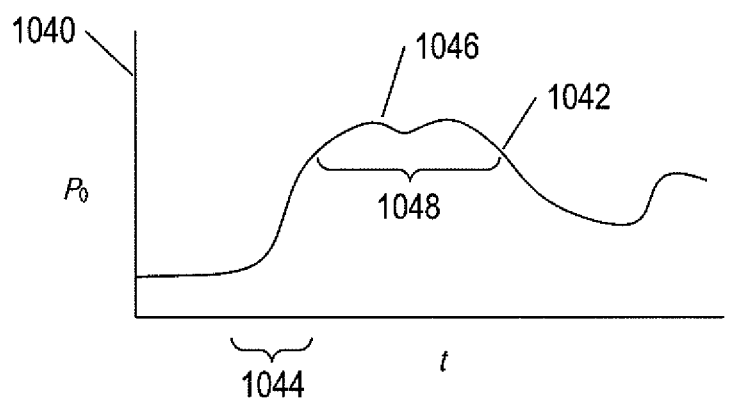

Finally, FIG. 10D illustrates the observed parameter changes, as indicated by sensor output, resulting from control, by the intelligent controller, of one or more controlled entities. In FIG. 10D, the sensor output, directly or indirectly related to the parameter P, is plotted with respect to the vertical axis 1040. The observed parameter value is represented by a smooth, continuous curve 1042. Although this continuous curve can be seen to be related to the initial specification curve, plotted in FIG. 10A, the observed curve does not exactly match that specification curve. First, it may take a finite period of time 1044 for the controlled entity to achieve the parameter-valued change represented by setpoint 1016 in the control schedule plotted in FIG. 10B. Also, once the parameter value is obtained, and the controlled entity directed to discontinue operation, the parameter value may begin to fall 1046, resulting in a feedback-initiated control output to resume operation of the controlled entity in order to maintain the desired parameter value. Thus, the desired high-level constant parameter value 1008 in FIG. 10A may, in actuality, end up as a time-varying curve 1048 that does not exactly correspond to the control specification 1004. The first level of feedback, discussed above with reference to FIG. 8, is used by the intelligent controller to control one or more control entities so that the observed parameter value, over time, as illustrated in FIG. 10D, matches the specified time behavior of the parameter in FIG. 10A as closely as possible. The second level feedback control loop, discussed above with reference to FIG. 8, may involve alteration of the specification, illustrated in FIG. 10A, by a user, over time, either by changes to stored control schedules or by input of immediate-control directives, in order to generate a modified specification that produces a parameter-value/time curve reflective of a user's desired operational results.

There are many types of controlled entities and associated controllers. In certain cases, control output may include both an indication of whether the controlled entity should be currently operational as well as an indication of a level, throughput, or output of operation when the controlled entity is operational. In other cases, the control out may be simply a binary activation/deactivation signal. For simplicity of illustration and discussion, the latter type of control output is assumed in the following discussion.

Figure 11:
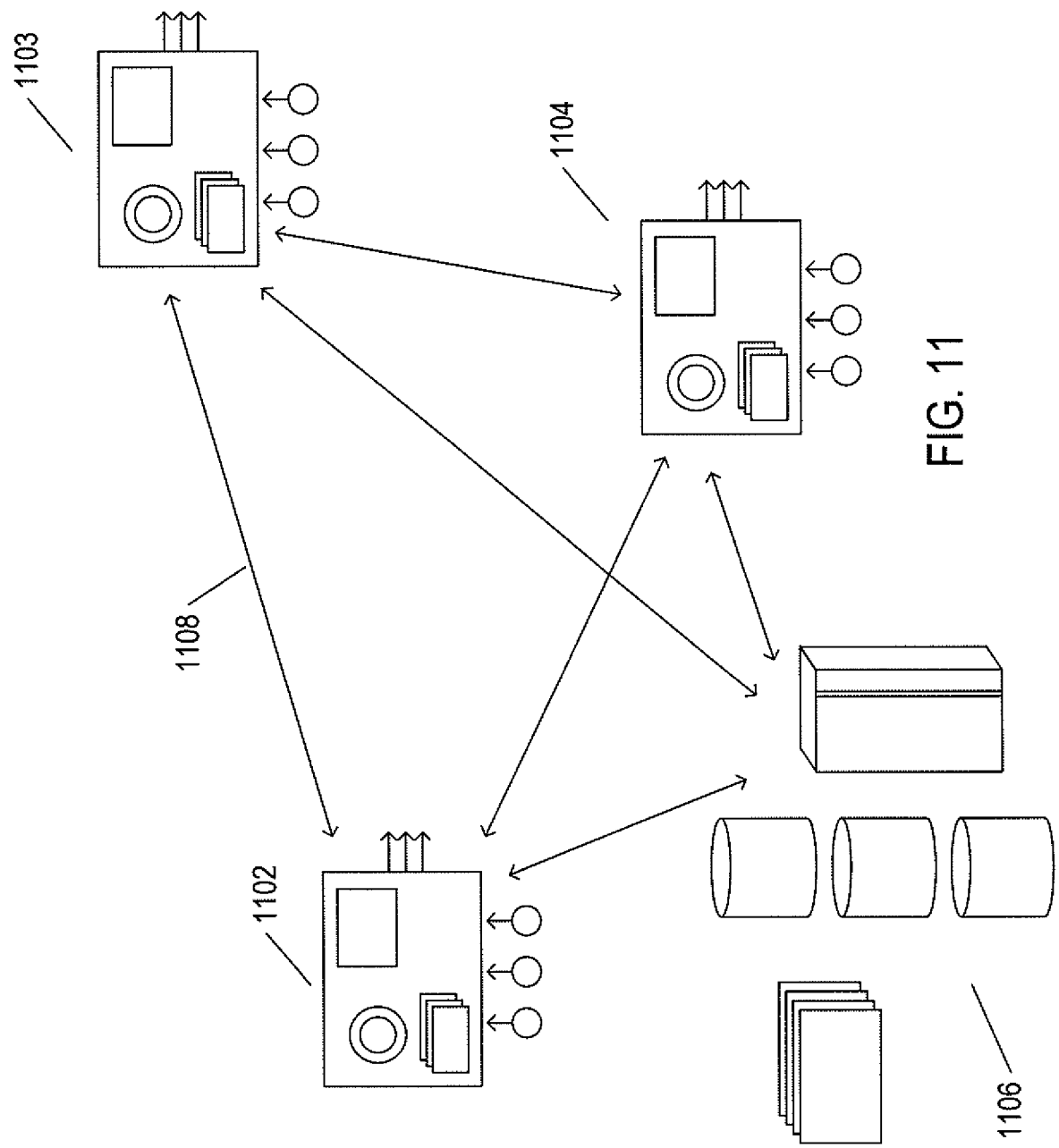
FIG. 11 illustrates a distributed-control environment.

FIG. 11 illustrates a distributed-control environment. The intelligent controller discussed with reference to FIGS. 4-8, above, is discussed in the context of a single controller within an environment that includes, or that is operated on by, a system controlled by the intelligent controller. However, as shown in FIG. 11, multiple intelligent controllers 1102-1104, in certain implementations in cooperation with a remote computing system 1106, may together control one or more systems that operate on an environment in which the multiple intelligent controllers are located or that is controlled remotely by the multiple intelligent controllers. As discussed further, below, the multiple intelligent controllers may control one or more systems with various degrees of control distribution and cooperation. In general, as indicated by double-headed arrows in FIG. 11, such as double-headed arrow 1108, each intelligent controller exchanges data with the remaining intelligent controllers of the multiple intelligent controllers and all of the intelligent controllers exchange data with the remote computing system. In certain cases, one or a subset of the multiple controllers acts as a local router or bridge on behalf of the remaining intelligent controllers of the multiple intelligent controllers so that data and messages sent from a first intelligent controller to a target intelligent controller or target remote computing system can be transmitted to, and forwarded by, a second intelligent controller acting as a router or bridge to the target.

Figure 12:
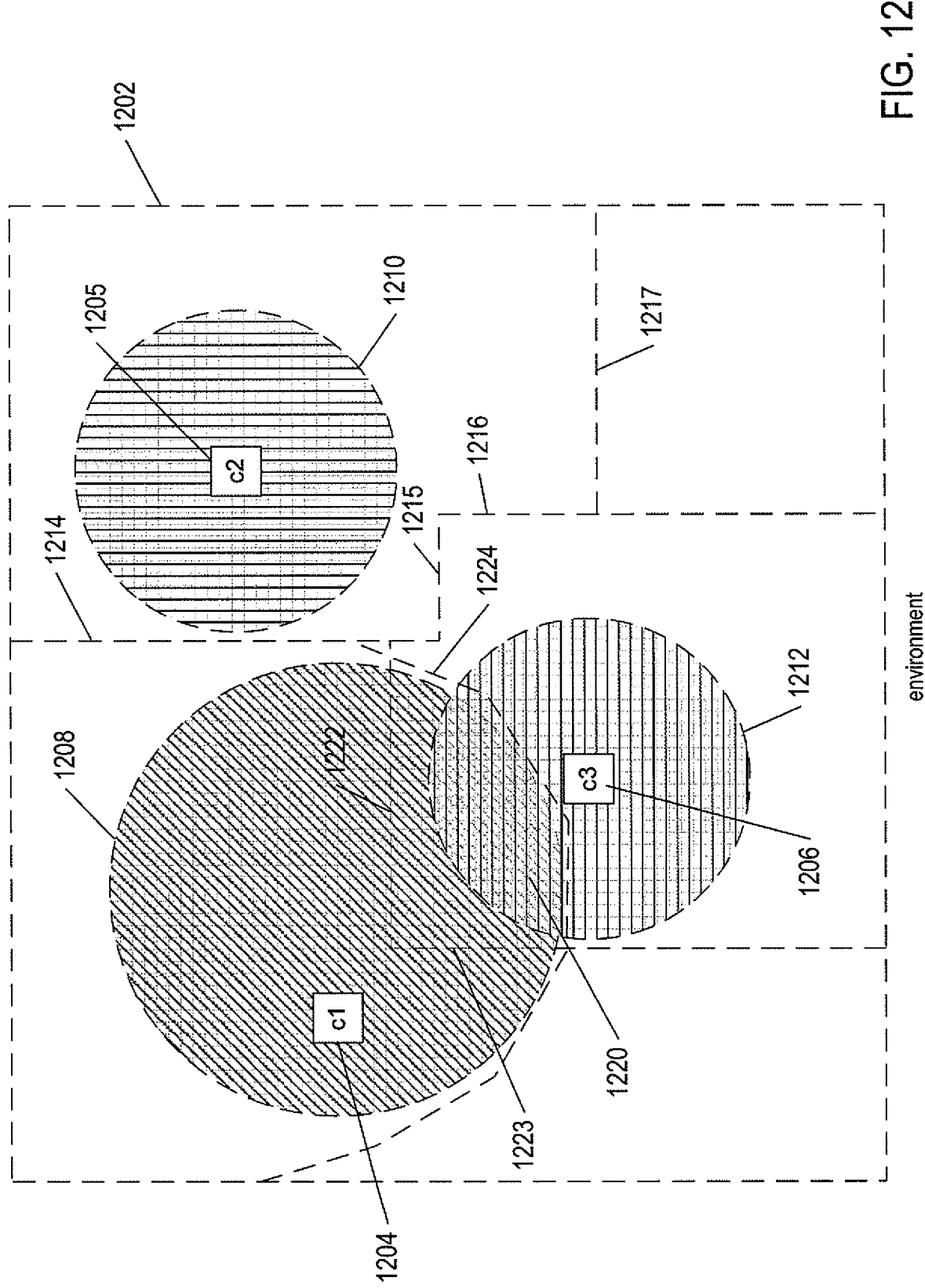
FIG. 12 illustrates sensing and inference regions associated with each controller of a set of multiple controllers within an environment.

FIG. 12 illustrates sensing and inference regions associated with each controller of a set of multiple controllers within an environment. The environment controlled by the multiple controllers is represented, in FIG. 12, by an outer dashed rectangle 1202. The environment includes three controllers 1204-1206. In certain implementations, rather than intelligent controllers, the environment contains sensors that communicate with corresponding remote intelligent controllers. In the present discussion, for simplicity of description, the intelligent controllers are discussed as residing within the environment that they control, but as indicated in the preceding statement, they may be physically located outside of the environment which they control. Each controller uses one or more sensors to receive sensor output that allows the controller to directly measure or detect characteristics or parameters of the environment within a region of direct perception. The region of direct perception for the controller c1 1204 is shown as a cross-hatched disk-shaped region 1208. The regions of direct perception for controllers c2 and c3 are similarly shown as cross-hatched disk-shaped regions 1210 and 1212, respectively. In the environment illustrated in FIG. 12, each controller may be responsible for directly measuring characteristics and parameters of the environment or inferring the characteristics and the parameters of the environment within a perception region. In FIG. 12, the perception regions of the three controllers are indicated by dashed lines and contain the corresponding regions of direct perception. For example, the perception region for controller c2 is bounded by the environment boundary 1202 and dashed-lines 1214-1217. As can be seen in FIG. 12, both regions of direct perception and perception regions corresponding to different controllers may overlap. For example, the doubly cross-hatched region 1220 represents the overlap of the regions of direct perception associated with controllers c1 1204 and c3 1206. Similarly, the region bounded by dashed-line segments 1222-1224 represents an overlap of the perception regions associated with controllers c1 and c3.

FIG. 12 shows that distributed control of an environment with multiple intelligent controllers may be associated with complex considerations. An intelligent controller may be responsible for sensing a portion of the environment, referred to above as the "perception region" associated with the intelligent controller, that exceeds a region directly accessible by the intelligent controller through sensors, referred to above as the "region of direct perception." In order to provide various types of determinations needed for control decisions with respect to the perception region, the intelligent controller may use various rules and differencing techniques to extend determinations based on sensor output to the larger perception region. When an intelligent controller includes multiple sensors, the intelligent controller may also carry out various types of probabilistic determinations with regard to inconsistencies in sensor outputs for multiple sensors, and may continuously calibrate and verify sensor data with independent determinations of environmental characteristics and parameters inferred from sensor output. When perception regions and regions of direct perception associated with multiple controllers overlap, distributed control may involve employing multiple determinations by multiple controllers and resolving conflicting determinations. In many cases, inferences made by one controller based on incomplete sensor data available to the controller may be strengthened by supplemental data relevant to the determinations supplied by other intelligent controllers.

Figure 13:
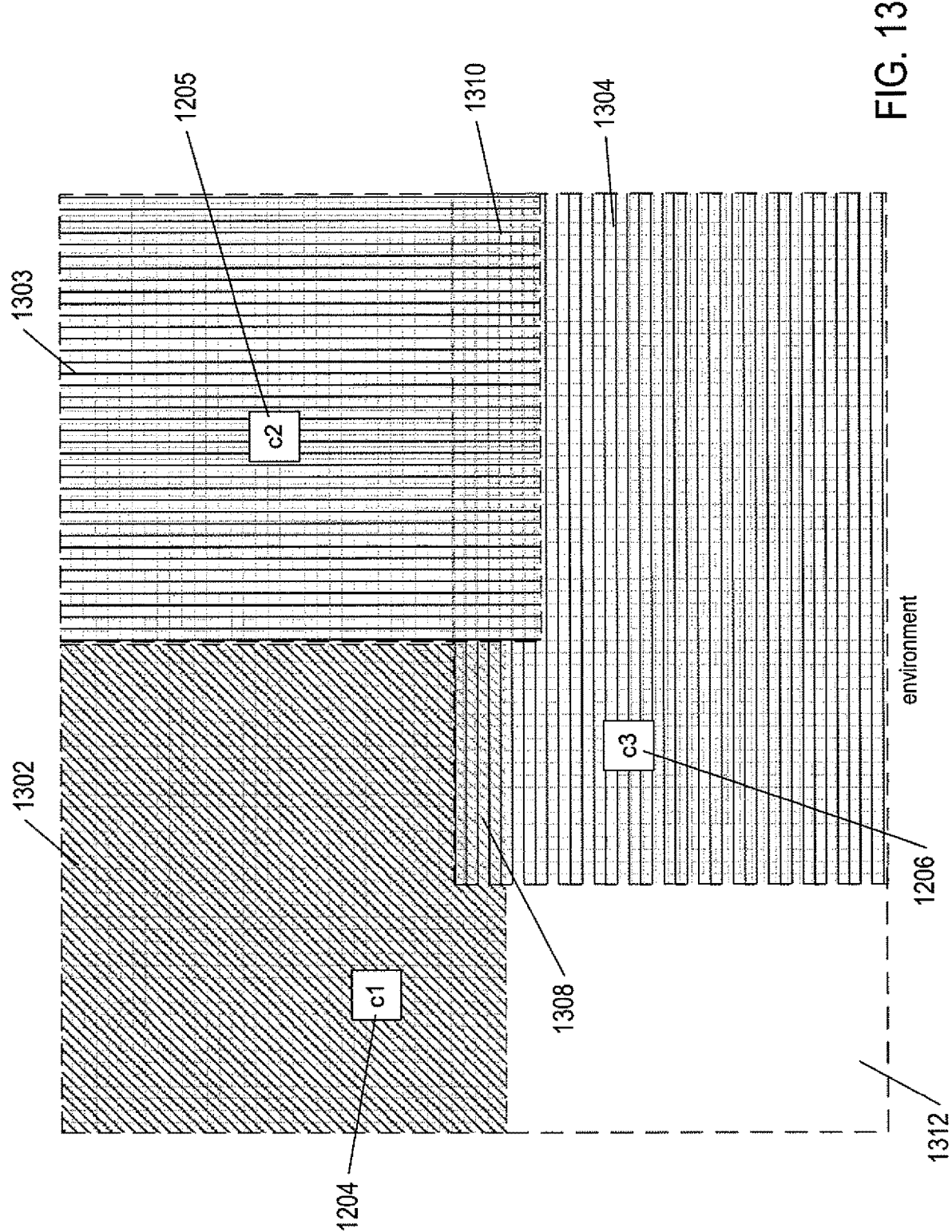
FIG. 13 illustrates control domains within an environment controlled by multiple intelligent controllers.

FIG. 13 illustrates control domains within an environment controlled by multiple intelligent controllers. In the environment illustrated in FIGS. 12 and 13, each of the three intelligent controllers 1204-1206 is associated with a control domain, indicated by cross-hatching. In the example shown in FIG. 13, the three control domains 1302-1304 associated with intelligent controllers 1204-1206, respectively, are rectangularly shaped. The control domains associated with intelligent controllers c1 1204 and c3 1206 overlap within a first doubly cross-hatched region 1308 and the control domains associated with controllers c2 1205 and c3 1206 overlap in a second doubly cross-hatched domain 1310.

The concept of control domains adds further complexity to the distributed control of an environment by multiple intelligent controllers. Intelligent controllers use determinations of various characteristics and parameters of the environment from sensor data and electronically stored information, including control schedules, historical sensor data, and historical determinations of environmental characteristics and parameters, to intelligently control one or more systems to provide desired characteristics and parameters within the control domain associated with the intelligent controller. However, because control domains may overlap, and because a portion of an environment, such as region 1312 in FIG. 13, may not be subject to direct control by any intelligent controller through control of one or more systems, many complex distributed-control decisions are made and many tradeoffs considered in order to provide intelligent distributed control over an environment. As one example, intelligent controllers c1 and c3 may end up controlling their individual control domains somewhat suboptimally in order to prevent unacceptable characteristics and parameter values from arising in the region of overlap 1308 between their control domains. Furthermore, because control domains may not be strictly coextensive with perception regions, complex control decisions may be undertaken to indirectly control portions of an environment external to individual control domains.

In FIGS. 12 and 13, the regions of direct perception, perception regions, and control domains are shown as areas within an environment. In certain intelligent-control problem domains, the regions of direct perception, perception regions, and control domains may be subvolumes within a larger environmental volume. For example, a single-story residence may be adequately described in terms of areas within a total residence area, while a multi-story apartment building may require consideration of subvolumes within a larger volume comprising all of the apartments in the multi-story apartment building. In the following discussion, an area view, rather than a volume view, of intelligent control is adopted, for clarity and ease of illustration and discussion.

The current application is directed to intelligent controllers that directly and indirectly sense the presence of one or more different types of entities within associated perception regions within their environment and then make, either alone or in distributed fashion together with other intelligent controllers and/or remote computers, control-schedule adjustments and may undertake additional activities and tasks depending on whether the one or more entities are present or absent within the environment, as a whole, or within certain portions of the environment. In the following discussion, intelligent controllers that determine the presence of human beings within environments controlled by the intelligent controllers are discussed, as one example. However, the presence or absence of any of a variety of other types of entities may be detected by intelligent controllers and the detection used to adjust control schedules or undertake additional activities. For example, intelligent controllers in manufacturing environment may detect the presence of subassemblies within or near automated assembly stages and accordingly control automated assembly stages to carry out various manufacturing processes on the subassemblies. Various types of automobile-traffic-related intelligent controllers may detect the presence or absence of automobiles in particular regions and accordingly control signal lights, drawbridges, street lighting, and other devices and systems.

Intelligent controllers that detect the presence and/or absence of human beings in an environment or a portion of an environment generally construct and maintain a continuously updated presence-probability map or scalar presence-probability indication, with continuous updating including updating the probability map or scalar indication after each new sensor reading, after a threshold-level change in sensor readings, at regular intervals, after expiration of timers or after fielding interrupts, or on many other temporal bases. The presence-probability maps or scalar indications are then used for adjustment of control schedules and launching of any of various control operations dependent on the presence or absence of human beings in the overall environment or regions of the environment controlled by the intelligent controllers. Note the phrase "presence probability" may refer to either the probability of one or more entities being present in an area or volume or the probability of one or more entities being absent from a an area or volume, equivalent to interchanging the polarity of a probability interval[0, 1].

Figure 14A:
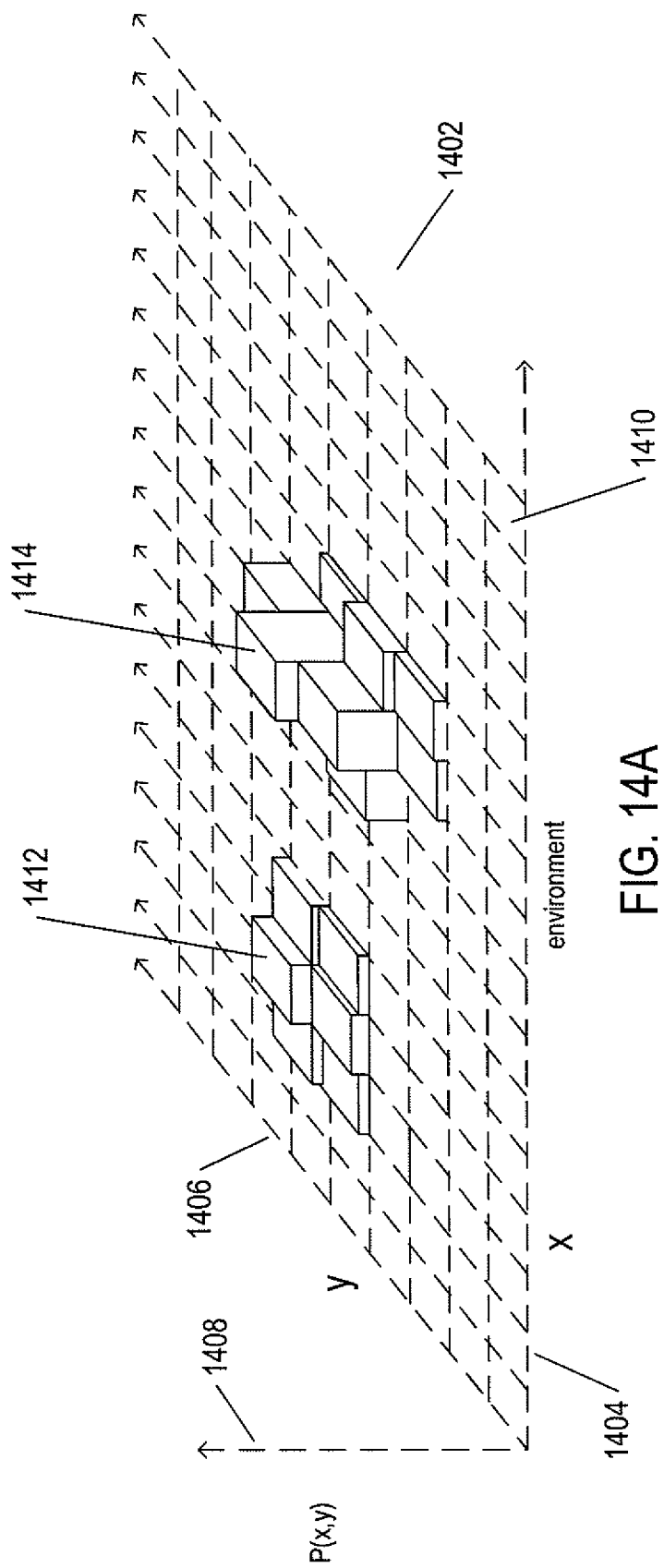
FIGS. 14A-C illustrate various types of electronically stored presence-probability information within one or more intelligent controllers and/or remote computer systems accessible to the one or more intelligent controllers.
Figure 14B:
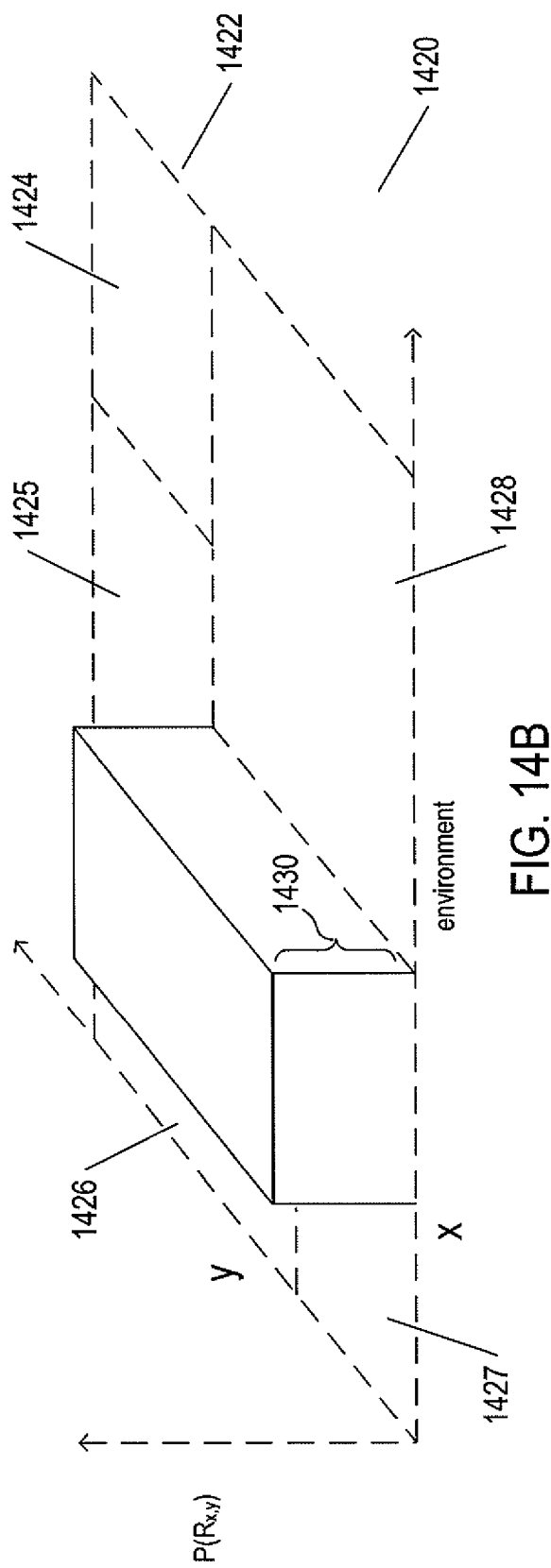
Figure 14C:
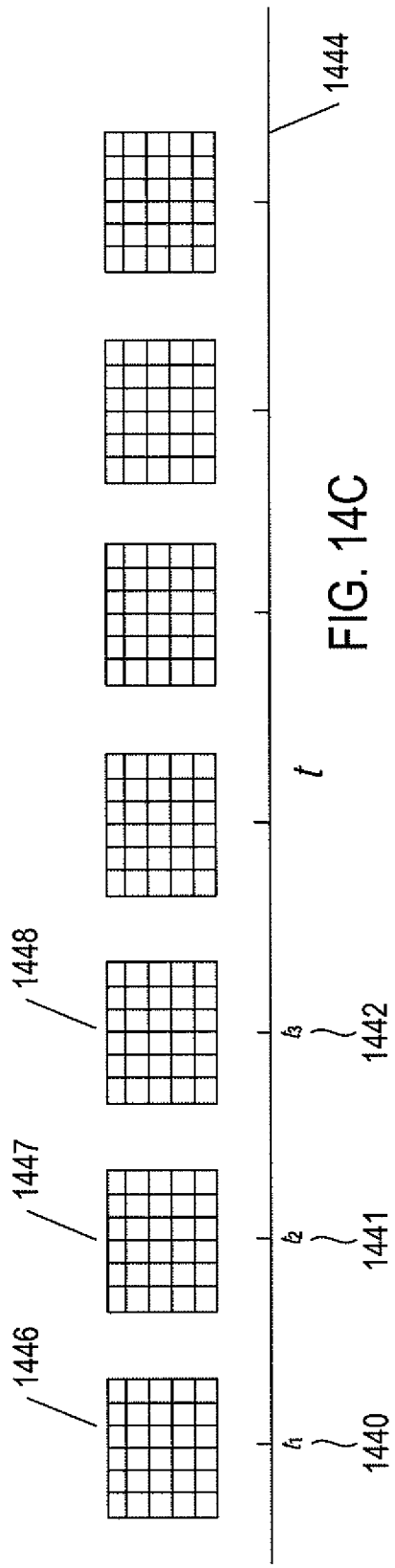

FIGS. 14A-C illustrate various types of electronically stored presence-probability information within one or more intelligent controllers and/or remote computer systems accessible to the one or more intelligent controllers. FIG. 14A shows a presence-probability map for a region of an environment associated with an intelligent controller. In the example shown in FIG. 14A, the region 1402 is rectangular, and points within the region are described by coordinates of a rectangular Cartesian coordinate system that includes an x axis 1404 and a y axis 1406. The vertical axis 1408 represents the probability P(x,y) that a human being is present at the position (x,y) within the region 1402. Commonly, the region may be divided in grid-like fashion into a two-dimensional array of smallest-granularity subregions, such as subregion 1410. For those subregions associated with a non-zero presence probability, the height of a column rising from a subregion represents the probability that a human being is currently present within that subregion. Thus, in the example shown in FIG. 14A, there is a non-zero probability that a human being is present within a first subregion 1412 and a second subregion 1414 within the region 1402 described by the presence-probability map. In many cases, the probability map is normalized, so that integration of the column volumes for the entire presence-probability map provides a cumulative presence probability for the entire environment in the range [0,1]. However, other types of normalizations are possible, and, for many control decisions, normalization is not required.

FIG. 14B illustrates a different type of presence-probability map. In the presence-probability map 1420 shown in FIG. 14B, a rectangle 1422 representing an entire environment or a portion of an environment controlled by an intelligent controller is subdivided into subregions 1424-1428. In this presence-probability map, the height 1430 of a column rising from a subregion represents the probability that a human being is present in that subregion. In general, this second type of presence-probability map is more coarsely grained than the presence-probability map illustrated in FIG. 14A, and the smallest-granularity subregions are regularly sized or regularly positioned within the region or environment 1422 described by the presence-probability map. As one example, a presence-probability map of this type may be used for a residential environment, with each subregion corresponding to a room in the residence.

In general, as indicated above, an intelligent controller maintains a presence-probability map over time, adjusting the presence-probability map, at intervals, to reflect a best estimate for the probability of the presence of a human being in subregions of the map based on current sensor readings, historical, electronically stored information, and information obtained from remote sources. FIG. 14C illustrates a presence-probability map maintained by an intelligent controller over time. At each of various points of time, including the points of time labeled $t_1$ 1440, $t_2$ 1441, and $t_3$ 1442 along a horizontal time axis 1444, the intelligent controller has prepared a presence-probability map, including presence-probability maps 1446-1448 corresponding to time points $t_1$, $t_2$, and $t_3$.

Figure 14D:
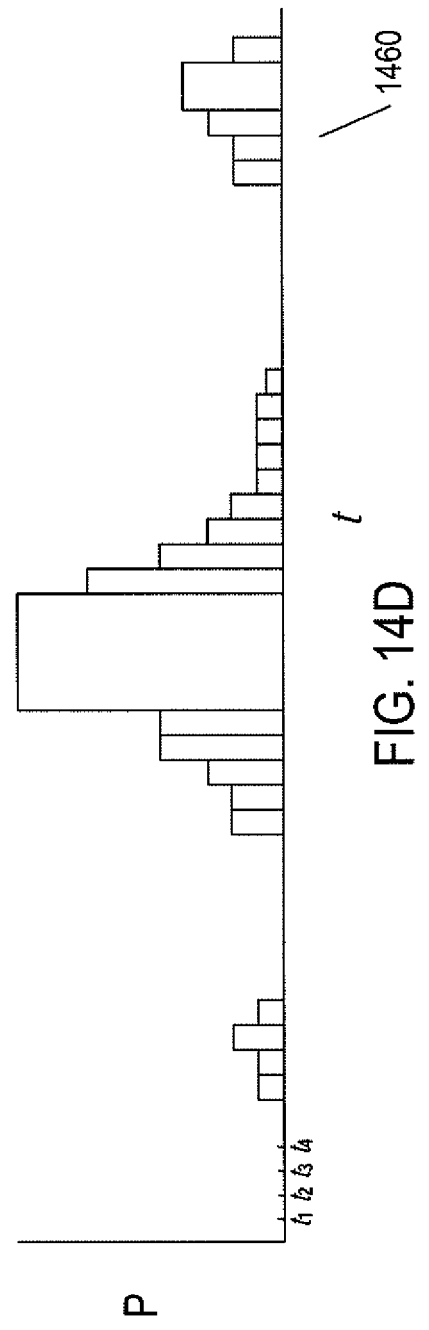
FIG. 14D illustrates a portion of a time line along which computed scalar presence-probability values are shown as columns above time intervals.

In certain cases, one or more intelligent controllers may make a single, scalar determination of the probability of the presence of a human being within an entire environment, and compute the scalar presence-probability value at intervals, over time. FIG. 14D illustrates a portion of a time line 1460 along which computed scalar presence-probability values are shown as columns above time intervals.

Figure 15:
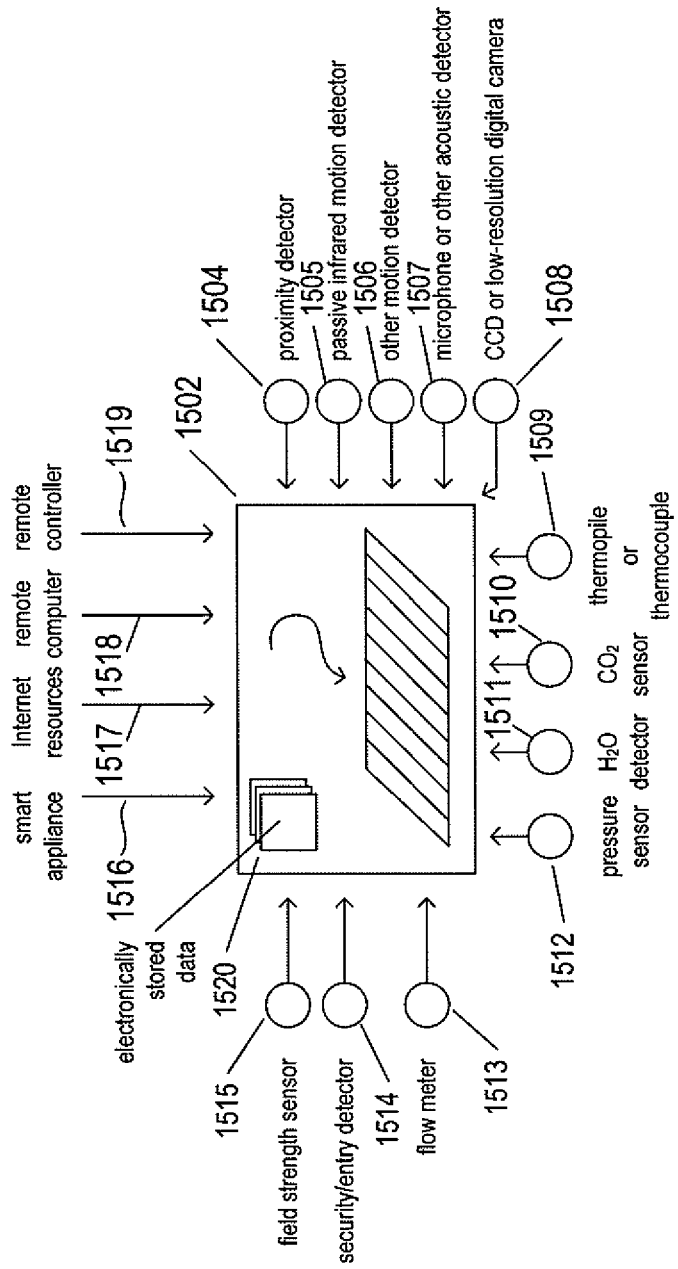
FIG. 15 illustrates some of the many different types of received and electronically stored information that may be used by an intelligent controller in order to determine the probability of presence of a human being in an entire environment or within subregions or at certain points of the environment.

An intelligent controller may use any of many different types of received and/or electronically stored data in order to construct presence-probability maps and scalar values, discussed above with reference to FIGS. 4A-D. FIG. 15 illustrates some of the many different types of received and electronically stored information that may be used by an intelligent controller in order to determine the probability of presence of a human being in an entire environment or within subregions or at certain points of the environment. In FIG. 15, rectangle 1502 represents an intelligent controller. Unfilled circles, such as unfilled circle 1504, represent sensors. Arrows, such as arrow 1516, represent data input. In addition to sensor data and data input from remote information and data sources, the intelligent controller may also internally store many different types of data 1520, including historical sensor data, non-current presence-probability scalars and maps, historical determinations of the presence and/or absence of humans, control schedules, control inputs, and many other different types of data.

Various types of sensors useful for making determinations with regard to the presence or absence of human beings in an environment include proximity detectors 1504, passive infrared ("PIR") motion detectors 1505, other types of motion detectors 1506, microphones or other types of acoustic detectors 1507, charge-coupled detectors ("CCD") or low-resolution digital cameras 1508, thermopiles or thermocouples 1509, carbon dioxide sensors 1510, water-vapor detectors 1511, pressure sensors 1512, various types of flow meters 1513, security/entry detectors within home-security systems 1514, and various types of field-strength sensors that sense magnetic and electrical fields 1515. Proximity detectors include a wide variety of different types of sensors, including capacitive, capacitive-displacement, conductive, magnetic, optical, thermal, sonar, and other types of sensors. PIR motion-detector sensors detect abrupt changes in temperatures based on infrared radiation emitted by living creatures. Other types of motion detectors include ultrasonic, microwave, and tomographic motion detectors. Acoustic detectors can detect various types of sounds or sound patterns indicative of the presence of human beings. Low-resolution cameras and CCD devices may detect changes in ambient light, including changes in ambient light due to moving objects. Thermopiles and thermocouples can be used to detect changes in temperature correlated with the presence of human beings and other living organisms. Similarly, carbon-dioxide and water-vapor detectors may detect gasses exhaled by human beings and other living creatures. Pressure sensors may detect changes in pressure within an environment due to opening and closing of doors, windows, motion of large objects through the air, and other such pressure changes. Flow meters may detect the rate of flow of water, natural gas, and other gasses and liquids that flow under positive control by human beings. Various types of security-system entry detectors may be used to detect ingress and egress of occupants into and out from an environment. Field-strength sensors may detect temporal changes in field strength correlated with presence of human beings or motion of human beings through an environment.

An intelligent controller may receive data inputs from various smart appliances within an environment that indicate the presence of human beings as well as location-monitoring mobile phones and other such appliances 1516, information from a variety of Internet resources 1517 in which presence-and/or-absence information can be gleaned, information from a remote computer system 1518, as, for an example, a remote computer system to which various intelligent-control tasks and data is distributed, and various remote controllers 1519, including other intelligent controllers within an environment controlled by multiple intelligent controllers.

Figure 16:
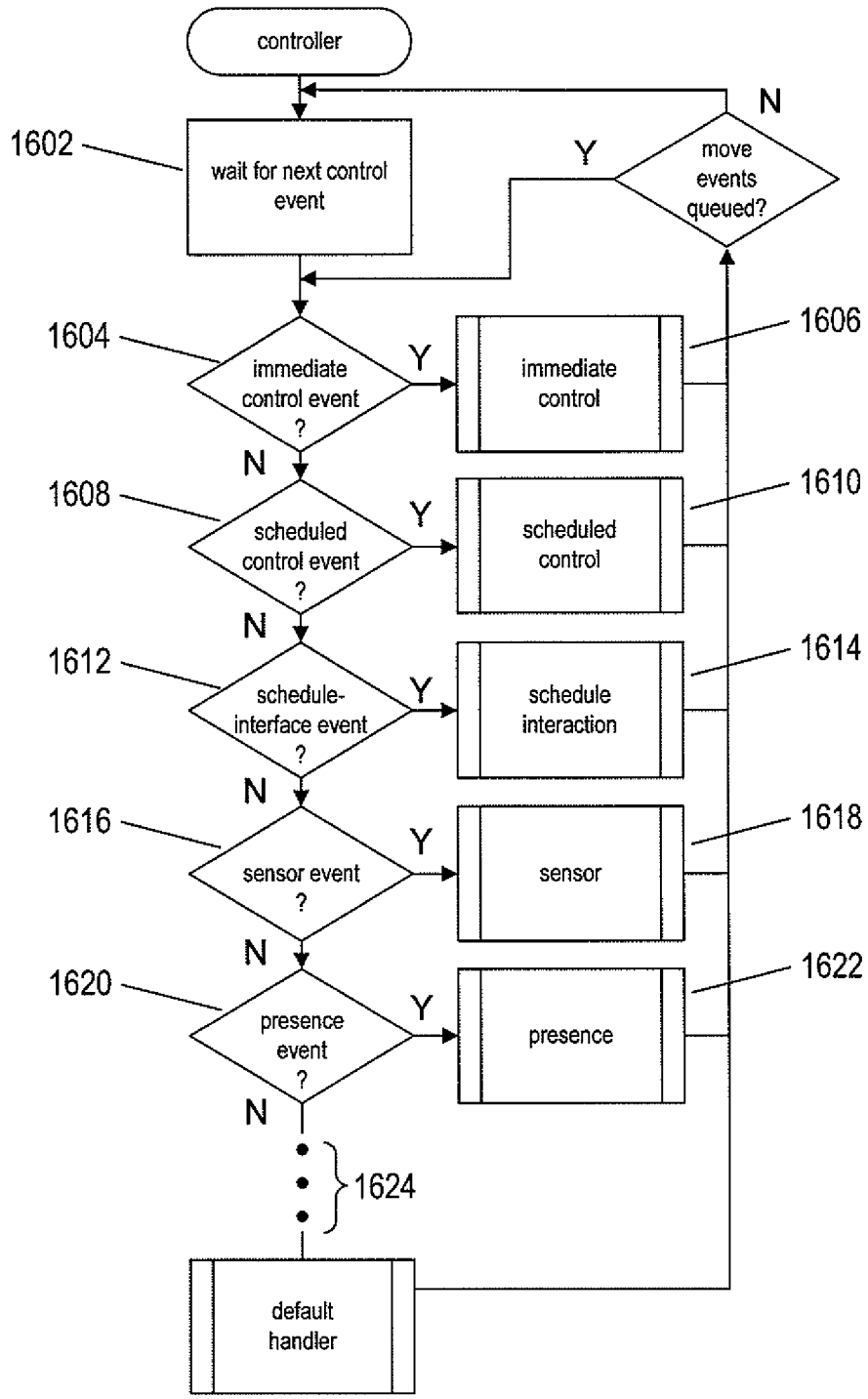
FIG. 16 illustrates a control-flow diagram for intelligent-controller operation.

FIG. 16 illustrates a control-flow diagram for intelligent-controller operation. In general, an intelligent controller, at a high level, continuously operates within the context of an event handler or event loop. In step 1602, the intelligent controller waits for a next control event. When the next control event occurs, then, in a series of conditional statements, the intelligent controller determines the type of event and invokes a corresponding control routine. In the case of an immediate-control event, as determined in step 1604, the intelligent controller calls an immediate-control routine, in step 1606, to carry out the intelligent controller's portion of a user interaction to receive one or more immediate-control inputs that direct the intelligent controller to issue control signals, adjust a control schedule, and/or carry out other activities specified by a user through an intermediate-control interface. In the case that the control event is a scheduled control event, such as when the current time corresponds to a time at which a control schedule specifies a control activity to be undertaken, as determined in step 1608, then a schedule-control routine is called, in step 1610, to carry out the scheduled control event. When the control event is a schedule-interface event, as determined in step 1612, then the intelligent controller invokes a schedule-interaction routine, in step 1614, to carry out the intelligent controller's portion of a schedule-input or schedule-change dialog with the user through a schedule interface. In the case that the control event is a sensor event, as determined in step 1616, then a sensor routine is called by the intelligent controller in step 1618 to process the sensor event. Sensor events may include interrupts generated by a sensor as a result of a change in sensor output, expiration of timers set to awaken the intelligent controller to process sensor data of a next-scheduled sensor-data-processing interval, and other such types of events. When the event is a presence event, as determined in step 1620, then the intelligent controller calls a presence routine, in step 1622. A presence event is generally a timer expiration, interrupt, or other such event that informs the intelligent controller that it is time to determine a next current probability-presence scalar value or to construct a next current probability-presence map. As indicated by the ellipsis 1624 in FIG. 16, many additional types of control events may occur and may be handled by an intelligent controller, including various types of error events, communications events, power-on and power-off events, and a variety of events generated by internal set components of the intelligent controller.

There are many different models that describe how various different intelligent controllers respond to detected presence and/or absence of human beings. As discussed above, during intelligent-controller operation, the intelligent controller continuously evaluates a wide variety of different types of electronically stored data and input data to update stored indication of the probability of human presence in each of one or more regions within an environment controlled by the intelligent controller. In one model, the intelligent controller primarily operates with respect to two different states: (1) a presence state resulting from determination, by the intelligent controller, that one or more human beings are present within one or more regions; and (2) a no-presence state, in which the intelligent controller has determined that no human beings are present within the one or more regions.

Figure 17A:
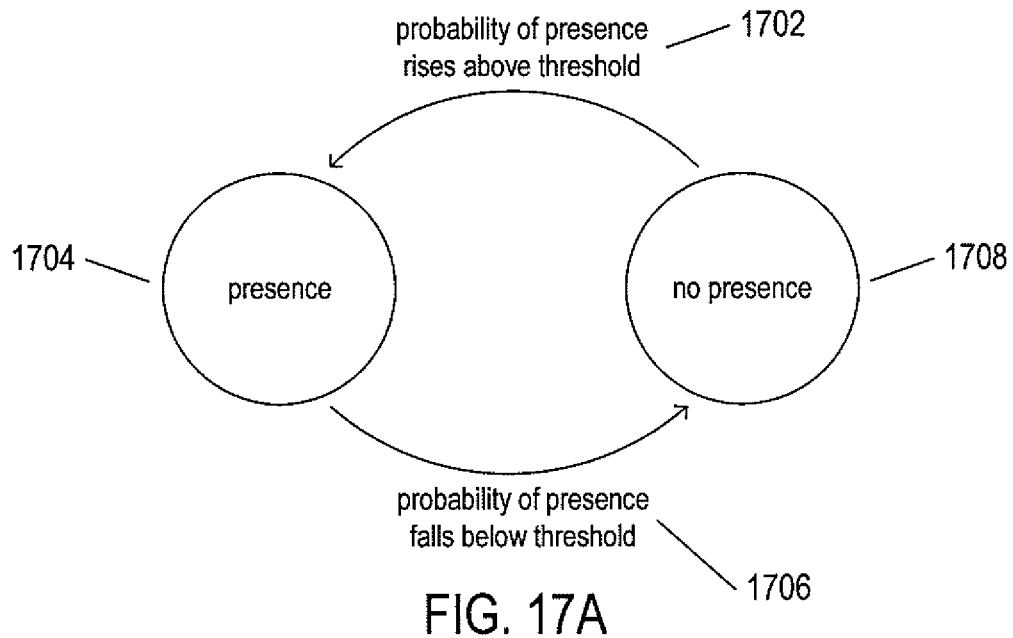
FIGS. 17A-B illustrate variations in a presence/no-presence model.
Figure 17B:
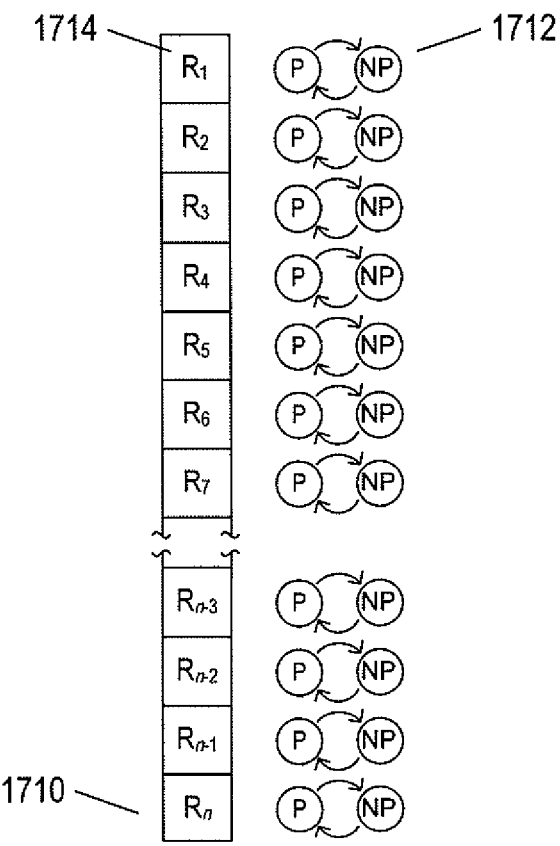

FIGS. 17A-B illustrate variations in a presence/no-presence model. FIG. 17A shows a simple presence/no-presence model that includes two states for the entire perception region or control domain associated with the controller. When the probability of human presence within the perception region rises above a first threshold value 1702, the intelligent controller transitions to a presence state 1704. When the probability of presence of a human being within the perception region falls below a second threshold value 1706, the intelligent controller transitions to a no-presence state 1708. In this case, the current scalar probability value or presence-probability map is continuously or iteratively evaluated with respect to one or more thresholds in order to determine in which of the two states 1704 and 1708 the intelligent controller currently resides. As shown in FIG. 17B, when an intelligent controller makes presence and/or absence determinations for multiple regions within an environment, then each region is associated with presence and no-presence states. In FIG. 17B, each element of the column vector 1710 corresponds to a different region, and each different region is associated with a presence/no-presence state-transition diagram such as the state-transition diagram 1712 associated with region $R_1$ 1714.

Figure 18A:
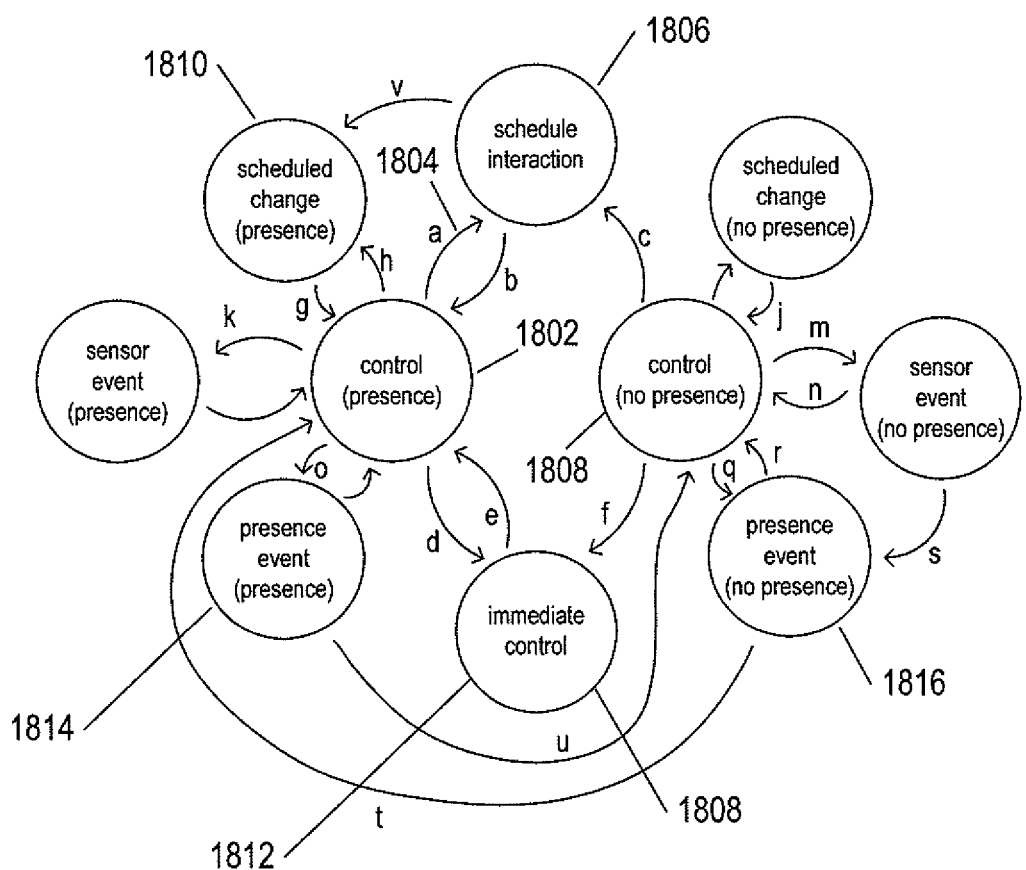

FIGS. 18A-B provide a state-transition diagram for an intelligent controller that operates according to the two-state transition diagram illustrated in FIG. 17A. In FIG. 18A, each state is represented by a labeled circle, such as labeled circle 1802, and state transitions are represented by curved arrows, such as curved arrow 1804. FIG. 18B provides a table in which the lower-case letter corresponding to each state transition in FIG. 18A is paired with an explanation of the state transition. In FIG. 18A, the intelligent-controller state is largely divided between presence states and no-presence states. In other words, the state-transition diagram of FIG. 17A is superimposed over a state-transition diagram for an intelligent controller to produce presence states and no-presence states. However, two states 1806 and 1808 do not have presence and no-presence counterparts, since, in the simple example intelligent controller described by FIGS. 18A-B, a human being must be present in order to interact with the intelligent controller through a schedule interface or an immediate-control interface. In other words, these two states are defined to be presence states, for this example. Many intelligent controllers would, in fact, have presence and no-presence states for the schedule-interaction state 1806 and the immediate-control state 1808, since users may access a schedule interface or immediate-control interface remotely, through mobile phones and other mobile computing appliances. However, the intelligent controller described by the state-transition diagram provided in FIGS. 18A-B features a simple schedule display and immediate-control interface that requires the presence of a user. In general, the intelligent controller occupies either of the two control states 1802 and 1808. In these states, the intelligent controller may carry out a variety of different activities on an ongoing basis, including exchanging data with other intelligent controllers and remote computer systems, responding to error events, and other such activities.

When a user interacts with the intelligent controller through the schedule interface, the intelligent controller transitions from either of the control states 1802 and 1808 to the schedule-interaction state 1806. Once the schedule interaction is concluded, the intelligent controller may return to control state 1802 either directly or through a scheduled-change state 1810 as a result of the current time corresponding to a schedule setpoint. However, when the schedule-interaction state 1806 is reached directly from the no-presence control state 1808, there is no state transition that returns the intelligent controller to the no-presence control state 1808. This is because user interaction through the schedule interface provides unambiguous evidence of the fact that a human being is present, in this example, and, therefore, subsequent states are presence-associated states. Similar considerations apply to the immediate-control state 1812. The intelligent controller may transition from the presence-associated states to no-presence-associated states from a presence-event state 1814 in which the intelligent controller determines the current probability of human presence. A similar presence-event state 1816 provides a transition to presence-associated events. Thus, the state transition diagrams in FIG. 18A-B represent intelligent-controller operation alternatively to the high-level control-flow diagram provided in FIG. 16.

Figure 19:
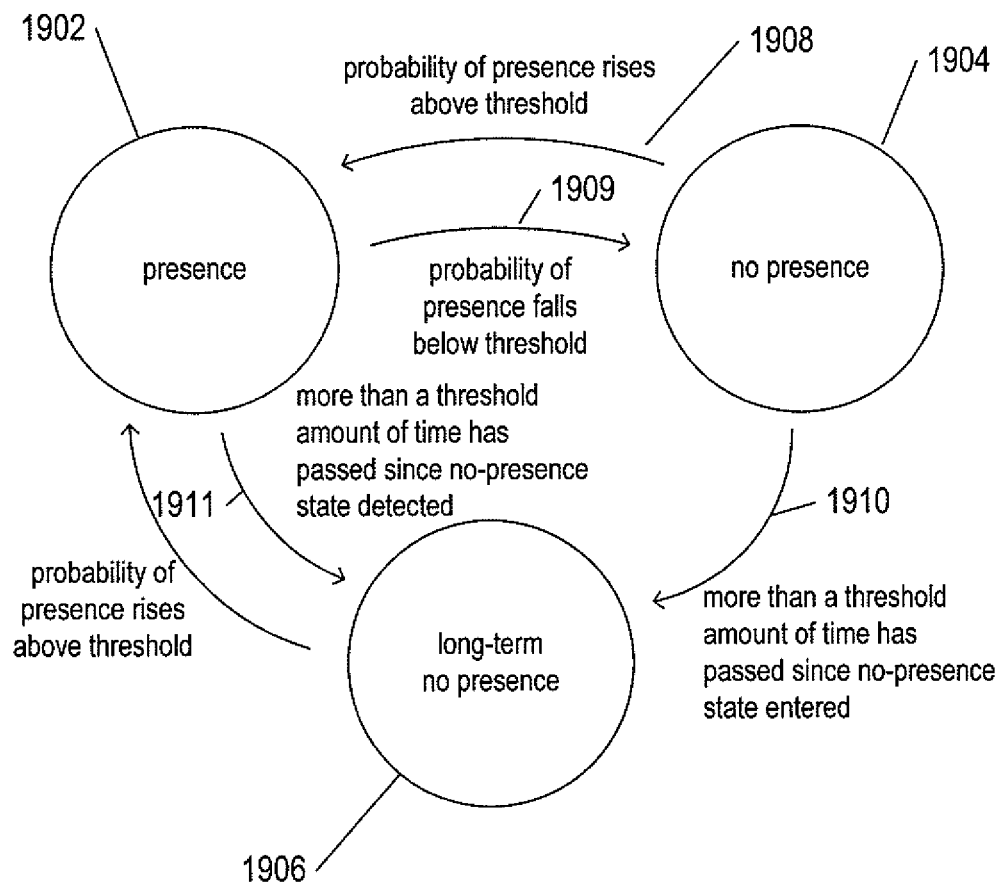
FIGS. 19 and 20 illustrate a three-presence-states intelligent controller using illustration conventions similar to those used in FIGS. 17A and 18A.
Figure 20:
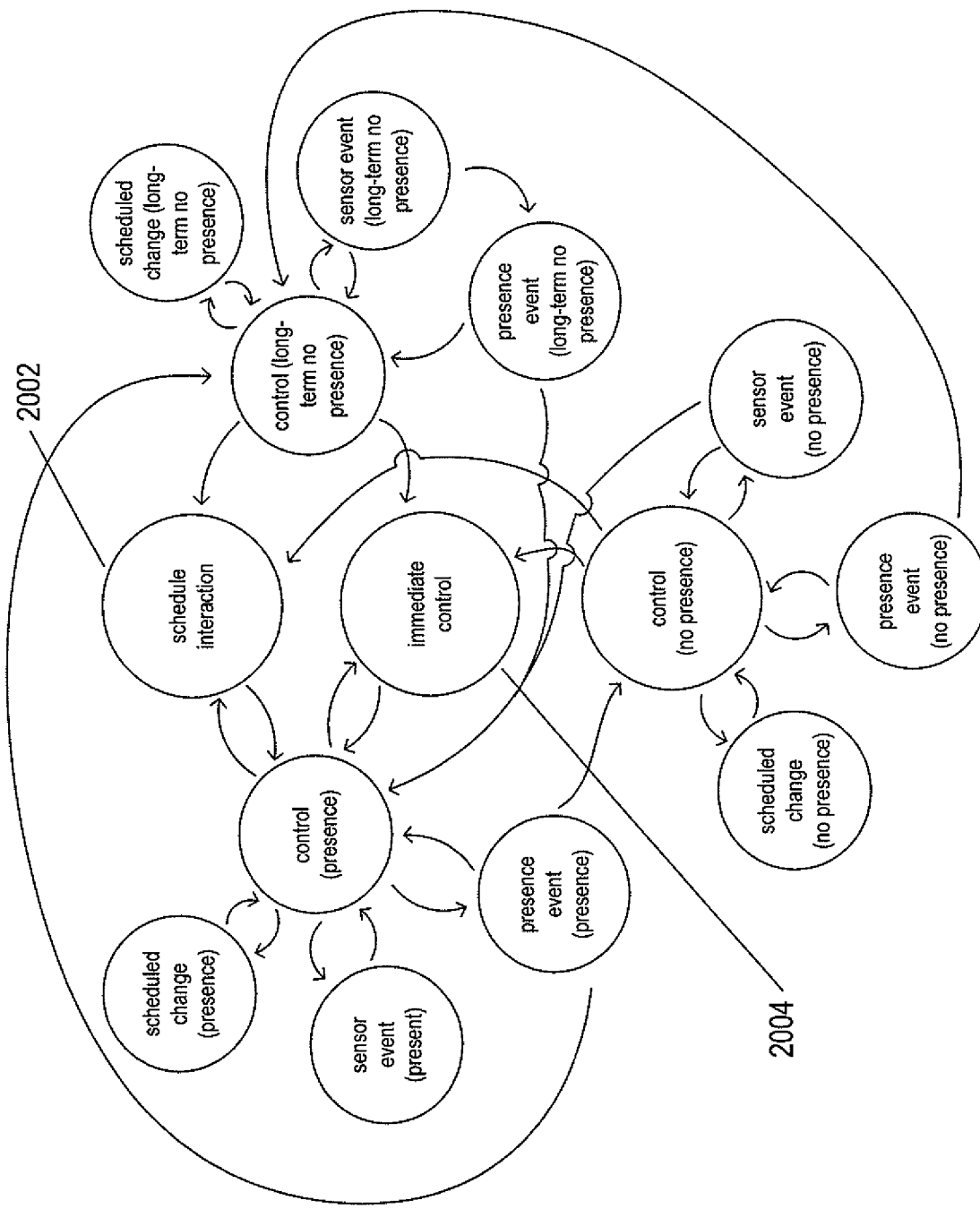

In other intelligent-controller implementations, there may be additional presence-related states. FIGS. 19 and 20 illustrate a three-presence-states intelligent controller using illustration conventions similar to those used in FIGS. 17A and 18A. In one type of three-presence-states intelligent controller, the intelligent controller may operate within a presence state 1902, a no-presence state 1904, or a long-term no-presence state 1906. States 1902 and 1904, along with transitions 1908-1909, respond to the state-transition diagram shown in FIG. 17A. However, the state-transition diagram shown in FIG. 19 also includes state 1906 which corresponds to the absence of human presence within one or more regions controlled by the intelligent controller for greater than a threshold amount of time. This state can be entered either from the no-presence state 1904 or the presence state 1902 via transitions 1910 and 1911, respectively. However, the intelligent controller, once in the long-term no-presence state 1906, can only transition out of long-term no-presence state 1906 to the present state 1902. FIG. 20 provides a state-transition diagram for intelligent-controller operation similar to that provided in FIG. 18A. However, in this case, there are three different types of states associated with the presence, no-presence, and long-term no-presence states 1902, 1904, and 1906 shown in FIG. 19. In other words, the state-transition diagram of FIG. 19 has been superimposed over a state-transition diagram for intelligent-controller operation in order to generate the state-transition diagram shown in FIG. 20. As in the state-transition diagram shown in FIG. 18A, the schedule-interaction state 2002 and the immediate-control state 2004 are defined to indicate the presence of a human being, and are thus not replicated to create three presence-associated, no-presence-associated, and long-term-no-presence-associated states.

Figure 21:
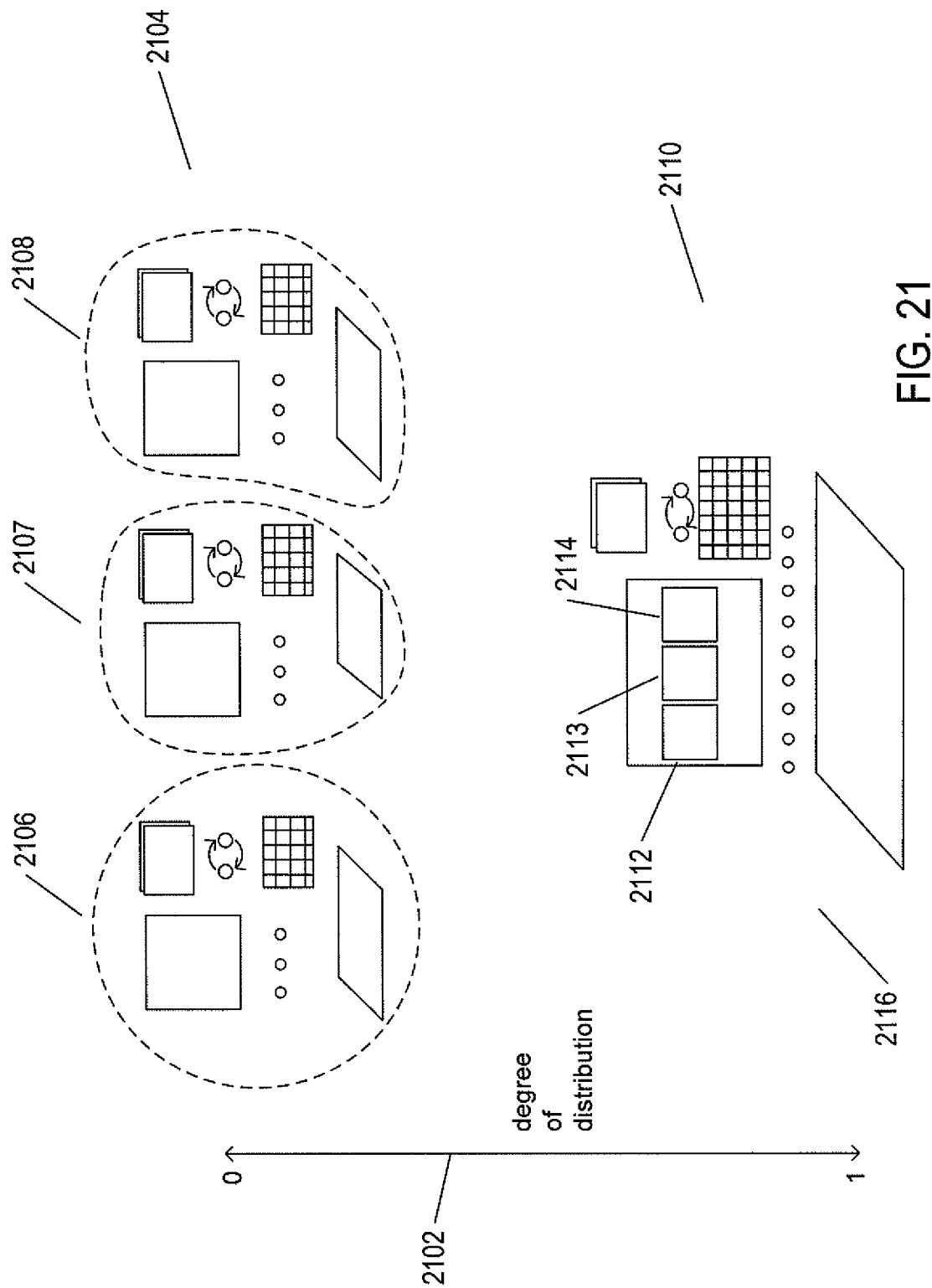
FIG. 21 illustrates varying degrees of distribution of intelligent control with respect to multiple intelligent controllers within an environment.

FIG. 21 illustrates varying degrees of distribution of intelligent control with respect to multiple intelligent controllers within an environment. The degree of distribution is indicated by vertical axis 2102. At one extreme 2104, each intelligent controller 2106-2108 is a completely separate and distinct subcontroller, monitoring and controlling a distinct region within an overall environment. At the other extreme 2110, the three intelligent controllers 2112-2114 can be considered to be subcomponents of a distributed intelligent controller 2116, with all sensor data, electronically stored data, and other information processed in distributed fashion in order to monitor and control an environment. Many different intermediate rules of distribution between these two extremes may describe any particular level of distribution exhibited by multiple intelligent controllers of a distributed intelligent controller. For example, the intelligent controllers may be responsible for controlling different subregions, but may share sensor data, presence and/or absence determinations, and other data and inferences in order that each intelligent controller provides optimal or near-optimal control within the control domain associated with the intelligent controller within the context of the entire environment.

Figure 22A:
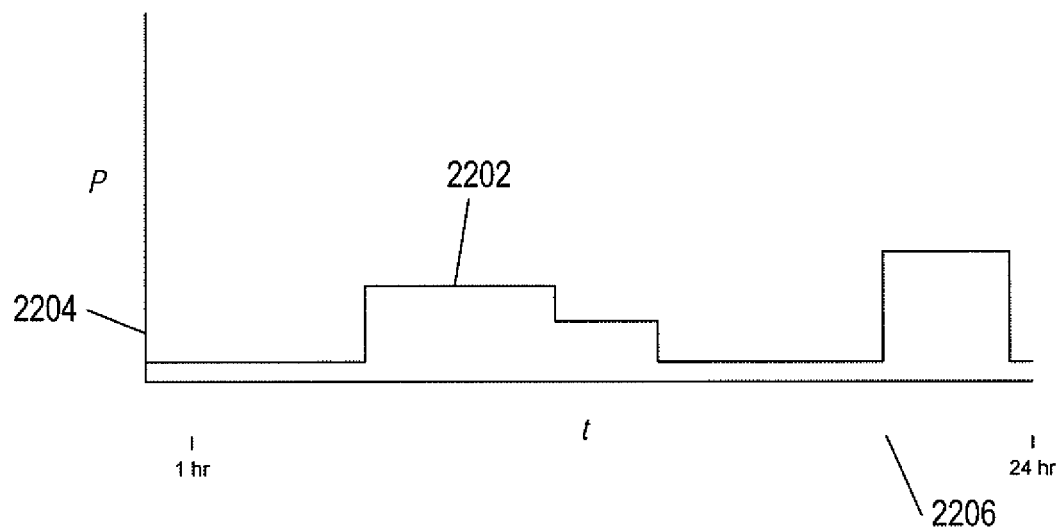
FIGS. 22A-C show three different types of control schedules.
Figure 22B:
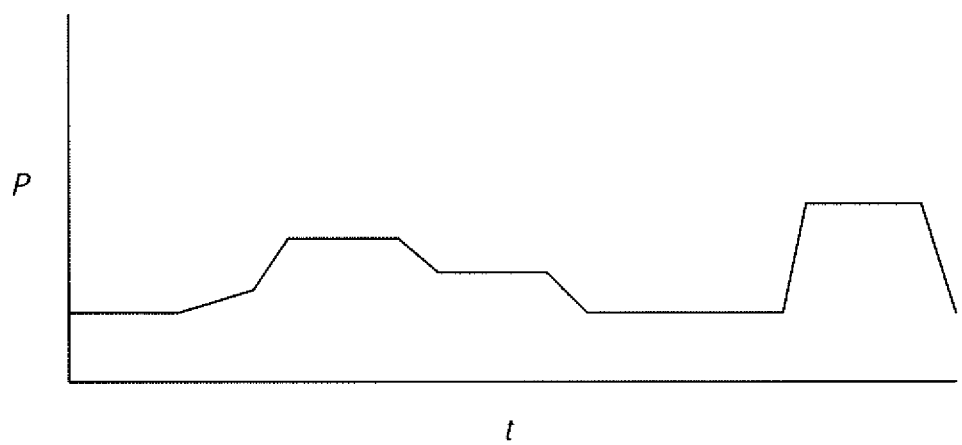
Figure 22C:
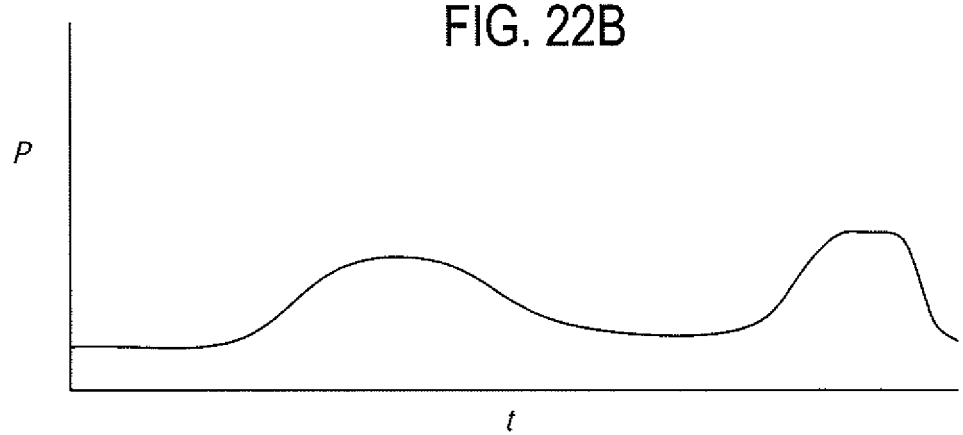

FIGS. 22A-C show three different types of control schedules. In FIG. 22A, the control schedule is a continuous curve 2202 representing a parameter value, plotted with respect to the vertical axis 2204, as a function of time, plotted with respect to the horizontal axis 2206. The continuous curve comprises only horizontal and vertical sections. Horizontal sections represent periods of time at which the parameter is desired to remain constant and vertical sections represent desired changes in the parameter value at particular points in time. This is a simple type of control schedule and is used, below, in various examples of automated control-schedule learning. However, automated control-schedule-learning methods can also learn more complex types of schedules. For example, FIG. 22B shows a control schedule that includes not only horizontal and vertical segments, but arbitrarily angled straight-line segments. Thus, a change in the parameter value may be specified, by such a control schedule, to occur at a given rate, rather than specified to occur instantaneously, as in the simple control schedule shown in FIG. 22A. Automated-control-schedule-learning methods may also accommodate smooth-continuous-curve-based control schedules, such as that shown in FIG. 22C. In general, the characterization and data encoding of smooth, continuous-curve-based control schedules, such as that shown in FIG. 22C, is more complex and includes a greater amount of stored data than the simpler control schedules shown in FIGS. 22B and 22A.

In the following discussion, it is generally assumed that a parameter value tends to relax towards lower values in the absence of system operation, such as when the parameter value is temperature and the controlled system is a heating unit. However, in other cases, the parameter value may relax toward higher values in the absence of system operation, such as when the parameter value is temperature and the controlled system is an air conditioner. The direction of relaxation often corresponds to the direction of lower resource or expenditure by the system. In still other cases, the direction of relaxation may depend on the environment or other external conditions, such as when the parameter value is temperature and the controlled system is an HVAC system including both heating and cooling functionality.

Turning to the control schedule shown in FIG. 22A, the continuous-curve-represented control schedule 2202 may be alternatively encoded as discrete setpoints corresponding to vertical segments, or edges, in the continuous curve. A continuous-curve control schedule is generally used, in the following discussion, to represent a stored control schedule either created by a user or remote entity via a schedule-creation interface provided by the intelligent controller or created by the intelligent controller based on already-existing control schedules, recorded immediate-control inputs, and/or recorded sensor data, or a combination of these types of information.

Figure 23A:
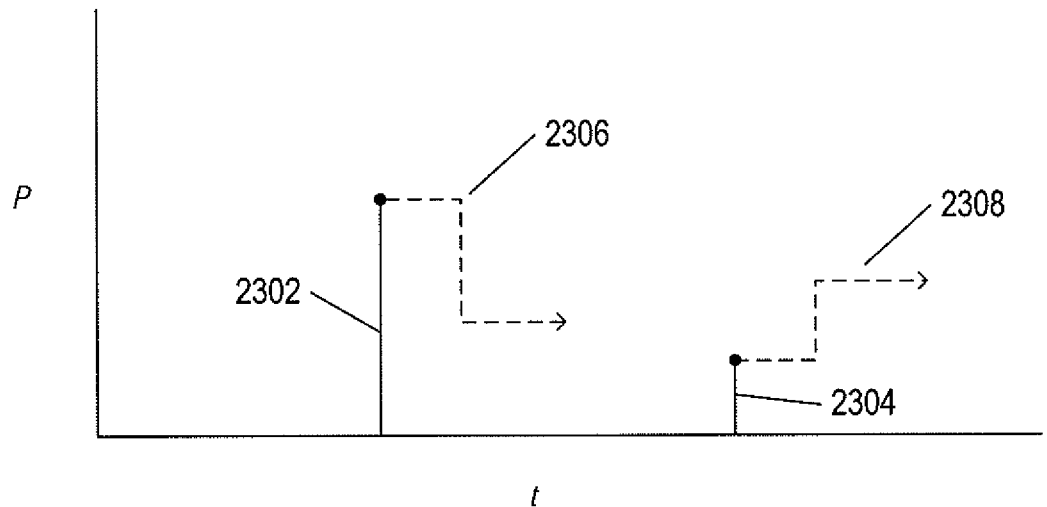
FIGS. 23A-G show representations of immediate-control inputs that may be received and executed by an intelligent controller, and then recorded and overlaid onto control schedules, such as those discussed above with reference to FIGS. 22A-C, as part of automated control-schedule learning.

Immediate-control inputs are also graphically represented in parameter-value versus time plots. FIGS. 23A-G show representations of immediate-control inputs that may be received and executed by an intelligent controller, and then recorded and overlaid onto control schedules, such as those discussed above with reference to FIGS. 22A-C, as part of automated control-schedule learning. An immediate-control input is represented graphically by a vertical line segment that ends in a small filled or shaded disk. FIG. 23A shows representations of two immediate-control inputs 2302 and 2304. An immediate-control input is essentially equivalent to an edge in a control schedule, such as that shown in FIG. 22A, that is input to an intelligent controller by a user or remote entity with the expectation that the input control will be immediately carried out by the intelligent controller, overriding any current control schedule specifying intelligent-controller operation. An immediate-control input is therefore a real-time setpoint input through a control-input interface to the intelligent controller.

Because an immediate-control input alters the current control schedule, an immediate-control input is generally associated with a subsequent, temporary control schedule, shown in FIG. 23A as dashed horizontal and vertical lines that form a temporary-control-schedule parameter vs. time curve extending forward in time from the immediate-control input. Temporary control schedules 2306 and 2308 are associated with immediate-control inputs 2302 and 2304, respectively, in FIG. 23A.

Figure 23B:
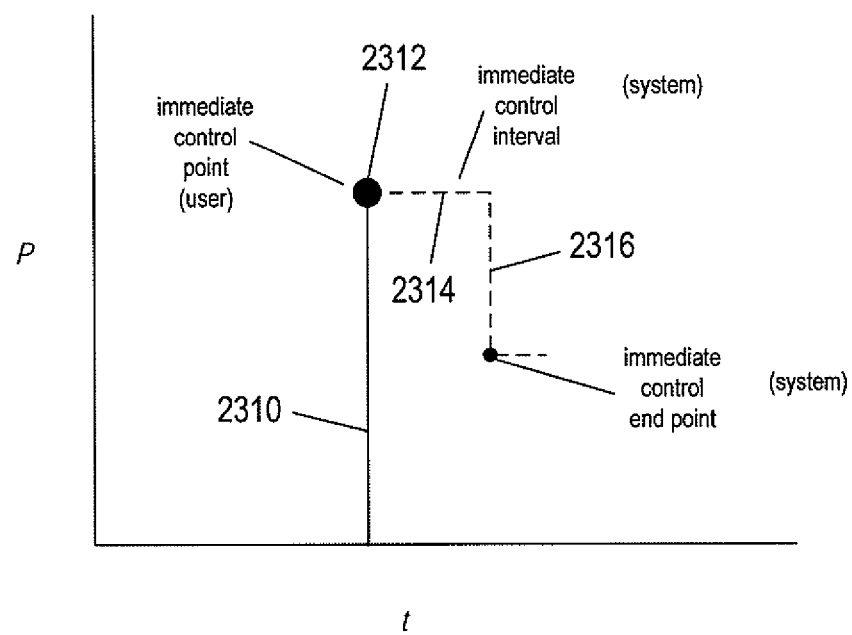

FIG. 23B illustrates an example of immediate-control input and associated temporary control schedule. The immediate-control input 2310 is essentially an input setpoint that overrides the current control schedule and directs the intelligent controller to control one or more controlled entities in order to achieve a parameter value equal to the vertical coordinate of the filled disk 2312 in the representation of the immediate-control input. Following the immediate-control input, a temporary constant-temperature control-schedule interval 2314 extends for a period of time following the immediate-control input, and the immediate-control input is then relaxed by a subsequent immediate-control-input endpoint, or subsequent setpoint 2316. The length of time for which the immediate-control input is maintained, in interval 2314, is a parameter of automated control-schedule learning. The direction and magnitude of the subsequent immediate-control-input endpoint setpoint 2316 represents one or more additional automated-control-schedule-learning parameters. Please note that an automated-control-schedule-learning parameter is an adjustable parameter that controls operation of automated control-schedule learning, and is different from the one or more parameter values plotted with respect to time that comprise control schedules. The parameter values plotted with respect to the vertical axis in the example control schedules to which the current discussion refers are related directly or indirectly to observables, including environmental conditions, machines states, and the like.

Figure 23C:
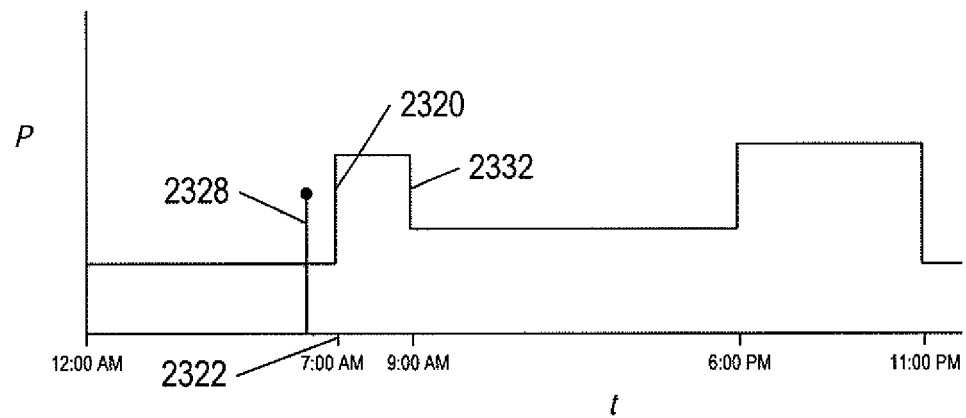
Figure 23D:
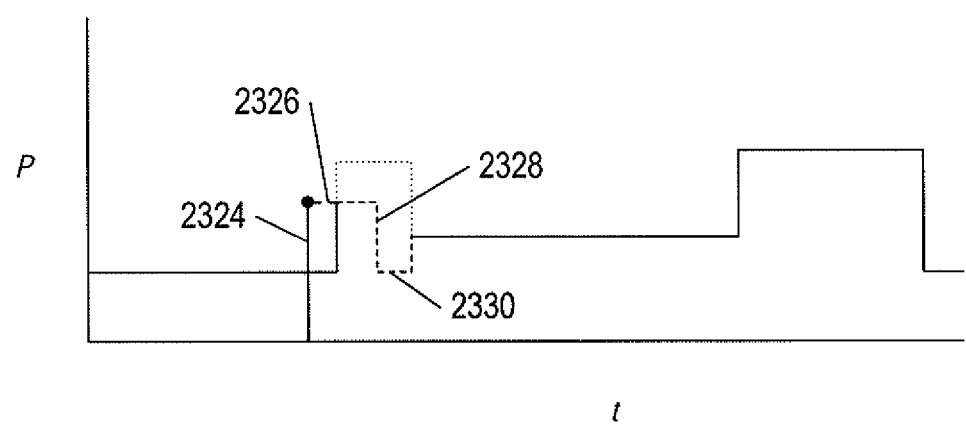

FIG. 23C shows an existing control schedule on which an immediate-control input is superimposed. The existing control schedule called for an increase in the parameter value P, represented by edge 2320, at 7:00 AM (2322 in FIG. 23C). The immediate-control input 2324 specifies an earlier parameter-value change of somewhat less magnitude. FIGS. 23D-G illustrate various subsequent temporary control schedules that may obtain, depending on various different implementations of intelligent-controller logic and/or current values of automated-control-schedule-learning parameter values. In FIGS. 23D-G, the temporary control schedule associated with an immediate-control input is shown with dashed line segments and that portion of the existing control schedule overridden by the immediate-control input is shown by dotted line segments. In one approach, shown in FIG. 23D, the desired parameter value indicated by the immediate-control input 2324 is maintained for a fixed period of time 2326 after which the temporary control schedule relaxes, as represented by edge 2328, to the parameter value that was specified by the control schedule at the point in time that the immediate-control input is carried out. This parameter value is maintained 2330 until the next scheduled setpoint, which corresponds to edge 2332 in FIG. 23C, at which point the intelligent controller resumes control according to the control schedule.

Figure 23E:
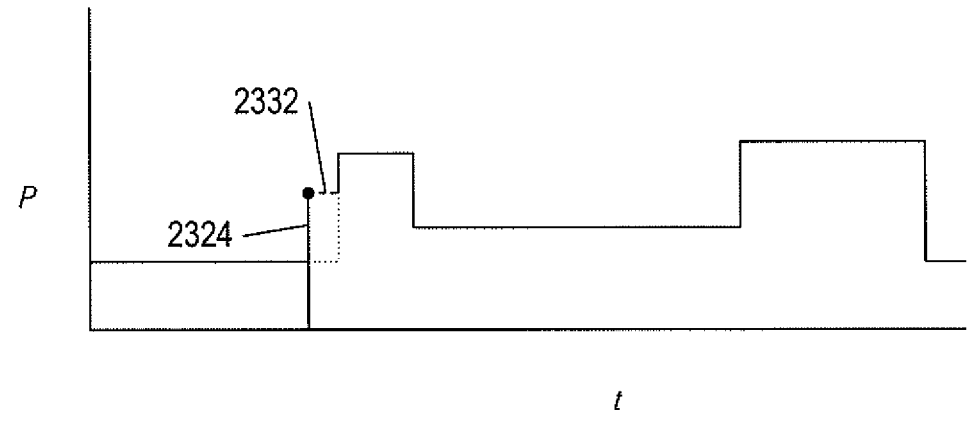

In an alternative approach shown in FIG. 23E, the parameter value specified by the immediate-control input 2324 is maintained 2332 until a next scheduled setpoint is reached, in this case the setpoint corresponding to edge 2320 in the control schedule shown in FIG. 23C. At the next setpoint, the intelligent controller resumes control according to the existing control schedule. This approach is desired by many users, who expect manually entered setpoints to remain in force until a scheduled setpoint change.

Figure 23F:
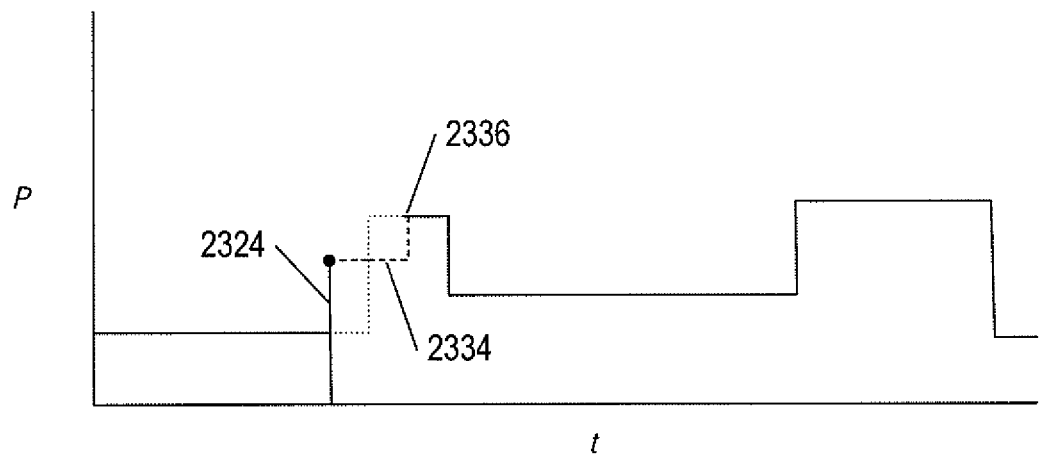

In a different approach, shown in FIG. 23F, the parameter value specified by the immediate-control input 2324 is maintained by the intelligent controller for a fixed period of time 2334, following which the parameter value that would have been specified by the existing control schedule at that point in time is resumed 2336.

Figure 23G:
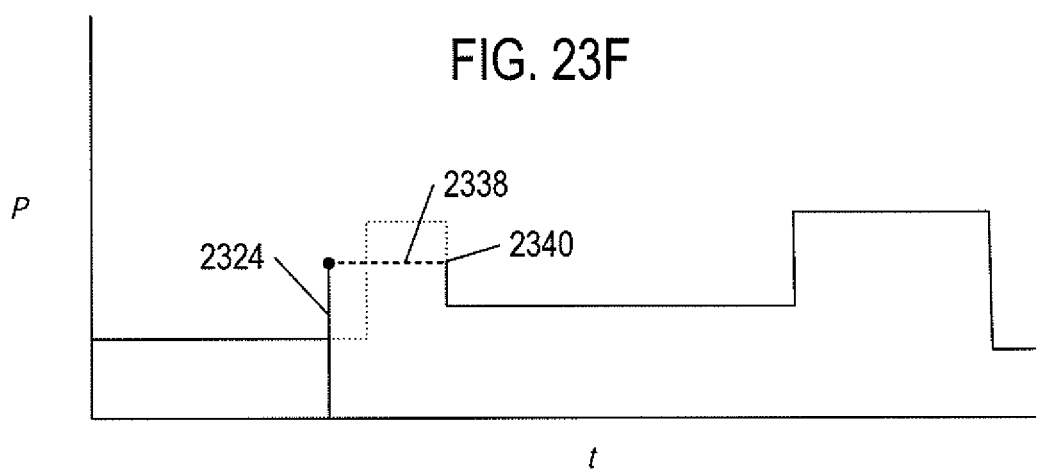

In the approach shown in FIG. 23G, the parameter value specified by the immediate-control input 2324 is maintained 2338 until a setpoint with opposite direction from the immediate-control input is reached, at which the existing control schedule is resumed 2340. In still alternative approaches, the immediate-control input may be relaxed further, to a lowest-reasonable level, in order to attempt to optimize system operation with respect to resource and/or energy expenditure. In these approaches, generally used during aggressive learning, a user is compelled to positively select parameter values greater than, or less than, a parameter value associated with a minimal or low rate of energy or resource usage.

In one example implementation of automated control-schedule learning, an intelligent controller monitors immediate-control inputs and schedule changes over the course of a monitoring period, generally coinciding with the time span of a control schedule or subschedule, while controlling one or more entities according to an existing control schedule except as overridden by immediate-control inputs and input schedule changes. At the end of the monitoring period, the recorded data is superimposed over the existing control schedule and a new provisional schedule is generated by combining features of the existing control schedule and schedule changes and immediate-control inputs. Following various types of resolution, the new provisional schedule is promoted to the existing control schedule for future time intervals for which the existing control schedule is intended to control system operation.

FIGS. 24A-D illustrate no-presence events and their effects on control schedules. FIG. 24 shows a simple control schedule using the same illustration conventions employed in FIGS. 22A and 23A-G. This schedule includes a relatively low-parameter-value initial time period 2402, a first setpoint 2404, following which the schedule includes a relatively high-parameter-value interval 2406, followed by a second setpoint 2408 that lowers the parameter value back to a relatively low parameter value for a subsequent time period 2410.

In FIG. 24B, an intelligent controller, operating according to the control schedule shown in FIG. 24A, determines, at time $t_1$ 2412, that a human being is not present in the controlled environment. This determination constitutes a no-presence event 2416 represented by a vertical dashed line 2414 and a disk with a half-shaded portion 2418 indicating presence and an unshaded portion 2420 indicating no presence. As a result of the no-presence event, the intelligent controller adjusts the control schedule by lowering the desired parameter value back to a relatively low value 2422. For example, in a home-heating context, the parameter value may correspond to temperature and the fact that there are no occupants at time $t_1$ justifies lowering the temperature setting in order to save energy.

In FIG. 24C, at time $t_2$ 2424, a user enters an immediate-control input 2426 to reset the temperature via the immediate-control interface of the intelligent controller. Thus, the user is now present. Because the elapsed time period 2428 between the no-presence event 2416 and the immediate-control input 2426 is, in this case, below a threshold value, the immediate-control input represents a corrective presence event, designated by a disk 2430 with an unshaded portion 2432 preceding a shaded portion 2434, indicating a transition from no presence to presence, and an overlying bar 2436 indicating that there is a strong probability that a recent, preceding no-presence event was incorrectly established by the intelligent controller. As an example, an occupant of a residence may have taken a short nap prior to time $t_1$, as a result of which none of the sensors of the intelligent controller detected the occupant's presence and the presence-related event 2416 was generated. Upon awakening, the occupant noticed a temperature decrease, and adjusted the temperature setting via the immediate-control interface.

Figure 24D:
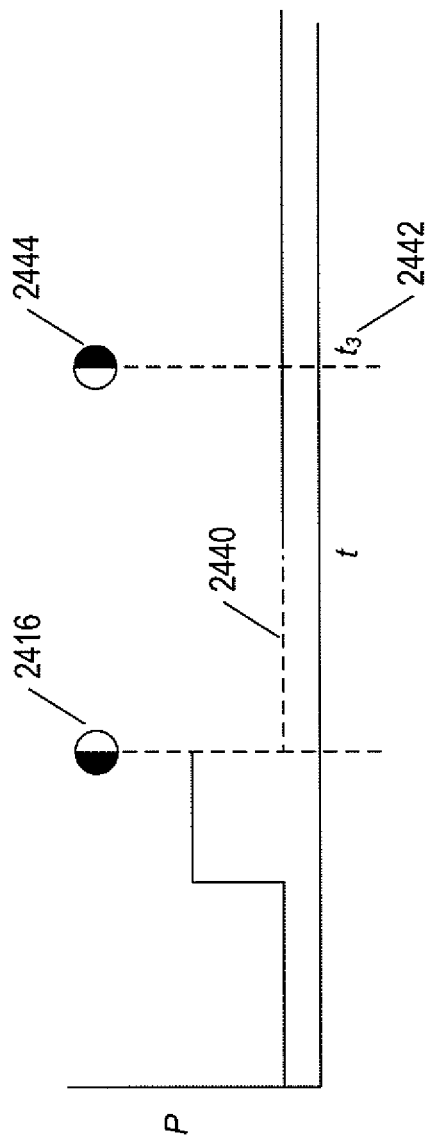

FIG. 24D shows another situation with respect to the control schedule illustrated in FIG. 24A. In FIG. 24D, following the initial no-presence event 2416, the schedule was accordingly adjusted by the intelligent controller 2440 and no presence event occurred during the period of time for which the schedule is adjusted. Later, at time $t_3$ 2442, the intelligent controller determined a human being is now present in the controlled environment, resulting in the presence event 2444. However, the intelligent controller continues to operate according to the control schedule, in this example, because there is no indication that the occupant intended to override the control schedule. In alternative implementations, the intelligent controller may adjust the control schedule for presence events rather than no-presence events or for both presence events and no-presence events. In many cases, various schedule adjustments with respect to presence events and no-presence events can be specified through a scheduling interface or other input interface of the intelligent controller. Alternatively, the schedule adjustments may be learned, over time, by the intelligent controller by patterns of presence and absence and patterns of immediate-control inputs and schedule adjustments.

Figure 25:
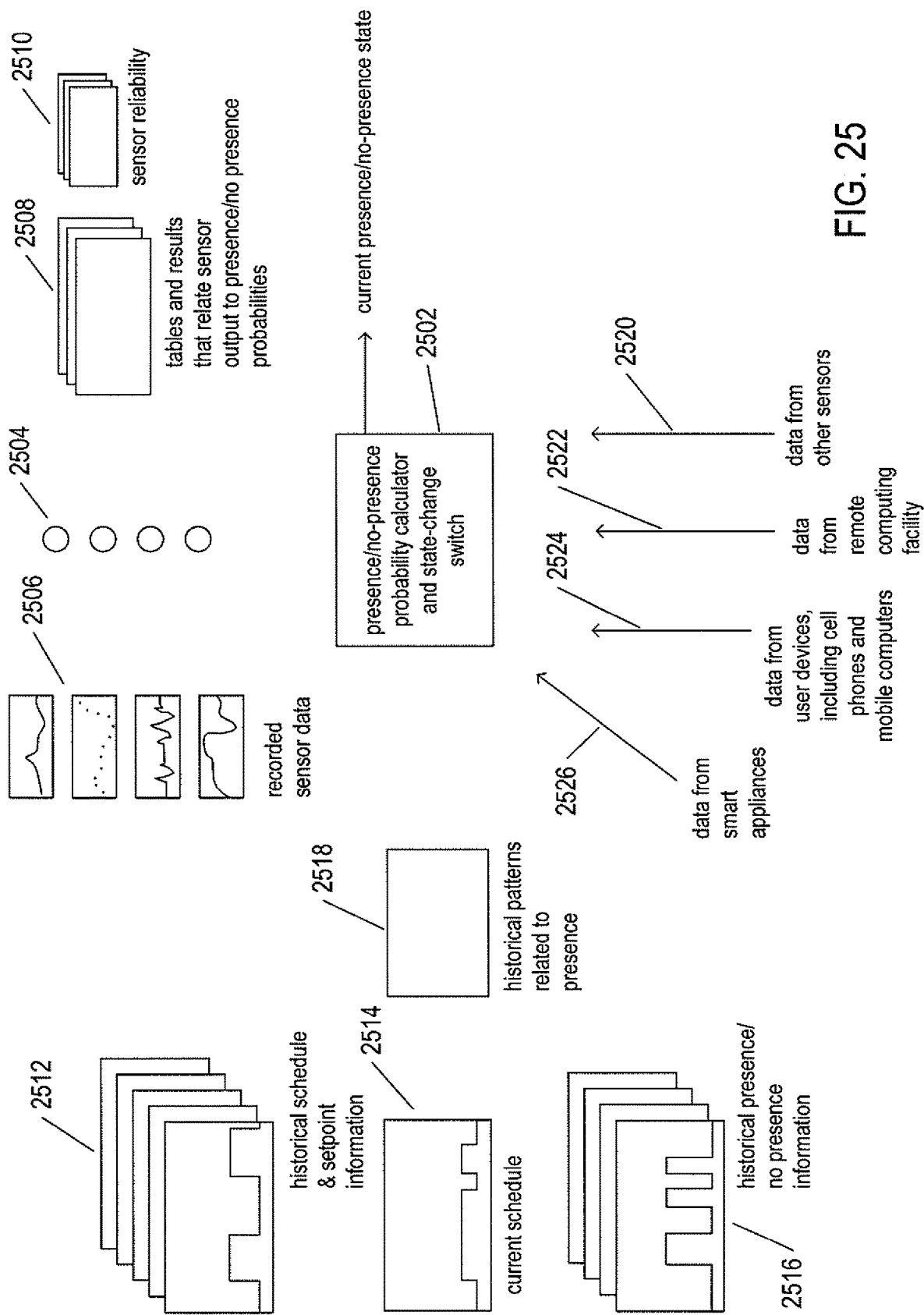
FIG. 25 illustrates many different types of information that may be used by an intelligent controller in order to determine the presence and/or absence of one or more human beings within a controlled environment or a region or subvolume of the controlled environment.

FIG. 25 illustrates many different types of information that may be used by an intelligent controller in order to determine the presence and/or absence of one or more human beings within a controlled environment or a region or subvolume of the controlled environment. As discussed above, the intelligent controller includes a continuous or intermittent presence/no-presence probability-calculating subsystem as well as a state-change switch 2502 that implements the state transitions discussed with reference to FIG. 17A. The state-change switch changes a state variable within the intelligent controller between two or more presence-related states, as discussed above. The transitions between presence-related states are initiated based on a current presence-probability map or scalar value and various threshold values. The presence-probability scalar or map is compiled by the intelligent controller based on many different potential types of information. The various types of information may include direct sensor output 2504 as well as recorded output from sensors 2506 over one or more preceding time intervals. The information may additionally include tables, expressions, or other data that relate sensor output values to presence/no-presence probabilities associated with the sensor outputs 2508. In addition, the intelligent controller may maintain confidence or reliability information 2510 for one or more sensors. The sensor-confidence values vary with time and also with respect to outputs of other sensors, environmental conditions, parameters, and characteristics as well as other types of locally or remotely stored information. Information also may include historical control-schedule and setpoint information 2512 as well as a current control schedule 2514 according to which the intelligent controller is currently operating. Information may additionally include historical presence/no-presence information, such as presence/no-presence determinations previously made by the intelligent controller or other intelligent controllers and remote computer systems with which the intelligent controller communicates 2516. In addition, the intelligent controller may maintain the results of various presence-pattern-determining analyses 2518. Finally, the information used to compile presence-probability maps and scalar values may include information obtained from remote entities, including data from remote sensors 2520 within remote intelligent controllers, data from a remote computing facility 2522, data from various user devices, including cell phones and mobile phones 2524, and data from various smart appliances within the controlled environment 2526. The types of information used by an intelligent controller compile presence-probability maps and scalar values that may include many additional types of information in different implementations and contexts. As one example, an intelligent controller may provide a presence-indication interface allowing users to explicitly indicate their presence and absence with respect to the controlled environment, as one example.

Figure 26A:
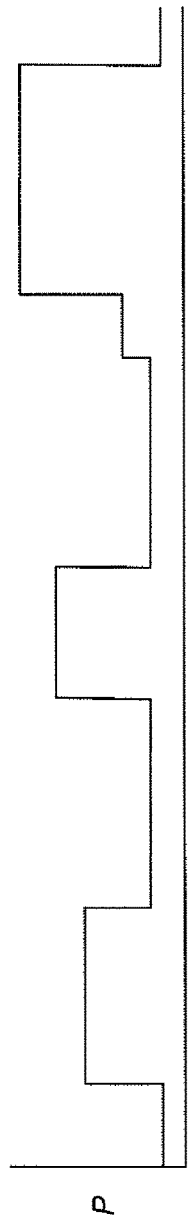
FIGS. 26A-D illustrate various types of presence-related schedule adjustments.
Figure 26B:
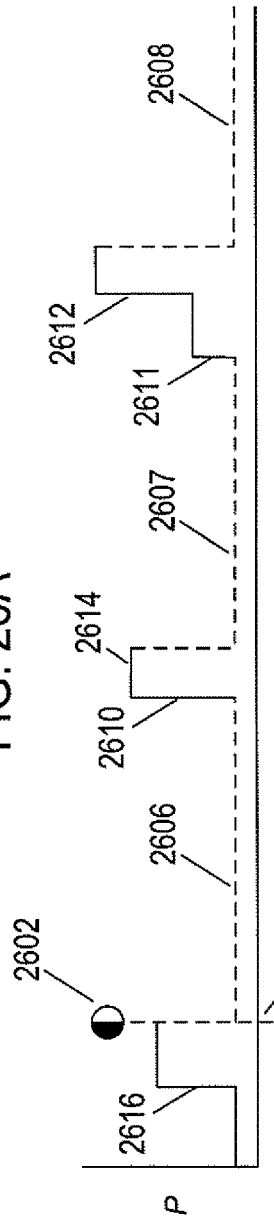
Figure 26C:
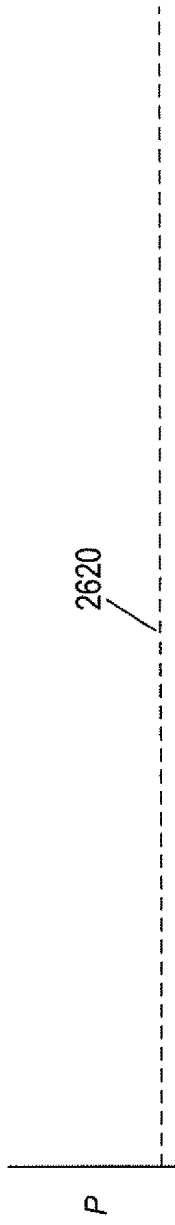
Figure 26D:
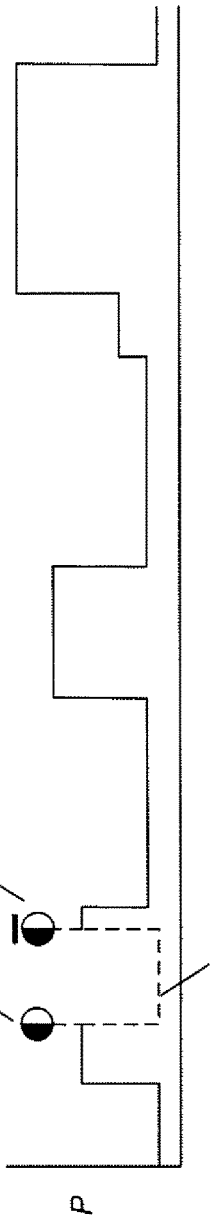

FIGS. 26A-D illustrate various types of presence-related schedule adjustments. FIG. 26A shows an example control schedule. FIG. 26B illustrates schedule adjustments that may be undertaken, in certain implementations, in response to a presence-to-no-presence event 2602 that occurs at a first point in time $t_1$ 2604. In this case, the schedule is generally adjusted to a low-parameter value, such as in intervals 2606-2608, but scheduled setpoints that would raise the parameter value 2610-2612 are preserved in the control schedule. The parameter-value change of these setpoints is allowed to continue for a period of time 2614, following which no-presence schedule adjustments, such as no-presence schedule adjustment 2607, ensue. This period of time may decrease, over time, as a continuing lack of presence further decreases the probability of presence estimations, and no-presence thresholds are more quickly reached following setpoint changes. In addition, explicit rules may be used to decrease the time period according to a time-period-decrease schedule, such as a linear decrease schedule. In the case of a recurring schedule, setpoint 2616 is also preserved, by the presence-to-no-presence event 2602. As shown in FIG. 26C, in certain implementations, when no presence has been detected for the remaining control-schedule cycle and some subsequent period, then the control schedule may be more severely adjusted 2620, removing even scheduled setpoints that would otherwise increase the parameter value. In certain implementations, the control-schedule adjustments illustrated in FIG. 26B can be carried out by intelligent controllers in a non-presence state and the more severe adjustments illustrated in FIG. 26C may be carried out in a long-term no-presence state, as discussed above with reference to FIG. 19. Many alternative types of schedule adjustments for both presence events and no-presence events may be undertaken in different contexts and implementations. FIG. 26D illustrates the reversal of schedule adjustments upon a corrective no-presence-to-presence event. Following a no-presence event 2602, the schedule is adjusted downward 2622, but the occurrence of a corrective no-presence-to-presence event 2624 reverses all of the schedule adjustments, such as those shown in FIG. 26B, made following the no-presence event 2602.

Automated Presence-Related Deferral of Scheduled Control within an Intelligent Controller As discussed above, with reference to FIG. 26B, in response to a presence-to-no-presence event 2902, the schedule is adjusted by an intelligent controller to a low-parameter value, but various subsequent scheduled setpoints are nonetheless recognized by the intelligent controller and carried out for at least some period of time before the intelligent controller determines that the probability of presence is still below a threshold value and returns to a regime of low-parameter-value settings that characterize the no-presence state (1904 in FIG. 19). However, in alternative implementations of an intelligent controller, the intelligent controller may choose to carry out, following a presence-to-no-presence event and until a compensatory no-presence-to-presence event occurs, only a subset of the scheduled setpoints or may choose to carry out no subsequent controlled setpoints. In other words, rather than continuing to respond to scheduled setpoints while in the no-presence state, the intelligent controller may only selectively respond to such setpoints. The rationale for this more discriminating control scheme is to avoid unnecessarily expending energy and incurring maintenance overheads in order to carry out scheduled setpoints when, in fact, there is no one in the controlled environment, and therefore an environmental parameter value, such as temperature, can be maintained in a low-energy-consumption setting for a larger portion of the interval between a presence-to-no-presence event and a subsequent, compensatory no-presence-to-presence event.

Note that, in the case of a thermostat intelligent controller, the low-energy-consumption temperature setting, or energy-efficient temperature setting, may be a relatively high temperature setting when the thermostat is in a cooling mode, such as between 65 degrees Fahrenheit and 90 degrees Fahrenheit, and, when the thermostat is in a heating mode, the energy-efficient temperature setting may be relatively lower, such as between 32 degrees Fahrenheit and 68 degrees Fahrenheit. In many implementations, the energy-efficient temperature setting. referred to as the "away temperature," may be specified, in advance, by a user for both heating and cooling modes or may be a predetermined temperature setting for both heating and cooling modes.

Figure 27:
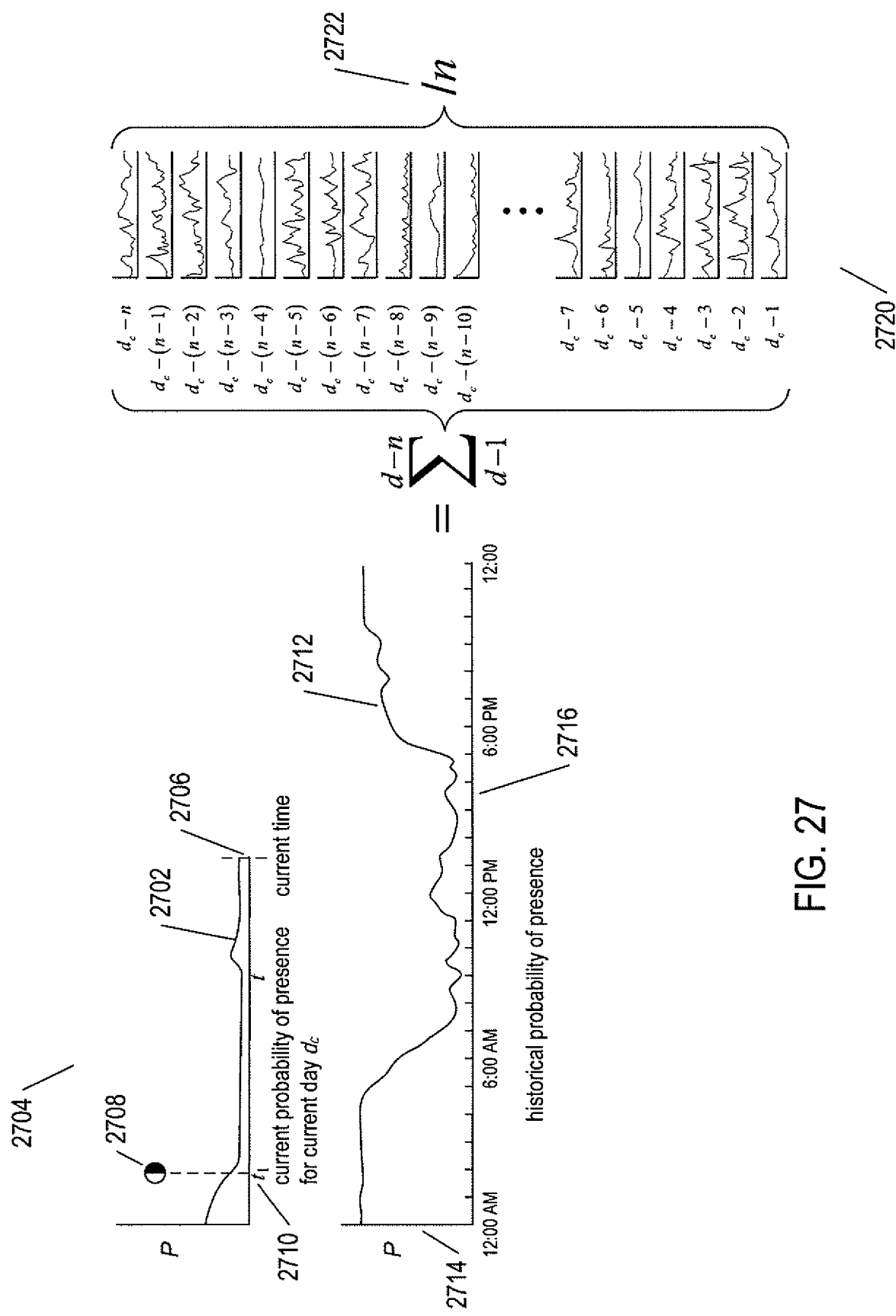
FIG. 27 illustrates the two different types of probability-of-presence data that may be used by an intelligent controller to decide whether or not to carry out scheduled setpoints while in the no-presence state.

FIG. 27 illustrates the two different types of probability-of-presence data that may be used by an intelligent controller to decide whether or not to carry out scheduled setpoints while in the no-presence state. As discussed above, as a result of interpretation of sensor data by the intelligent controller, the intelligent controller maintains a current probability-of-presence indication that indicates whether or not an entity, such as a human being, is present in the controlled environment. For example, the intelligent controller may use a real-value variable that ranges in value from 0.0 to 1.0 to indicate the current probability of the presence of an entity within the controlled environment. Were the value of that variable plotted with respect to time, then a current probability of presence for the current day, where the current day is denoted $d_c$, can be represented as a curve 2702 within a plot 2704 of the current probability of presence, P, with respect to time, with the curve ending at a point 2706 corresponding to the current time. An intelligent controller generally saves current-probability-of-presence values for discrete points in time rather than attempting to model the probability-of-presence with respect to time as a continuous curve. Continuous curves are used in the current figures for simplicity and clarity of illustration. Curve 2702 in FIG. 27 shows an example of the current probability of presence during a day when a presence-to-no-presence event 2708, superimposed over the probability-of-presence-vs.-time curve 2702, occurs early in the day at a time $t_1$ 2710.

Another type of probability-of-presence data is a historical probability-of-presence data, shown in FIG. 27 by curve 2712, that represents cumulative probability-of-presence values observed over a preceding number of days n. As with curve 2702, curve 2712 is a plot of the probability-of-presence P, with respect to the vertical axis 2714, versus time of day, with respect to the horizontal axis 2716. As shown in FIG. 27, this plot may be obtained by essentially summing current-probability-of-presence data for a number n of preceding days 2720 and then dividing the probability-of-presence values by n 2722. In various alternative implementations, more complex statistical methods may be employed to generate the historical-probability-of-presence curve. As with the current-probability-of-presence curve 2702, the historical-probability-of-presence curve or cumulative-probability-of-presence curve 2712 may be stored as average probability-of-presence values for a sequence of discrete times during the day, from which a continuous curve, or portions of a corresponding continuous curve, can be generated by interpolation or various curve-fitting methods.

Figure 28:
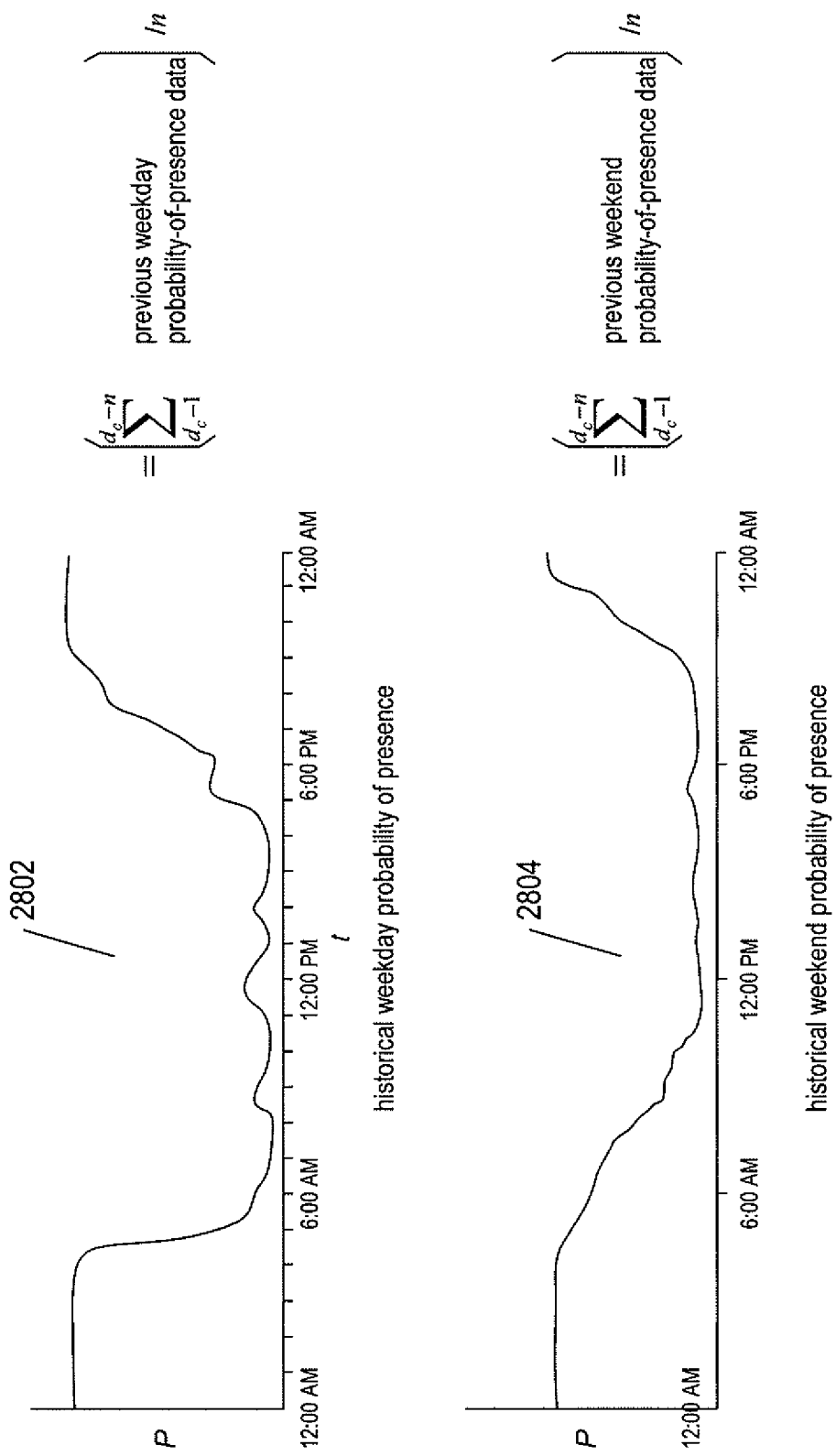
FIG. 28 shows two different cumulative-probability-of-presence curves corresponding to cumulative-probability-of-presence data maintained within an intelligent controller.

FIG. 28 shows two different cumulative-probability-of-presence curves corresponding to cumulative-probability-of-presence data maintained within an intelligent controller. In this case, the intelligent controller stores cumulative-weekday-probability-of-presence data 2802 based on the probability-of-presence data for a preceding number of weekdays as well as cumulative-weekend-probability-of-presence data 2804. In yet additional implementations, an intelligent controller may employ different, or a different number of, separate probability-of-presence data to compute each of a number of different to cumulative-probability-of-presence data sets that reflect different types of time periods with different presence-of-probability characteristics for the controlled environment. In general, the intelligent controller is assumed to employ an appropriate cumulative-probability-of-presence data set when evaluating scheduled control operations, as further discussed below.

FIGS. 29A-C illustrate selective carrying out of scheduled setpoints by an intelligent controller in the no-presence state. FIG. 29A shows an example control schedule. The control schedule includes seven different setpoints corresponding to vertical line segments 2902-2908. FIG. 29B illustrates the occurrence of a presence-to-no-presence event 2910 at a point in time 2912 towards the beginning of the control schedule shown in FIG. 29A. Following the presence-to-no-presence event 2910, as discussed above, the environmental parameter P is generally adjusted to a low-energy setting and maintained at that setting except at those setpoints where the environmental parameter P is changed to a less energy-efficient value. In the case illustrated in FIGS. 29A-C, the intelligent controller is a thermostat, the environmental parameter P is temperature, and the thermostat is currently in a heating mode, with setpoints that increase the temperature corresponding to changes to less-energy-efficient settings and setpoints that lower the temperature corresponding to changes to more-energy-efficient settings. In the original implementation, discussed above with reference to FIG. 26B, setpoints 2904, 2906, and 2907 in FIG. 29A would be carried out despite the occurrence of a presence-to-no-presence event 2910 at time 2912. However, in the currently described alternative implementations, the intelligent controller evaluates each of setpoints 2904, 2906, and 2907, following the presence-to-no-presence event 2910, to determine whether or not to carry out these setpoints. Similarly, as shown in FIG. 29C, when a presence-to-no-presence event 2920 has occurred sometime in the past at a point in time that caused the intelligent controller to transition to a no-presence state without the subsequent occurrence of a compensatory no-presence-to-presence event, the intelligent controller would evaluate each of setpoints 2902, 2904, 2906, and 2907 of the schedule shown in FIG. 29A to determine whether or not to carry out these setpoints.

Figure 30:
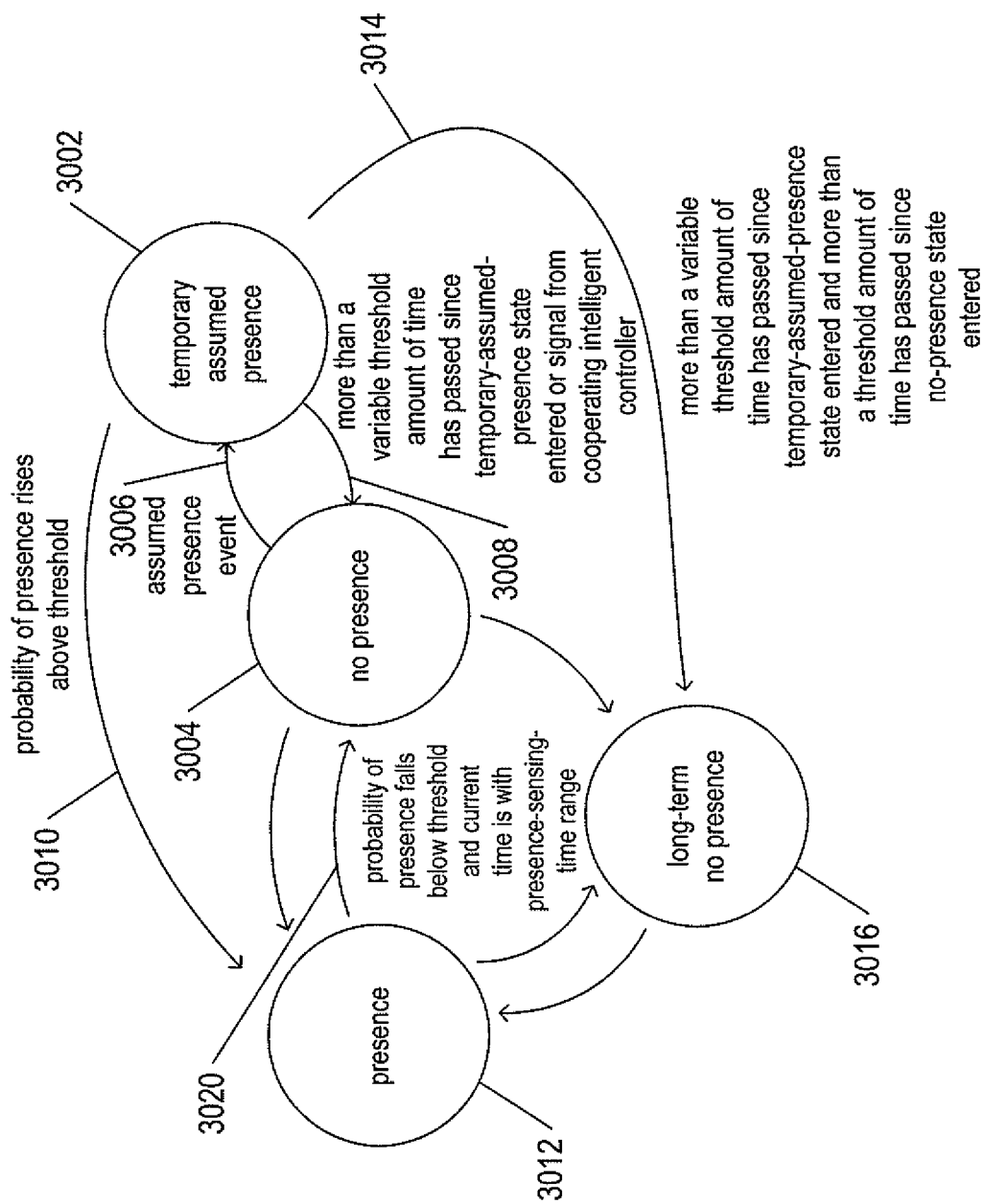
FIG. 30 illustrates a modified state-transition diagram with respect to the state-transition diagram shown in FIG. 19.

FIG. 30 illustrates a modified state-transition diagram with respect to the state-transition diagram shown in FIG. 19. The modified state-transition diagram describes internal presence-related states of an intelligent controller, in one implementation, which selectively carries out scheduled setpoints while in the no-presence state. A new state 3002, referred to as the "temporary-assumed-presence state," represents a fourth state in the state-transition diagram. In the temporary-assumed-presence state, the intelligent controller carries out scheduled setpoints even though the intelligent controller has transitioned to the no-presence state. In other words, the temporary-assumed-presence state 3002 is a subset state of the no-presence state 3004. The intelligent controller temporarily transitions from the no-presence state 3004, via transition 3006, to the temporary-assumed-presence state 3002 upon the occurrence of an assumed-presence event. An assumed-presence event is either a scheduled control operation that the intelligent controller evaluates and determines should be carried out or, in a distributed control system, may be a signal or message from another cooperating intelligent controller that has transitioned to the temporary-assumed-presence state. Once in the temporary-assumed-presence state 3002, the intelligent controller carries out the setpoint and either waits for the passage of a variable threshold amount of time, when the intelligent controller transitioned to the temporary-assumed-presence state as a result of evaluating a scheduled control operation, or waits for a signal from the other cooperating intelligent controller that imitated the transition to the temporary-assumed-presence state. When no compensatory no-presence-to-presence event is detected during the variable threshold amount of time, or when a signal is received from the cooperating intelligent controller directing return to the no-presence state, the intelligent controller transitions from the temporary-assumed-presence state 3002, via transition 3008, back to the no-presence state. As noted above, the threshold amount of time is variable and, as discussed further below, decreases as the time elapsed since a preceding presence-to-no-presence event increases. In other words, the longer the intelligent controller has failed to detect the presence of an entity, such as a human being, in the controlled environment, the more quickly the intelligent controller reverts from a less-energy-efficient setting specified by a controlled setpoint back to a more-energy-efficient setting. Of course, when the probability of presence rises above a threshold value, while the intelligent controller is in the temporary-assumed-presence state, the intelligent controller may directly transition, via transition 3010, to the presence state 3012. Similarly, while the intelligent controller is in the temporary-assumed-presence state 3002 and sufficient time has elapsed for the intelligent controller to transition to the long-term no-presence state, then, after the variable threshold amount of time, the intelligent controller may directly transition from the temporary-assumed-presence state 3002, via transition 3014, to the long-term no-presence state 3016.

Note that transition 3020 from the presence state 3012 to the no-presence state 3004 now occurs when the probability of presence falls below a threshold value and when the current time is within a presence-sensing time range. As one example, the presence-sensing-time range for an intelligent thermostat may be all times of day excluding 8:00 p.m. to 8:00 a.m., when occupants of a house are likely to be relatively inactive or asleep, and thus it would be unlikely that a presence-to-no-presence event would be sufficiently reliable to justify transitioning from the present state to the no-presence state.

Figure 31:
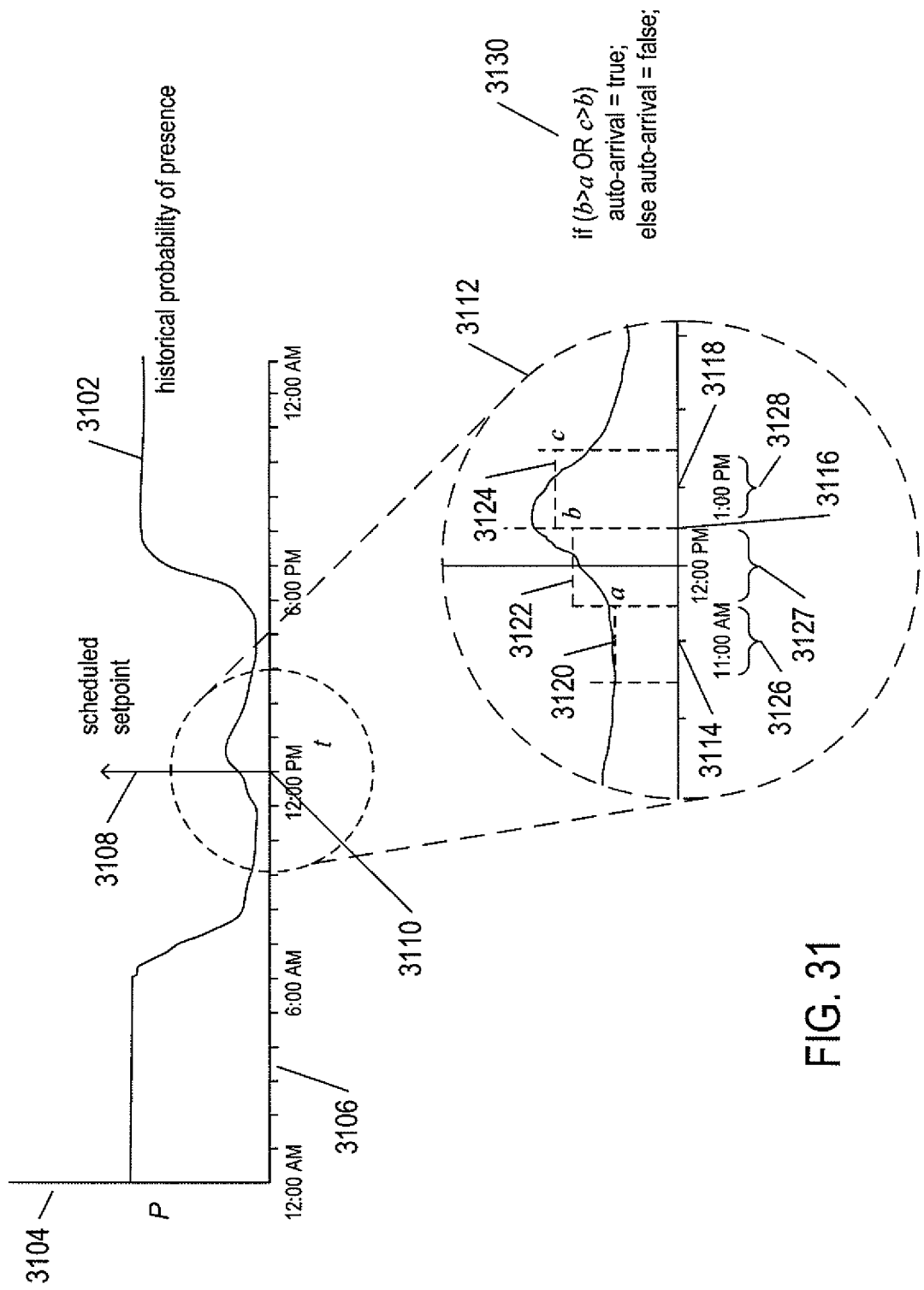
FIG. 31 illustrates one method by which an intelligent controller evaluates a scheduled setpoint, while in the no-presence state, to determine whether or not to carry out the scheduled setpoint.

FIG. 31 illustrates one method by which an intelligent controller evaluates a scheduled setpoint, while in the no-presence state, to determine whether or not to carry out a control operation corresponding to the scheduled setpoint. FIG. 31 shows a cumulative-probability-of-presence curve 3102 that represents cumulative-probability-of-presence data maintained by an intelligent controller, with the cumulative-probability-of-presence curve plotted with respect to a vertical axis 3104 representing the probability of presence and a horizontal axis 3106 representing time of day. A scheduled setpoint 3108 is overlaid onto this plot at the point in time 3110 of the scheduled setpoint. The portion of the scheduled-setpoint-overlaid cumulative-probability-of-presence curve in the vicinity of the scheduled setpoint is shown at larger scale 3112 below the plot in FIG. 31. In one approach to evaluating scheduled setpoints, the intelligent controller chooses three points in time 3114, 3116, and 3118. The middle point 3116 is the time of day of the scheduled setpoint and, in one approach, the outer points 3114 and 3118 are one hour before and one hour after the setpoint time, respectively. Next, the intelligent controller computes average probability-of-presence values a, b, and c, for one-hour intervals centered around the three selected points 3114, 3116, and 3118. In FIG. 31, the average probability-of-presence values a, b, and c are represented by the heights of horizontal dashed lines 3120, 3122, and 3124 above the horizontal axis, respectively, with the intervals of time 3126-3128 represented by successive pairs of vertical dashed lines. Then, the intelligent controller evaluates whether or not to carry out the scheduled setpoint as indicated by the small portion of pseudocode 3130 in FIG. 31. When the value b is greater than the value a, or the value c is greater than the value b, then a variable auto_arrival is set to be true, indicating that the scheduled setpoint should be carried out. Otherwise, the variable auto_arrival is set to be false, indicating that the scheduled setpoint should not be carried out.

Other implementations of scheduled-setpoint evaluation are possible. The intent is to only carry out those scheduled setpoints that occur at a point in time at which an interpolated cumulative-probability-of-presence curve has a positive slope, indicating that, at the setpoint time, based on cumulative-probability-of-presence data, the likelihood of an entity returning to the controlled environment is increasing. The cumulative probability-of-presence data may be collected over a fixed number of preceding days or may be determined by any of various statistical methods and analyses.

Figure 32:
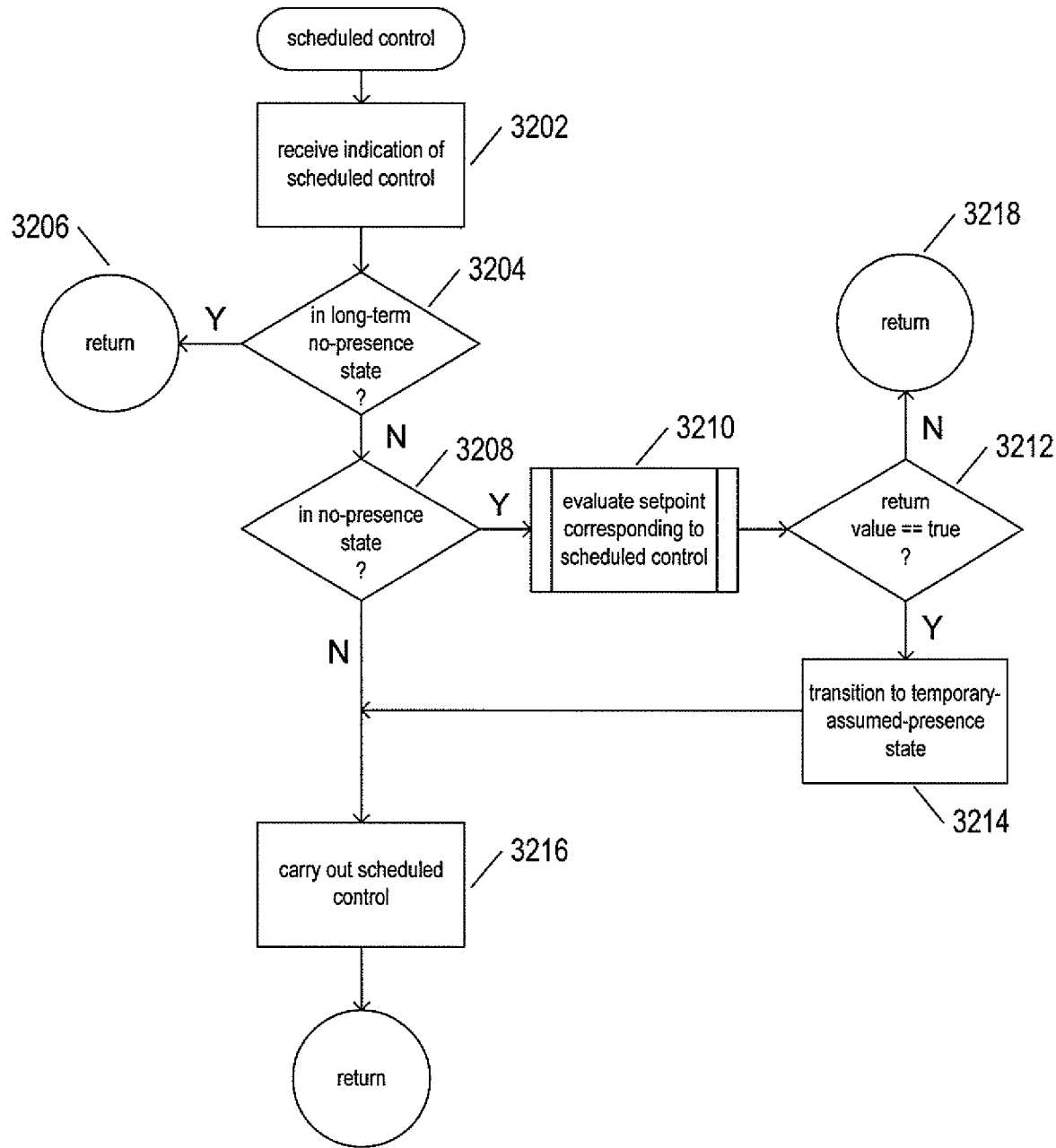
FIGS. 32-33 provide control-flow diagrams that illustrate selective carrying out of scheduled setpoints by an intelligent controller in the no-presence state, as discussed above with reference to FIGS. 27-31.
Figure 33:
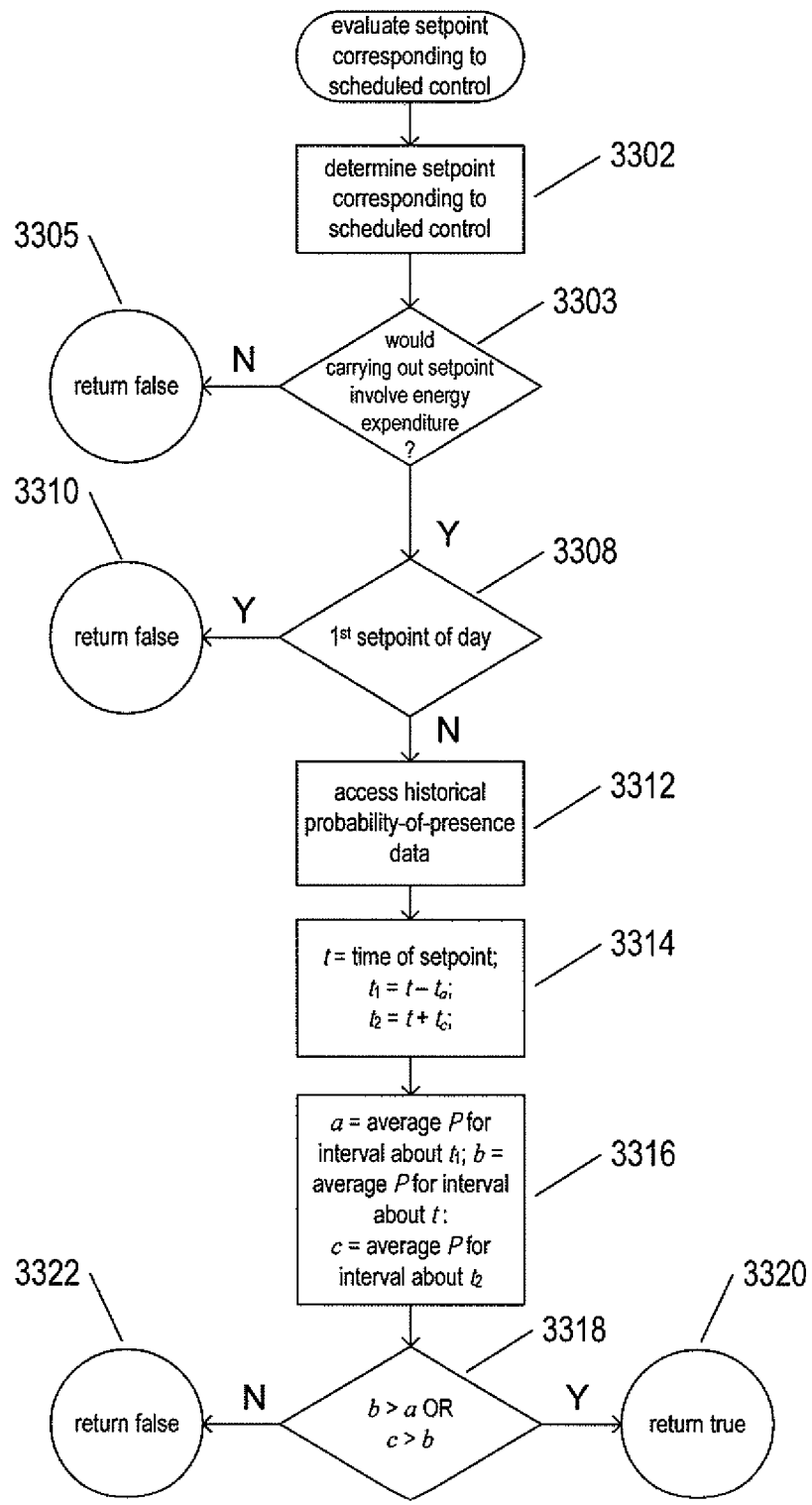

FIGS. 32-33 provide control-flow diagrams that illustrate selective carrying out of scheduled setpoints by an intelligent controller in the no-presence state, as discussed above with reference to FIGS. 27-31. FIG. 32 provides a control-flow diagram for the routine "scheduled control" called in step 1610 of FIG. 16. This routine represents a handler for a scheduled-control event. In step 3202, the intelligent controller receives an indication of the scheduled control that may be considered to be carried out by the intelligent controller. A scheduled control may be either a scheduled setpoint or may be a preconditioning time point in advance of a scheduled setpoint at which the intelligent controller would begin actively adjusting an environmental parameter in order that the environmental parameter reach the desired value at the time of the scheduled setpoint. When the intelligent controller is in the long-term no-presence state, as determined in step 3204, the routine "scheduled control" returns, in step 3206, since scheduled setpoints and preconditioning points are ignored in the long-term no-presence state. When the intelligent controller is in the no-presence state, as determined in step 3208, the intelligent controller calls the routine "evaluate setpoint corresponding to scheduled control" in step 3210 to determine whether or not to carry out the setpoint. When the routine returns a TRUE value, as determined in step 3212, then, in step 3214, the intelligent controller transitions to the temporary-assumed-presence state and the scheduled control is carried out in step 3216. Otherwise, when the routine returns a FALSE value, as determined in step 3212, the routine "scheduled control" returns in step 3218. Note that the scheduled control is carried out, in step 3216, when the intelligent controller is in the presence state.

FIG. 33 provides a control-flow diagram for the routine "evaluate setpoint corresponding to scheduled control" called in step 3210 in FIG. 32. This routine carries out the evaluation discussed above with reference to FIG. 31. In step 3302, the routine determines the setpoint corresponding to the scheduled control. This is either the scheduled control, in the case that the scheduled control is a setpoint, or the setpoint that follows a scheduled preconditioning control. In step 3303, the routine determines whether carrying out the setpoint would involve an energy expenditure. If not, then the routine returns false in step 3305. Thus, in the case of a thermostat intelligent controller in a heating mode, if the setpoint decreases the temperature setting, then the routine would return. Conversely, if the thermostat intelligent controller is in cooling mode, then if the setpoint would increase the temperature, the routine would return in step 3305. Next, in step 3308, the routine determines whether or not the setpoint is the first setpoint of the day. If so, then the routine returns false in step 3310. The routine is only called when the intelligent controller is in the no-presence state, and, when the intelligent controller is in the no-presence state and is considering the first setpoint of the day, it is likely that there's been no presence of an entity, such as a human being, in the controlled environment over the course of the preceding night, as a result of which it is unlikely that the entity will return during the time at which the setpoint would be carried out and before the control would be reversed following the variable threshold time. Otherwise, in step 3312, the routine accesses cumulative-probability-of-presence data and determines three time points t, $t_1$, and $t_2$ in step 3314 corresponding to time points 3116, 3114, and 3318, respectively, in the example shown in FIG. 31. The time point t is the time of the setpoint, the time point $t_1$ is a time prior to the setpoint, and the time $t_2$ is the time point following the setpoint. These time points are specified as being a distance of $t_a$ and $t_c$ in time, respectively, from the time of the setpoint t. Then, in step 3316, the routine computes the three average probability-of-presence values a, b, and c as discussed above with reference to FIG. 31. In step 3318, the routine determines whether or not b is greater than a or c is greater than b, as in the pseudocode 3130 shown in FIG. 31, and, if so, returns true in step 3320 and, if not true, returns false in step 3322.

Figure 34:
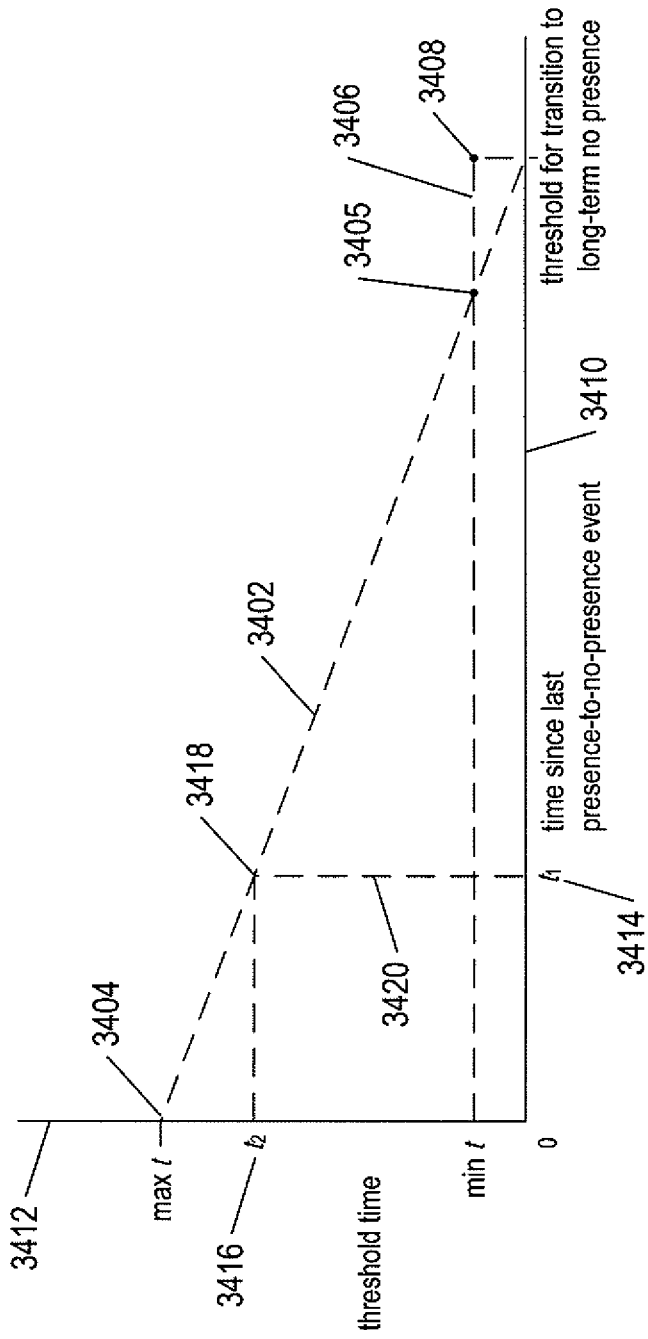
FIG. 34 illustrates one approach to computing the variable threshold time.

As discussed above with reference to the state transition diagram shown in FIG. 30, the threshold amount of time that an intelligent controller waits, after carrying out a setpoint while in the no-presence state, before reverting to an energy-efficient setting, is variable. FIG. 34 illustrates one approach to computing the variable threshold time. In FIG. 34, the variable threshold time is represented by diagonal dashed line segment 3402 that begins at a point 3404, labeled "max t" in FIG. 34, and that extends downward to point 3405, and the horizontal dashed line segment 3406 between points 3405 and 3408 at a height min t 3409 above the horizontal axis 3410. These line segments are plotted in a plot with vertical axis 3412 representing a variable threshold time to wait until returning to an energy-efficient setting and horizontal axis 3410 representing the amount of time that has elapsed since the presence-to-no-presence event that caused the intelligent controller to transition to the no-presence state. The intelligent controller can compute the time since the presence-to-no-presence event, such as time $t_1$ 3414, and then compute a corresponding variable threshold amount of time, $t_2$ 3416, based on the elapsed time $t_1$ and line segments 3402 and 3406. In other words, the variable threshold time $t_2$ is the y coordinate of the point 3418 at which a vertical line segment 3420 positioned at time $t_1$ 3414 intersects line segment 3402 or 3406. Equivalently, in a case in which max t is 2 hours, min t is 15 minutes, and the maximum amount of time that has elapsed since the presence-to-no-presence event that caused the intelligent controller to transition to the no-presence state is 2 days, at which point a threshold is reached for a transition to the long-term no-presence state, in which scheduled setpoints are no longer carried out, the variable threshold time TH can be computed, in minutes, from the amount of time t, also in minutes, that has elapsed since the presence-to-no-presence event that caused the intelligent controller to transition to the no-presence state as:

$$TH = \begin{cases} -\dfrac{1}{24 \text{ (minutes)}} t \text{ (minutes)} + 2 \text{ (hours)}, & t \leq 42 \text{ (hours)} \\ 15 \text{ (minutes)}, & 42 < t \leq 48 \text{ (hours)} \end{cases}$$

Although the present invention has been described in terms of particular embodiments, it is not intended that the invention be limited to these embodiments. Modifications within the spirit of the invention will be apparent to those skilled in the art. For example, various different implementations of an intelligent controller that selectively carries out scheduled control operations during a period when an entity is not detected in a controlled environment can be obtained by varying any of many different design and implementation parameters, including intelligent-controller hardware, operating systems and other control programs used in the intelligent controller, and various implementation parameters for controller functionality, including programming language, modular organization, data structures, control structures, and other such parameters. Various different considerations may be applied to determine the range of times during which the absence of an entity's presence may result in a transition to the no-presence or long-term no-presence states. The range of times, for example, may be determined from accumulated sensor and/or probability-of-presence data. Similarly, various different models and computations may be employed to determine the variable threshold amount of time to wait following carrying out a scheduled control, in the temporary-assumed-presence state before reverting to energy-efficient settings and transitioning back to the no-presence state. Additionally, many different types of methods and considerations may be employed to evaluate a scheduled control operation during times when an entity, such as a human being, is not considered to be present in the controlled environment.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An intelligent controller that controls an energy-consuming system that affects an environmental parameter within a controlled environment, the intelligent controller comprising:
    a processor;
    one or more sensors;
    a memory that stores a control schedule comprising a plurality of scheduled setpoints and cumulative historical probability-of-presence data; and
    instructions stored within the memory that, when executed by the processor, controls the intelligent controller to:
        determine, from output of one or more of the one or more sensors, that no human being is present in the controlled environment for a predetermined time interval;
        in response to determining that no human being is present in the controlled environment for the predetermined time interval, enter an away mode of operation where one or more environmental parameters are maintained at levels that are more energy-efficient than the scheduled setpoints; and
        while operating in the away mode:
            for each setpoint in the plurality of scheduled setpoints in the control schedule that occurs while operating in the away mode, determine, based at least in part on the historical probability-of-presence data, whether to carry out control operations to affect the environmental parameter using the energy-consuming system or whether to ignore the setpoint.

2. The intelligent controller of claim 1 wherein the intelligent controller determines, for each setpoint in the plurality of scheduled setpoints in the control schedule, whether to carry out the control operations to affect the environmental parameter using the energy-consuming system or whether to ignore the setpoint by:
    for each control operation corresponding to a scheduled setpoint, evaluating the corresponding setpoint with respect to the cumulative historical probability-of-presence data to determine whether or not to carry out the control operation.

3. The intelligent controller of claim 2 wherein evaluating the corresponding setpoint with respect to the cumulative historical probability-of-presence data further comprises determining whether or not the cumulative historical probability-of-presence data indicates an increase in the probability of presence at the time of day of the setpoint corresponding to the control operation.

4. The intelligent controller of claim 3 wherein determining whether or not the cumulative historical probability-of-presence data indicates an increase in the probability of presence at the time of day of the setpoint corresponding to the control operation further comprises:
    selecting a first time of day t1 prior to the time of day of the setpoint corresponding to the control operation, t;
    selecting a second time of day t2 following the time of day of the setpoint corresponding to the control operation, t; and
    when either the cumulative historical probability-of-presence at time of day t2 is greater than the cumulative historical probability-of-presence at time of day t or the cumulative historical probability-of-presence at time of day t is greater than the cumulative historical probability-of-presence at time of day t1, determining that the probability of presence at the time of day of the setpoint corresponding to the control operation is increasing and, otherwise, determining that the probability of presence at the time of day of the setpoint corresponding to the control operation is not increasing.

5. The intelligent controller of claim 1 wherein the intelligent controller determines, from output of one or more of the one or more sensors, that no human being is present in the controlled environment for the predetermined time interval at times within a range of times of day within which a determination of whether or not a human being is present can be reliably made.

6. The intelligent controller of claim 5 wherein the range of times of day within which a determination of whether or not a human being is present can be reliably made is determined from cumulative sensor data.

7. The intelligent controller of claim 5 wherein the range of times of day within which a determination of whether or not a human being is present can be reliably made is 8:00 AM until 8:00 PM.

8. The intelligent controller of claim 1 wherein the intelligent controller determines, for each setpoint in the plurality of scheduled setpoints in the control schedule, whether to carry out the control operations to affect the environmental parameter using the energy-consuming system or whether to ignore the setpoint by:
for each control operation corresponding to a scheduled setpoint,
evaluating the corresponding setpoint with respect to the cumulative historical probability-of-presence data to determine whether or not to carry out the control operation; and
when the evaluation of the corresponding setpoint indicates that the control operation is to be carried out, returning to maintenance of the one or more environmental parameters at energy-efficient levels for a variable threshold amount of time.

9. The intelligent controller of claim 8 wherein the variable threshold amount of time varies from a maximum variable threshold amount of time, immediately following a determination that no human being is present in the controlled environment, to 0, after an amount of time has elapsed that indicates a long-term absence of human beings in the controlled environment.

10. The intelligent controller of claim 9 wherein maximum variable threshold amount of time is 2 hours and the amount of elapsed time that indicates a long-term absence of human beings in the controlled environment is 2 days, with the variable threshold amount of time decreasing linearly over the period of 2 days.

11. The intelligent controller of claim 1 wherein control operations corresponding to scheduled setpoints include:
changing one or more environmental parameter settings at a time corresponding to a scheduled setpoint; and
changing one or more environmental parameter settings at a time prior to a time corresponding to a scheduled setpoint in order to carry out preconditioning.

12. The intelligent controller of claim 1 wherein the intelligent controller comprises a thermostat.

13. The intelligent controller of claim 12 wherein the one or more environmental parameters comprises a temperature.

14. The intelligent controller of claim 13 wherein the thermostat is in a heating mode and wherein the thermostat modifies the control schedule to maintain one or more environmental parameters at energy-efficient levels by setting a temperature setting to a specified away temperature below 70 degrees Fahrenheit and above 32 degrees Fahrenheit.

15. The intelligent controller of claim 13 wherein the thermostat is in a cooling mode and wherein the thermostat modifies the control schedule to maintain one or more environmental parameters at energy-efficient levels by setting a temperature setting to a specified away temperature above 65 degrees Fahrenheit and below 90 degrees Fahrenheit.

16. A method for controlling an energy-consuming system that affects an environmental parameter within a controlled environment by an intelligent controller that includes a processor, one or more sensors, a memory that stores a control schedule comprising a plurality of scheduled setpoints and stores cumulative historical probability-of-presence data, and instructions stored within the memory that, when executed by the processor, control the intelligent controller, the method comprising:
determining, from output of one or more of the one or more sensors, that no human being is present in the controlled environment for a predetermined time interval;
in response to determining that no human being is present in the controlled environment for the predetermined time interval, entering an away mode of operation where one or more environmental parameters are maintained at levels that are more energy-efficient than the scheduled setpoints; and
while operating in the away mode:
for each setpoint in the plurality of scheduled setpoints in the control schedule that occurs while operating in the away mode, determining, based at least in part on the historical probability-of-presence data, whether to carry out control operations to affect the environmental parameter using the energy-consuming system or whether to ignore the setpoint.

17. The method of claim 16 wherein determining, for each setpoint in the plurality of scheduled setpoints in the control schedule, whether to carry out the control operations to affect the environmental parameter using the energy-consuming system or whether to ignore the setpoint comprises:
for each control operation corresponding to a scheduled setpoint,
evaluating the corresponding setpoint with respect to the cumulative historical probability-of-presence data to determine whether or not to carry out the control operation.

18. The method of claim 17 wherein evaluating the corresponding setpoint with respect to the cumulative historical probability-of-presence data further comprises determining whether or not the cumulative historical probability-of-presence data indicates an increase in the probability of presence at the time of day of the setpoint corresponding to the control operation.

19. The method of claim 18 wherein determining whether or not the cumulative historical probability-of-presence data indicates an increase in the probability of presence at the time of day of the setpoint corresponding to the control operation further comprises:
selecting a first time of day t1 prior to the time of day of the setpoint corresponding to the control operation, t;
selecting a second time of day t2 following the time of day of the setpoint corresponding to the control operation, t; and
when either the cumulative historical probability-of-presence at time of day t2 is greater than the cumulative historical probability-of-presence at time of day t or the cumulative historical probability-of-presence at time of day t is greater than the cumulative historical probability-of-presence at time of day t1, determining that the probability of presence at the time of day of the setpoint corresponding to the control operation is increasing and, otherwise, determining that the probability of presence at the time of day of the setpoint corresponding to the control operation is not increasing.

20. The method of claim 16 wherein the intelligent controller comprises a thermostat, and the one or more environmental parameters comprises a temperature.

* * * * *